United States Patent [19]
Kakii et al.

[11] Patent Number: 5,719,978
[45] Date of Patent: Feb. 17, 1998

[54] PARALLEL TRANSMISSION MODULE FOR TRANSMITTING A PLURALITY OF OPTICAL SIGNALS IN PARALLEL AND METHOD FOR MANUFACTURING THE SAME

[75] Inventors: Toshiaki Kakii; Hidetoshi Ishida; Shinji Ogawa; Kazumichi Miyabe, all of Yokohama, Japan

[73] Assignee: Sumitomo Electric Industries, Ltd., Osaka, Japan

[21] Appl. No.: 499,902

[22] Filed: Jul. 11, 1995

Related U.S. Application Data

[62] Division of Ser. No. 356,380, filed as PCT/JP94/00532 Mar. 31, 1994, abandoned.

[30] Foreign Application Priority Data

| Mar. 31, 1993 | [JP] | Japan | 5-95177 |
| Jul. 23, 1993 | [JP] | Japan | 5-202014 |
| Jan. 12, 1994 | [JP] | Japan | 6-13105 |
| Jan. 18, 1994 | [JP] | Japan | 6-16922 |
| Jan. 20, 1994 | [JP] | Japan | 6-18821 |
| Jan. 20, 1994 | [JP] | Japan | 6-18824 |
| Jan. 20, 1994 | [JP] | Japan | 6-18843 |

[51] Int. Cl.$^6$ ............................................. G02B 6/36
[52] U.S. Cl. ...................... 385/89; 385/92; 385/94; 385/50
[58] Field of Search .................. 385/89–94, 54, 385/56, 88, 59, 65, 83, 80, 43, 49, 50, 51, 33

[56] References Cited

U.S. PATENT DOCUMENTS

| 4,730,198 | 3/1988 | Brown et al. | 385/89 |
| 4,763,976 | 8/1988 | Nolan et al. | 385/43 |
| 4,818,058 | 4/1989 | Bonanni | 385/89 |
| 4,836,638 | 6/1989 | Finzel | 385/65 |

(List continued on next page.)

FOREIGN PATENT DOCUMENTS

| 0304118 | 2/1989 | European Pat. Off. . |
| 0330231 | 8/1989 | European Pat. Off. . |
| 0405620 | 1/1991 | European Pat. Off. . |
| 0430107 | 6/1991 | European Pat. Off. . |
| 0444347 | 9/1991 | European Pat. Off. . |

(List continued on next page.)

OTHER PUBLICATIONS

Albanese et al, "LED Array Package for Optical Data Links", The Bell System Technical Journal, vol. 58, No. 3, Mar. 1979, pp. 713–720.
Patent Abstracts of Japan, vol. 14, No. 158 (P–1027) (4101) Mar. 1990 & JP–A–01 013 911 (NEC Corp).
Patent Abstracts of Japan, vol. 14, No. 72 (P–1004) Feb. 9, 1990 & JP–A–01 291 204 (Furukawa).
Patent Abstracts of Japan, vol. 11, No. 22 (P–538) Jan. 21, 1987 & JP–A–61 196 207 (Sumitomo).
Iwano et al, "Compact and Self–Retentive Multi–Ferrule Optical Backpanel Connector", Journal of Lightwave Technology, vol. 10, No. 10, Oct. 1992, New York, pp. 1356–1362.

*Primary Examiner*—Akm E. Ullah
*Assistant Examiner*—Hemang Sanghaui
*Attorney, Agent, or Firm*—Cushman Darby & Cushman IP Group of Pillsbury Madison & Sutro LLP

[57] ABSTRACT

An optical fiber array according to the present invention includes an optical coupling end face to be optically coupled to another optical line, and first ends of a plurality of optical fibers are arrayed in the optical coupling end face. The optical fiber array includes a lower plate (3a) having a plurality of V-shaped grooves (4) for positioning the optical fibers exposed from one end of a ribbon part of the optical fibers, and an upper plate (3b) for pressing each optical fiber provided in each V-shaped groove (4) of the lower plate into the positioning groove. A boundary portion between the ribbon part (7) and the optical fibers (1) is fixed between the first and second plates (3a, 3b) by heat resistant adhesive (10), and the optical fibers from the boundary portion to a front end of the array are fixed by solder (6) to achieve hermetic sealing.

20 Claims, 45 Drawing Sheets

U.S. PATENT DOCUMENTS

| | | | |
|---|---|---|---|
| 5,092,991 | 3/1992 | Briggs et al. | 385/82 |
| 5,182,782 | 1/1993 | Tabasky et al. | 385/89 |
| 5,212,754 | 5/1993 | Basavanhally et al. | 385/90 |
| 5,278,688 | 1/1994 | Blauvelt et al. | 385/31 |
| 5,315,678 | 5/1994 | Maekawa et al. | 385/59 |
| 5,367,593 | 11/1994 | Lebby et al. | 385/89 |
| 5,394,503 | 2/1995 | Dietz, Jr. et al. | 385/89 |
| 5,420,954 | 5/1995 | Swirhun et al. | 385/92 |

FOREIGN PATENT DOCUMENTS

| | | |
|---|---|---|
| 0458608 | 11/1991 | European Pat. Off. . |
| 0485196 | 5/1992 | European Pat. Off. . |
| 56-151909 | 11/1981 | Japan . |
| 57-103409 | 6/1982 | Japan . |
| 60-214310 | 10/1985 | Japan . |
| 61-133909 | 6/1986 | Japan . |
| 63-43110 | 3/1988 | Japan . |
| 194905 | 6/1989 | Japan . |
| 3167510 | 11/1991 | Japan . |
| 3261902 | 11/1991 | Japan . |
| 2239104 | 6/1991 | United Kingdom . |

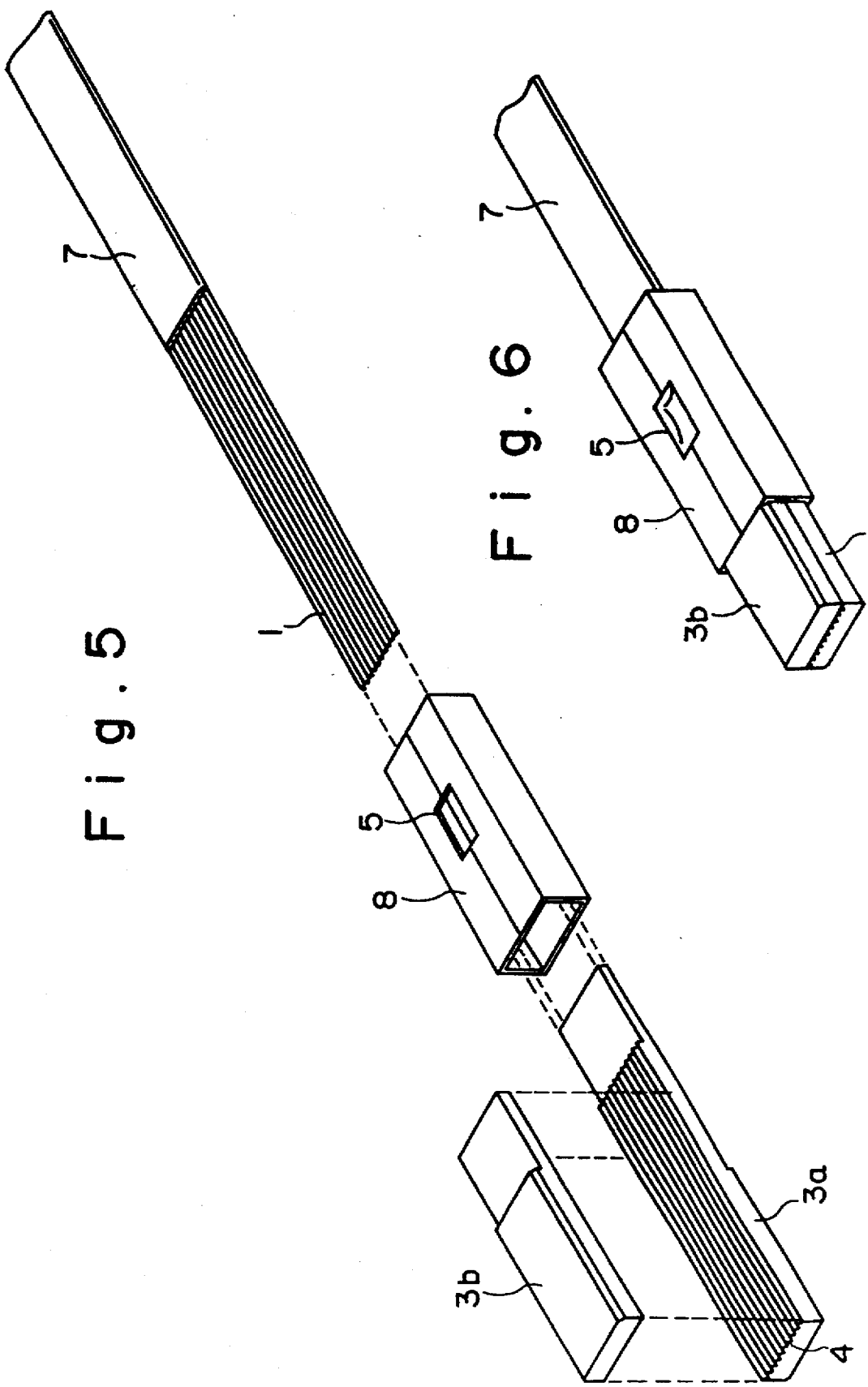

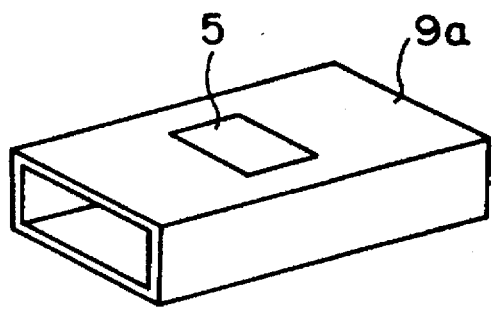
Fig.10A
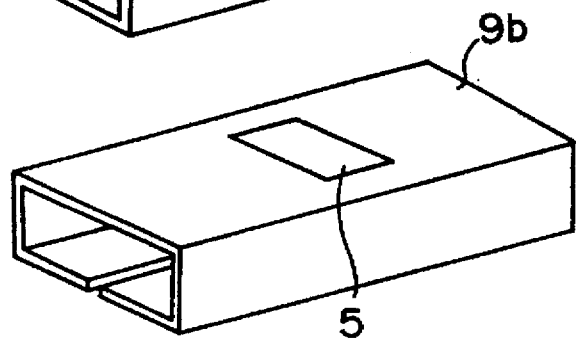
Fig.10B
Fig.11
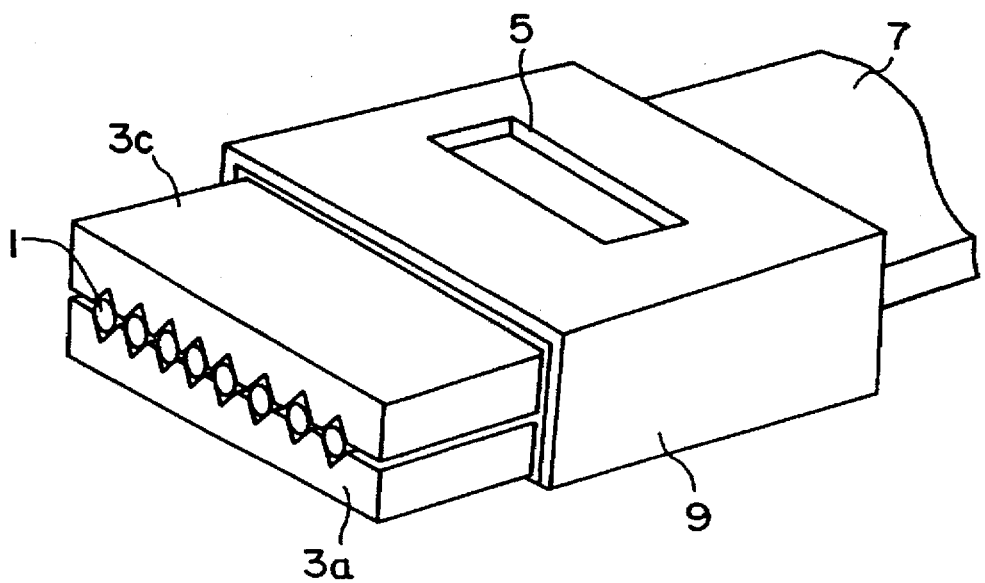

1mm OR BELOW

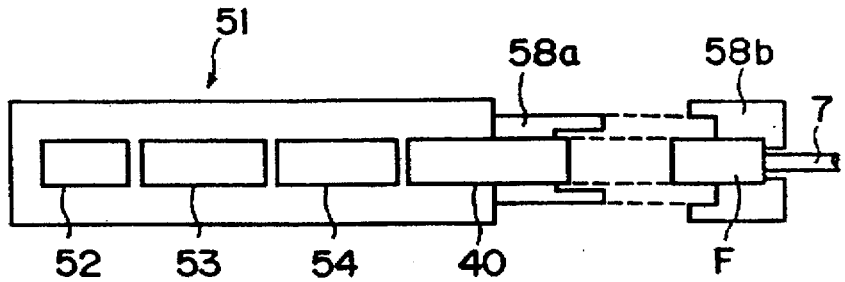
Fig.25A
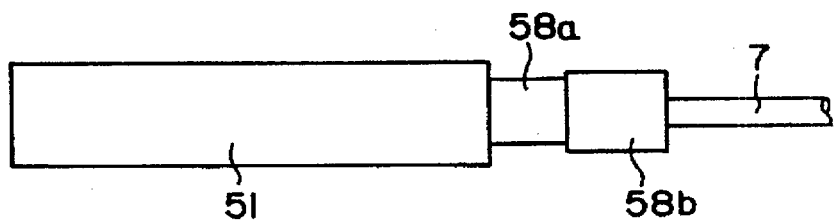
Fig.25B
Fig.26
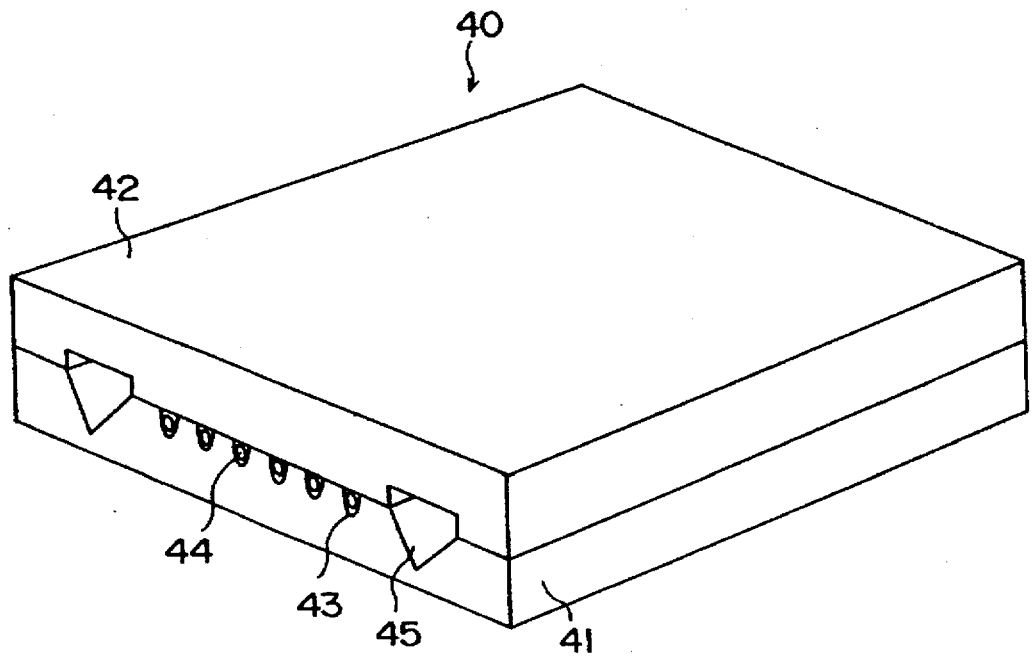

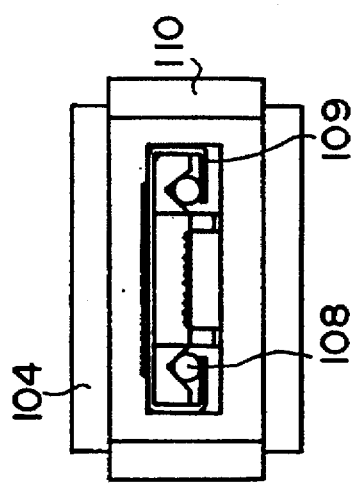
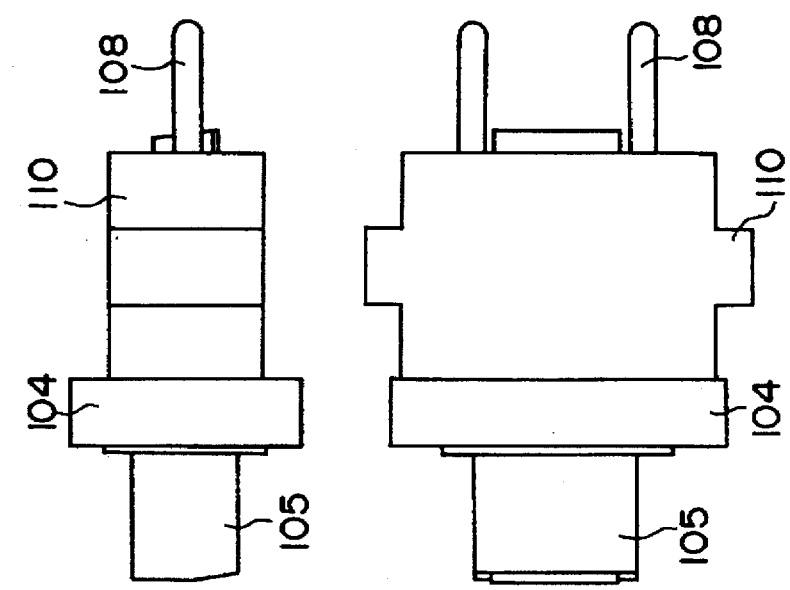
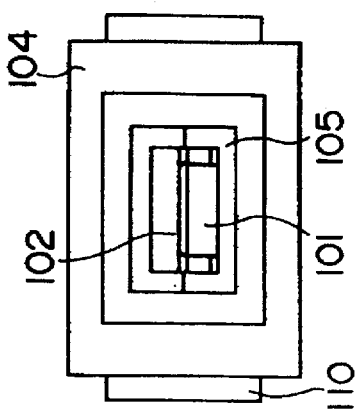

Fig.47A
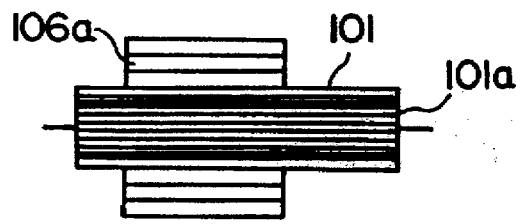
Fig.47C  Fig.47B  Fig.47D
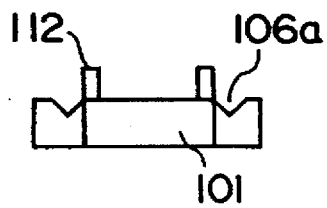 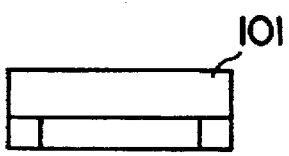 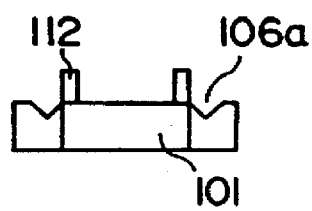
Fig.48A
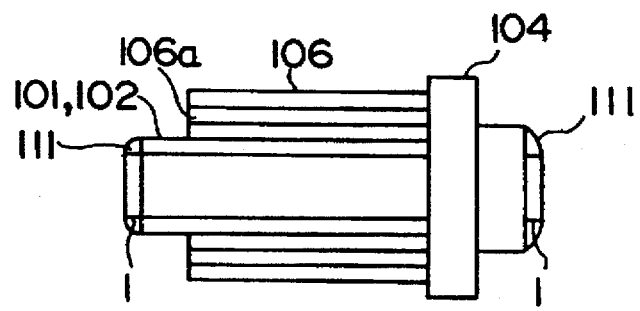
Fig.48C  Fig.48B  Fig.48D
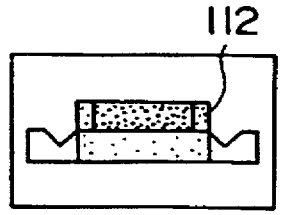 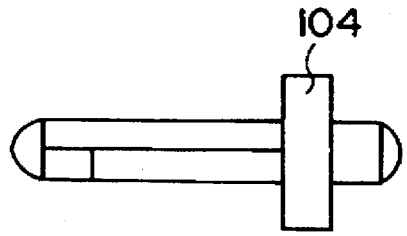 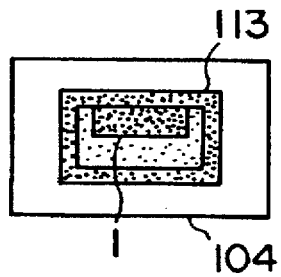

Fig.52A
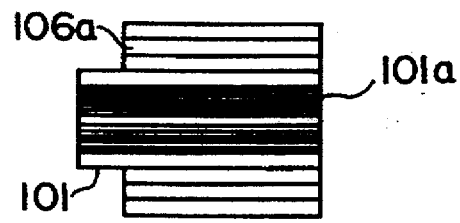
Fig.52C     Fig.52B     Fig.52D
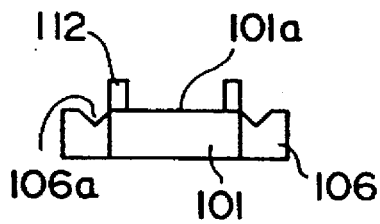   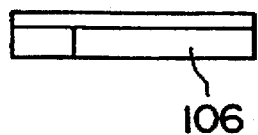   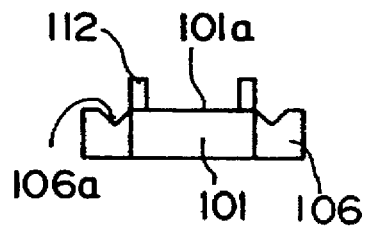
Fig.53A
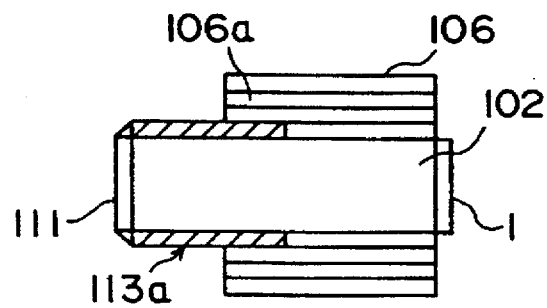
Fig.53C     Fig.53B
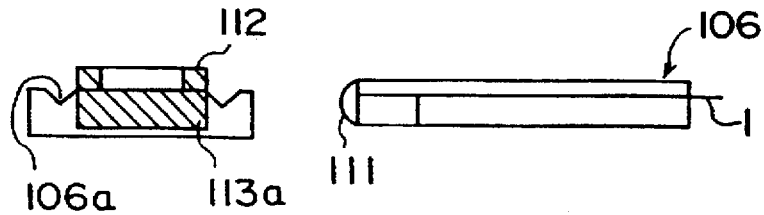

Fig.56A
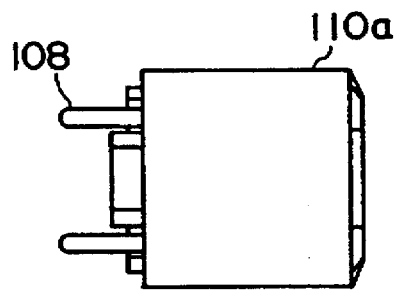
Fig.56C  Fig.56B
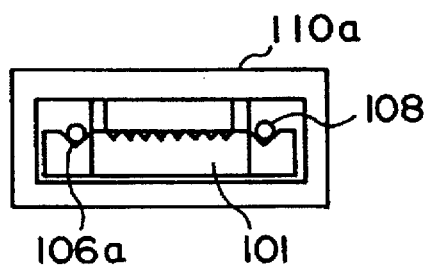 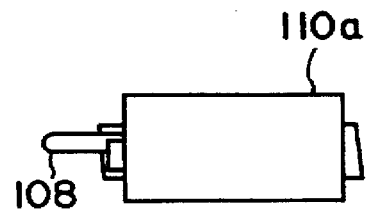
Fig.57
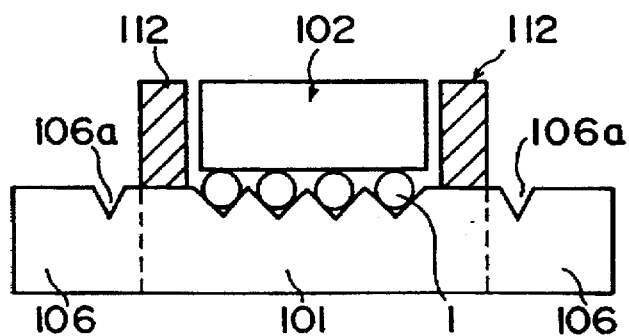
Fig.58
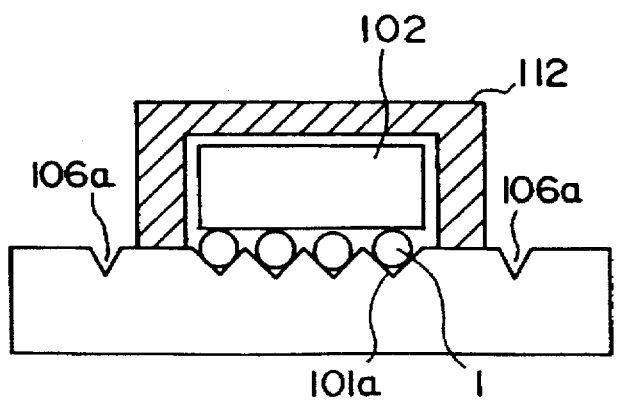

$a < b$

PARALLEL TRANSMISSION MODULE FOR TRANSMITTING A PLURALITY OF OPTICAL SIGNALS IN PARALLEL AND METHOD FOR MANUFACTURING THE SAME

This is a division of application Ser. No. 08/356,380, filed as PCT/JP94/00532 Mar. 31, 1994 now abandoned.

BACKGROUND OF THE INVENTION

1. Field of the Invention

The present invention relates to an optical fiber array which optically couples with an LD (laser diode) array or a PD (photodiode) array which are used in optical parallel transmission. The present invention further relates to a parallel transmission module which comprises such an optical fiber array, a method of manufacturing a parallel transmission module, and a housing structure of a connecting part which can be disposed between the optical module in a parallel transmission apparatus and an external connector.

2. Description of the Related Art

In recent years, there have been proposed optical interconnecting methods, in which a plurality of optical fiber lines are used to connect apparatuses such as large computers or mass-storage information exchange systems. These optical interconnecting methods generally involve, as shown in FIG. 1, connecting apparatuses 701 and 702 using an optical fiber line 703 which is made of a plurality of optical fibers and transmitting optical signals in parallel. A part of FIG. 1 is shown in FIG. 2. An optical module 704 for parallel transmission in the apparatus 701 and an optical module 705 for parallel transmission in the apparatus 702 are connected to each other through multifiber optical connectors 706 and optical fiber lines 703.

As the multifiber optical connector 706, for example, there is an optical fiber array having a structure in which optical fibers are held by V-shaped grooves formed by etching silicon (hereinafter simply called Si), (Journal of Lightwave Technology Vol. Lt-3 No. 5, p. 1159, issued in October, 1985). Further, there is known an optical fiber array having a structure in which optical fibers are put between two L-shaped magnets, which array is disclosed in Japanese Patent Laid-open No. 4-86802 (86802/1992).

However, when the aligned optical fiber array with an LD array or a PD array is fixed by using solder bonding or a YAG laser, its heat is also transferred to the optical fiber array, which heats up the optical fiber array to 200° C. or above. Consequently, the problems of distortion appearing in micro order depending on the state of assembly, degradation of the coupling part, gas generation from adhesive around the optical fiber array, degradation of characteristics due to dew, and other problems arise.

As shown in FIG. 3, in the optical module 704, a fiber ribbon 703a is continuously formed and the multifiber optical connector 706 is placed at one end of the fiber ribbon 703a, which is referred to as a pigtail type. It is also known that the fiber ribbon 703a and the multifiber optical connector 706 can be placed at both ends of a silica waveguide 707 (e.g., an optical branching filter, an optical multiplexer, or an optical switch), which is referred to as a jumper type.

However, with respect to the parallel optical transmission module, especially the pigtail type, it is difficult to handle the ribbon part of the optical fiber ribbon in each manufacturing process. A coating part of the optical fiber ribbon is made of resin, which is inferior in heat resistance and which is difficult to handle when the module is fixed with solder or cleaned. For the jumper type, there are also the disadvantages that the ribbon part of the optical fiber ribbon complicates handling, and that if it is stored in an small area, the bend radius of the optical fiber becomes 30 mm or above, which increases the size of the space required for mounting.

On the other hand, as shown in FIGS. 1 and 2, in the case of optically coupling the parallel optical transmission module with the external apparatus, the parallel optical transmission module is coupled with the optical connector 706 which ties to the external apparatus through the fiber ribbon 703a and the multifiber optical connector 706. However, in this coupling, since the coupling is made at one end of fiber which is wired from the substrate to outside, wiring is often distorted. Conversely, when the module is not coupled, the connector at one side hangs down. Consequently, it is inconvenient to handle the fiber ribbon and the coupling end face of the fiber may be damaged.

It is an object of the present invention to provide an optical fiber array with sufficiently high airtightness and a method for preparing the same. Another object of the present invention is to provide a parallel transmission module, a method for manufacturing the parallel transmission module, and a housing structure.

SUMMARY OF THE INVENTION

An optical fiber array according to the present invention has an optical coupling end face to be optically coupled to another optical line, and first ends of a plurality of optical fibers are arranged in the optical coupling end face. The optical fiber array comprises a first plate comprising a plurality of positioning grooves for positioning the optical fibers exposed from one end of a ribbon part of the optical fibers, and a second plate for pressing each optical fiber provided in each positioning groove of the first plate into the positioning grooves. A boundary portion between the ribbon part and the optical fibers is fixed between the first plate and the second plate by heat resistant adhesive. The optical fibers from the boundary portion to a front end of the array are fixed between the first plate and the second plate by solder in an airtightness state.

A method of manufacturing an optical fiber array comprises a first step of positioning optical fibers in respective positioning grooves formed in a first plate, and pressing and maintaining all the optical fibers into the positioning grooves with a second plate. In a second step, a flange member is arranged at the peripheries of the first and second plates holding every optical fiber. In a third step, one (first) end faces of the first and second plates, where one (first) end faces of the optical fibers are arranged, are soaked in a solder tab to fix the flange member at the peripheries of the first and second plates. A fourth step of filling solder in the solder tab into a gap between the first and second plates is also performed, the fourth step being conducted at the same time of the third step, or right before or after the third step. In a fifth step, the one (first) end faces of the first and second plates are polished to make the (first) end faces of all the optical fibers specular.

A parallel transmission module of the present invention transmits a plurality of optical signals in parallel. The parallel transmission module comprises a module body comprising a plurality of optical transmission systems for transmitting the optical signals separately, and optical fiber arrays, each array being arranged such that a first end thereof is provided at one end face of the optical transmission systems provided in the module body and fixed at the module body. Each array comprises a plurality of optical fibers for optically coupling the optical transmission systems individually. The module further comprises guiding means for guiding another optical connector to couple with an optical coupling (second) end face of the optical fiber array. The optical coupling end face is located at the opposite side of the (first) end face optically coupled with the optical transmission systems.

A method of manufacturing a parallel transmission module according to the present invention comprises a first step of positioning optical fibers having first and second ends in respective positioning grooves formed in a first plate, and pressing and maintaining the optical fibers into the positioning grooves by a second plate. In a second step, a flange member is arranged at the peripheries of the first and second plates holding the optical fibers. In a third step, one (first) end faces of the first and second plates, where the first end faces of the optical fibers are arranged, are soaked in a solder tab to fix the flange member at the peripheries of the first and second plates. A fourth step of filling solder in the solder tab into a gap between the first and second plates from the first end faces to the second end faces is also performed, the fourth step being conducted at the same time of the third step, or right before or after the third step. In a fifth step, both end faces of the first and second plates are polished to make the end faces of every optical fiber to be specular, whereby an optical fiber array is formed. In a sixth step, one end face of the optical fiber array is fixed at an optical coupling end face of a module body comprising a plurality of optical transmission systems to make the optical fiber array and the module body to be one body, and the optical fibers in the optical fiber array are optically coupled individually with the optical transmission systems in the module body.

A housing structure of the present invention couples and releases the coupling of optical modules. The housing structure comprises a first housing, a second housing, and a third housing. The first housing comprises a distal wall at one end, an opening at the other end, and a first protrusion part protruding toward the inside of the opening. The second housing receives and holds one of the optical modules, and is provided in the first housing so as to be slidable. The second housing comprises a second protrusion part for engaging with the first protrusion part, such that the slide is limited by the distal wall of the first housing and the first protrusion part. The third housing holds the other optical module, and comprises holding parts for holding the second housing when the optical module is coupled. The second housing further comprises a step for engaging with the third housing, and the third housing further comprises a contact part for touching the second housing when the third housing and the first housing are confronted. The contact part is provided at one end of the third housing.

To couple the optical modules, the third housing is pushed into the first and second housings, whereby the second housing is pressed by the contact part of the third housing and the second protrusion part of the second housing is displaced across the first protrusion part. As a result, the slide limitation of the second housing is released, and the second and third housing are coupled together through the holding parts.

To release the coupling of the optical modules, the third housing is separated from the first and second housing, whereby the holding parts engage with the step of the second housing, and the second housing is displaced together with the separation of the third housing, and the second protrusion part of the second housing returns at an initial position thereof over the first protrusion part of the first housing. As a result, the slide of the second housing is limited, and the holding parts of the third housing are displaced over the step of the second housing, and the first and second housings are separated from the third housing.

BRIEF DESCRIPTION OF DRAWINGS

FIG. 5 is a perspective and exploded view showing an optical fiber array according to the first embodiment.

FIG. 6 is a view showing the completed optical fiber array of FIG. 5.

FIG. 10A and FIG. 10B are perspective views showing a configuration of a sleeve.

FIG. 11 is a perspective view showing an end of an optical fiber array.

FIG. 25A is a vertical sectional view showing a basic configuration of a parallel transmission module, and FIG. 25B is a side view showing the coupling of a parallel transmission module with an optical fiber array.

FIG. 26 is a perspective view showing an optical fiber array having guide-pin grooves.

FIG. 38–FIG. 46 are views showing the successive steps of a process of manufacturing a parallel transmission module.

FIG. 47A is a top view showing a lower plate and a support plate, and FIG. 47B is its side view, and FIG. 47C and FIG. 47D are front end and rear end views, respectively.

FIG. 48A is a top view showing a rear end of an optical fiber array after being soaked in a solder tub to seal a flange and to fill solder into its front end, FIG. 48B is its side view, FIG. 48C is a front end view, and FIG. 48D is a rear end view.

FIG. 52A is a top view showing another embodiment of a lower plate and a support plate, FIG. 52B is its side view, FIG. 52C is a front end view, and FIG. 52D is a rear end view.

FIG. 53A is a top view showing a state that a lower plate and a support plate of FIG. 52A are fixed by fixing agent injected from one end, FIG. 53B is a side view of the same, and FIG. 53C is a sectional view showing its end.

FIG. 56A is a top view showing a completed optical fiber array, and in particular the array depicted in FIG. 55A after polishing its rear end, FIG. 56B is its side view, and FIG. 56C is a sectional view showing its front end.

FIG. 57 is a schematic view showing a wall provided on a lower plate, and FIG. 58 is a schematic view showing another configuration of the wall.

PREFERRED EMBODIMENTS OF THE INVENTION

Figure 1:
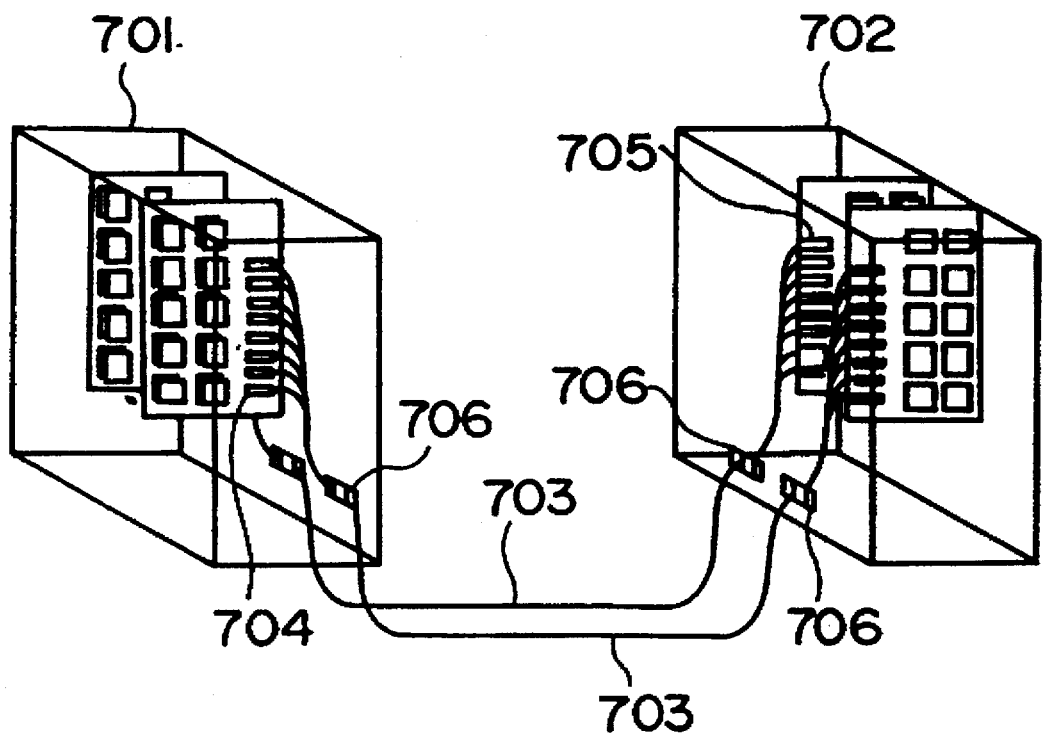
FIG. 1 is a view showing a plurality of optical fiber lines being used to connect information apparatuses such as large computers.
Figure 2:
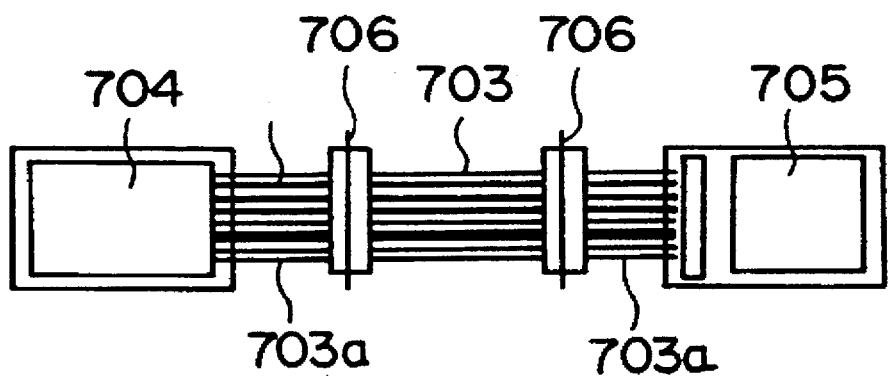
FIG. 2 is a plane view showing a part of FIG. 1.
Figure 3:
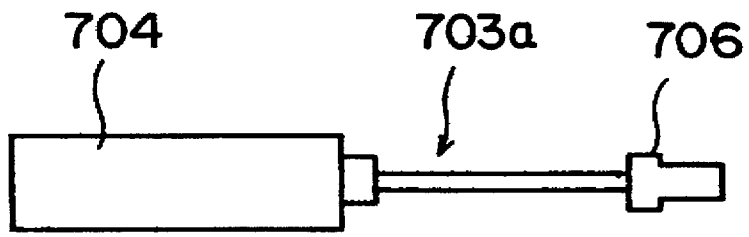
FIG. 3 is a view showing a conventional pigtail type parallel transmission module.
Figure 4:
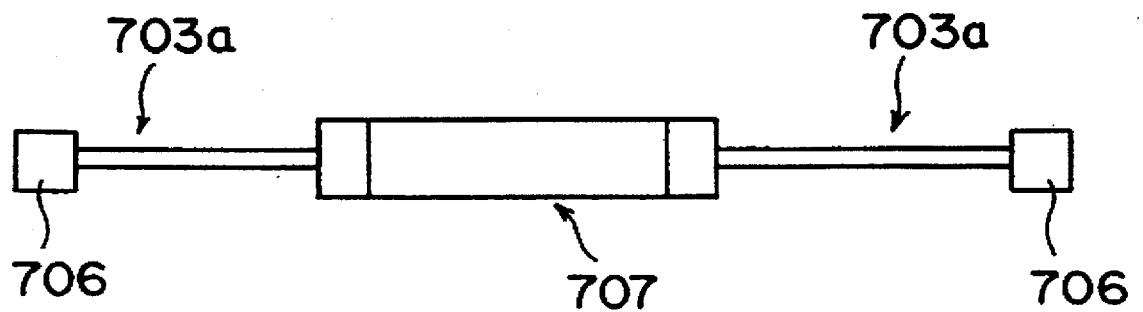
FIG. 4 is a view showing a conventional jumper type parallel transmission module.

The embodiments of the present invention will be explained with reference to the drawings. Note that optical fiber arrays and other features shown in the following embodiments are mainly used in an optical interconnection which couples information apparatuses such as large computers or mass-storage information exchange systems (see FIG. 1 and FIG. 2).

Embodiment 1

An optical fiber array according to the present embodiment is shown in FIG. 5. The optical fiber array comprises a lower plate 3a and an upper plate 3b which are made of silicon wafers, and a plurality of optical fibers 1 are stored between the lower plate 3a and the upper plate 3b. The optical fibers 1 extend from a ribbon part (coated region) 7 of a multi-optical fiber ribbon. The lower plate 3a has a plurality of V-shaped grooves 4 for storing the optical fibers 1 in position, and every optical fiber 1 to be placed in the V-shaped groove 4 is maintained inside the V-shaped groove 4 by the upper plate 3b. A metal sleeve 8 is put around the lower plate 3a and the upper plate 3b which sandwich the plurality of optical fibers 1 (FIG. 6). Note that the sleeve 8 comprises a window part 5, the function of which will be described later.

Figure 7:
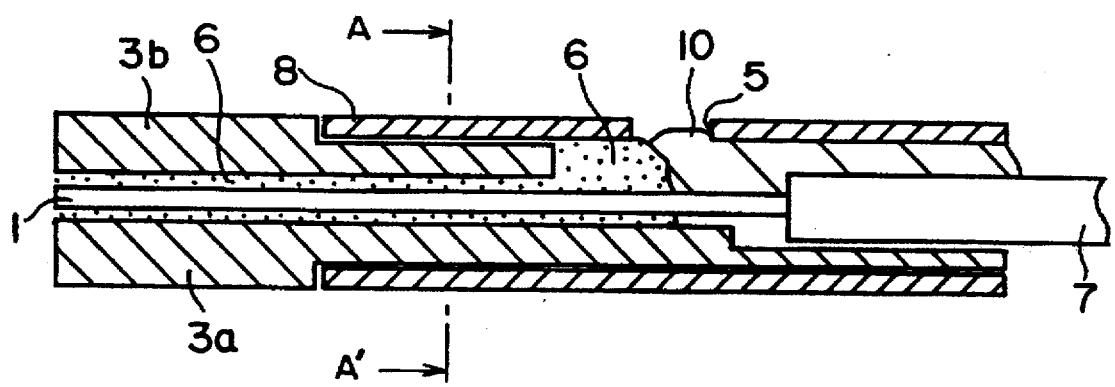
FIG. 7 is a vertical cross sectional view showing an optical fiber array.

The optical fiber array in a fixed state is shown in FIG. 7. The multi-optical fiber ribbon is fixed to the lower and upper plates 3a and 3b and resistant adhesive 10 is plugged as far as the interface between the coated ribbon part 7 and the optical fibers 1 and preferably into a boundary portion extending from the interface into the vicinity of the optical fibers 1. Next, the remaining portions of the optical fibers 1 extending from the boundary portion to the ends of the plates 3a and 3b are fixed to the lower and upper plates 3a and 3b by solder 6. With optical fiber array thus fixed by the solder 6, a sufficient airtightness is ensured. If the solder 6 comes in contact with the ribbon part 7, the coating of the ribbon part 7 melts and a large amount of gas is generated. Therefore, it is preferable that the vicinity of the boundary portion between the ribbon part 7 and the optical fibers 1 first be protected by the adhesive 10 and thereafter the glass part of the optical fiber 1 be fixed with the solder 6.

The solder 6 is fed from a region proximal to the first ends of the optical fibers while ultrasonic oscillation is applied. Thereafter, if the adhesive is filled near the ribbon part 7, air is accumulated inside the array because the inside is sealed, which may result in insufficient filling. For this reason, a window part (through window) 5 is provided in the sleeve 8 to act as an air vent when the adhesive is filled. The window part 5 is provided at a position where the optical fibers 1 are exposed, whereby a boarder (interface) between the solder 6 and the adhesive 10 is formed along the glass part of the optical fibers 1. Further, this window part 5 effectively prevents the solder from rising since the gap at a boarder portion is expanded. Providing a slight gap between the lower plate 3a and the upper plate 3b makes the solder 6 flow easier.

Since the optical fiber 1 is subjected to a heat of 200° C. or above when fixed with solder, cracks rapidly develop on a surface of the optical fiber and the optical fiber is easily broken. However, if an optical fiber which is coated by carbon is used, the development of cracks can be suppressed.

Further, solder which is suitable for bonding glass which forms an optical fiber is necessary. For this sort of solder, an additive agent such as Zn, Sb, Al, Ti, Si, or Cu is added to a Pb—Sn alloy, so that the effective bonding in the presence of oxygen can be made possible.

In this case, a compounding ratio of the additive agent to solder is 0.01–5 parts by weight per 100 parts by weight of solder, and more preferably 0.05–1.5 parts by weight. As suitable solder for use, for example, "Serasoruza W" (manufactured by Asahi Garasu Inc.) is preferable. If the compounding ratio of the additive agent is less than 0.01 parts by weight, the bond strength to the glass is insufficient, and if it exceeds 5 parts by weight, the characteristics of the solder are lost and the junction strength is not improved.

The constructed optical fiber array is fixed to, e.g., an LD module with solder. In the case of the complete hermetic sealing, the method selected for sealing a gap between a sleeve plate and optical fibers is important.

Figure 8:
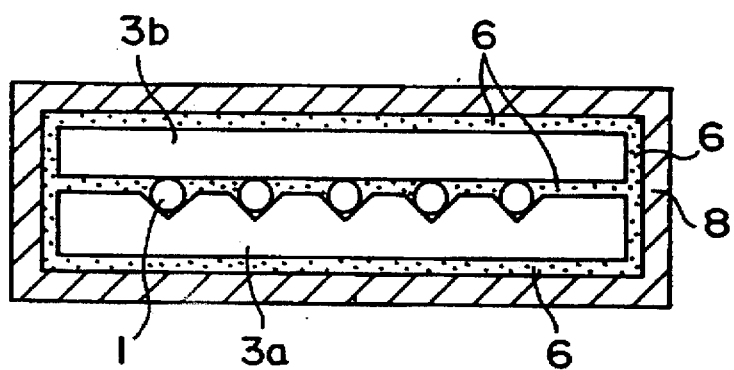
FIG. 8 is a cross sectional view along the lines A—A' in FIG. 7.
Figure 9:
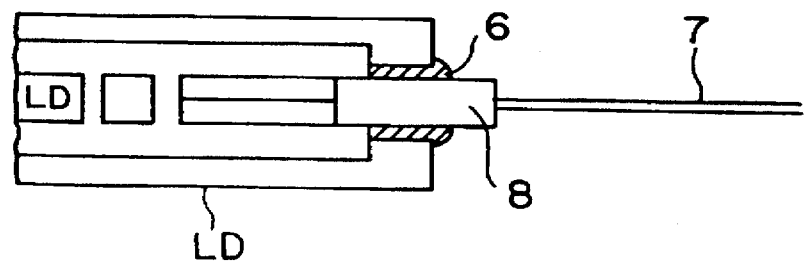
FIG. 9 is a schematic view showing a state of an optical fiber array fixed to an LD module.

As shown in FIG. 7 and FIG. 8, when the optical fiber array is designed so that the solder 6 injected from a region proximal to one (the first) ends of the optical fibers 1 is circulated to this gap, the cross section along the lines A—A' is completely and hermetically sealed. In the case of fixing the optical fiber array to the LD module (LD), as shown in FIG. 9, the periphery of the sleeve 8 is fixed to the LD module with the solder 6 in an airtightness state. Thus, the whole body can be hermetically sealed.

The adhesive 10 also needs to have a sufficient heat resistance property. An adhesive 10 that has a weight loss of more than 1% when heated at 260° C. for 10 seconds, may adhere to an LD lens in the module, which may cause degradation. Therefore, an adhesive which has a weight loss of 1% or below when heated at 260° C. for 10 seconds, e.g., epoxy adhesive, is desirable.

Figure 13:
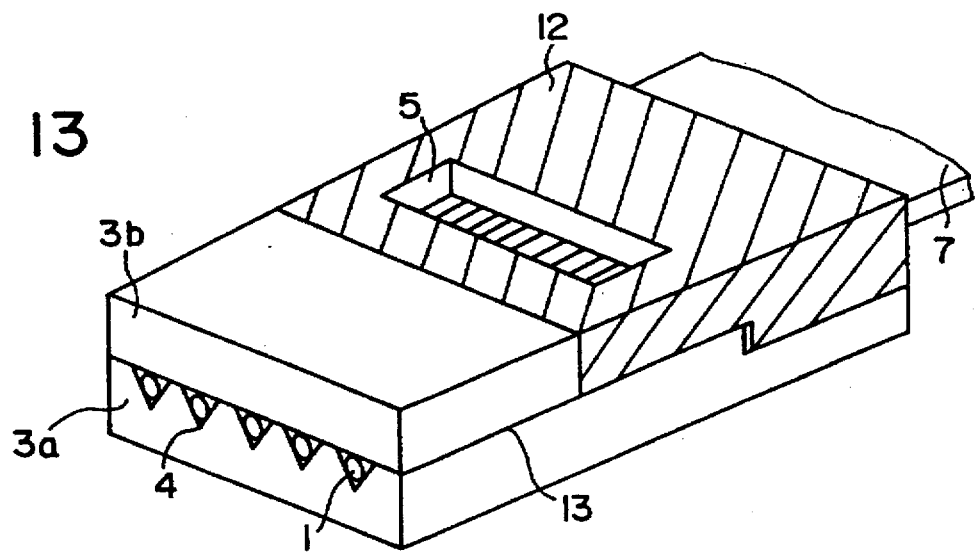
FIG. 13 is a perspective view showing an end of another optical fiber array.
Figure 14A:
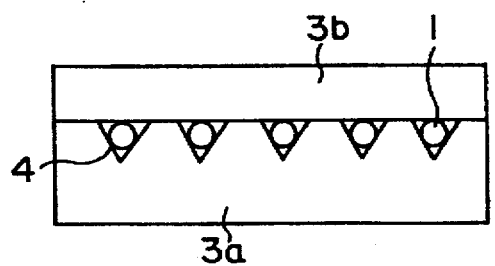
FIG. 14A–FIG. 14D are views showing an example of a configuration of V-shaped grooves in each anode-coupled optical fiber array.
Figure 14B:
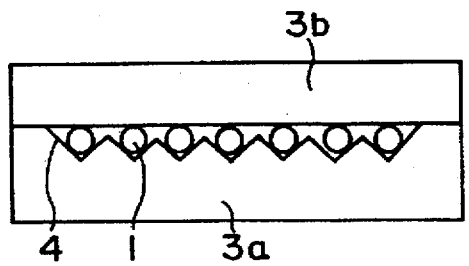
Figure 14C:
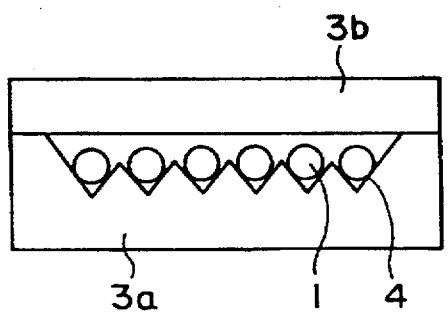
Figure 14D:
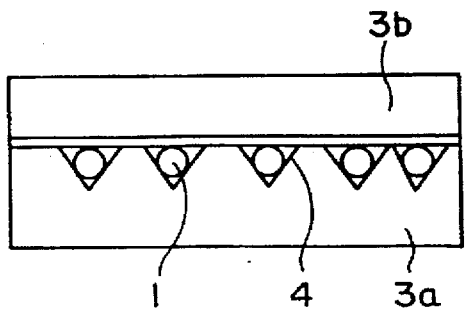

The structure of the optical fiber array is basically classified into a sandwich type shown in FIG. 11 and an anode coupling type shown in FIG. 13.

The sandwich type has a structure in which the optical fibers 1 are sandwiched between the lower and upper plates 3a and 3c having V-shaped grooves as shown in FIG. 11. In this case, at least one side of the inner surface of the V-shaped grooves, which grooves hold the optical fibers 1, may preferably have a curved surface having a radius R of curvature (hereinafter called R-surface). In this case, the same effect can be expected whether both sides of the inner surface of the V-shaped grooves have the R-surface, or one side of the inner surface of the V-shaped grooves has the R-surface and the other side thereof has the flat surface.

The sleeve 8 can be formed as a square sleeve type elastic sleeve 9a or a press type elastic sleeve 9b as shown in FIG. 10A and FIG. 10B, respectively. Note that it is preferable that the sleeves 8, 9a and 9b be made of amber alloy. Thus, pressing the optical fiber module externally with the sleeves 9a and 9b which are made of amber alloy makes the assembly of the optical fibers easier.

The amber alloy is Ni—Fe alloy. For example, for 42% Ni, a coefficient of thermal expansion is small: $4.4 \times 10^{-6}$ (30°–300° C.), and for 36% Ni, a coefficient of thermal expansion can be decreased to about $2.0 \times 10^{-6}$, so that it has an advantage that the optical fiber array is hardly transformed when it is fixed to the optical module even though the heat is applied thereto.

Figure 12A:
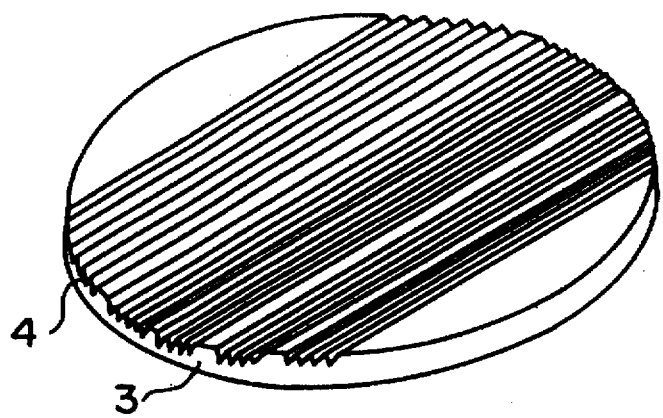
FIG. 12A–FIG. 12C are views showing a method of processing a Si wafer constituting upper and lower plates.
Figure 12B:
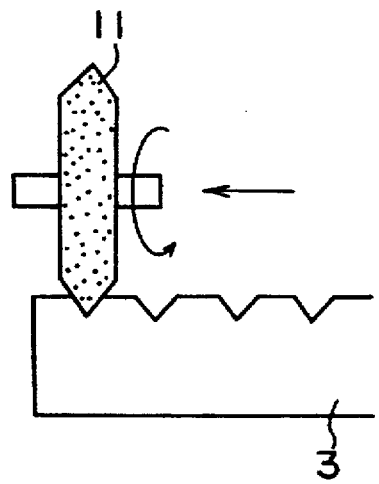
Figure 12C:
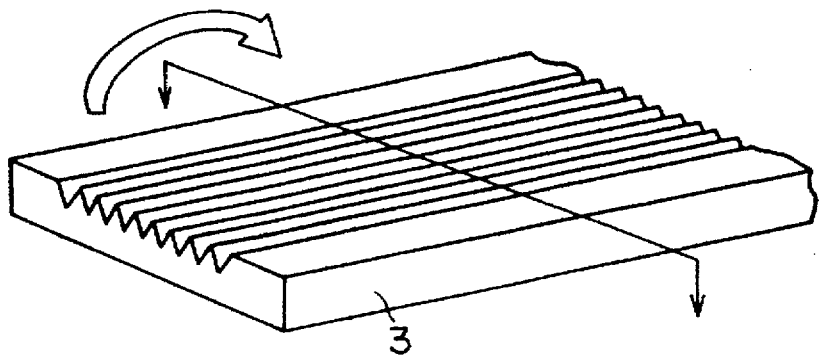

Furthermore, as shown in FIG. 12A–FIG. 12C, the silicon wafer 3 is ground using a diamond blade to form the V-shaped grooves 4 having bases of R-surfaces of 5 μm or above.

Consequently, a "crack" which is caused by the stress concentration and which frequently occurs in V-shaped grooves which are formed by the conventional etching can be prevented. Processing a silicon wafer 3 to form V-shaped grooves 4 using a V-shaped diamond blade 11 is shown in FIG. 12B. After the V-shaped grooves 4 are formed, as shown in FIG. 12C, the silicon wafer 3 is divided into two parts, and their surfaces on which the V-shaped grooves are formed are put together to define lower and upper plates 3a and 3c. The optical fibers can be positioned with equal spacing with high precision using thus constructed lower and upper plates 3a and 3c.

The appearance of the anode bonding type optical fiber array is shown in FIG. 13.

The anode coupling bonds a lower plate 3a made of a silicon wafer with an upper plate 3b made of glass such as Pyrex glass or aminosilicate glass or made of glass deposited Si, and is accomplished by putting the lower and upper plates together, heating at about 400° C. and applying 1000V. This bonding can integrate the lower and upper plates 3a and 3b entirely, so that hermetic sealing at side surface can be perfect.

Na ions in the upper plate 3b of glass are transferred in an electric field, and Si—O bonding generates. Si and Si can be bonded at a low voltage of 50–60V if at least one Si plate on which thin glass is vapor-deposited is used. In this case, the optical fibers 1 can be inserted after the lower and upper plates 3a and 3b are anode-coupled, which improves the work efficiency. Various structures of V-shaped grooves of the anode coupling type optical fiber array are illustrated in FIGS. 14A–14D.

The observation of the solder filling condition can be improved since the upper plate 3b of glass is transparent. Moreover, the confirmation of positions of SM (single mode) optical fibers 16 with GI (graded index) optical fibers 15 shown in FIG. 15A and FIG. 15b can also be made easier.

Ni—Fe amber alloy is preferably used in a part of the fixing region (positioning region) for the optical fiber ribbon part as well as the array plate which forms the guide grooves for the optical fibers. If Ni—Fe amber alloy is not used in a part of the fixing region for the optical fiber ribbon part, problems associated with thermal transformation and distortion may arise. Further, an amber alloy plate, and the upper and lower plates are preferably formed to sandwich the ribbon part 7 of the optical fiber line. This embodiment is superior in rigidity in comparison to conventional designs.

Further, reliability is enhanced when amber alloy is used to prepare the square type sleeve and a part of the upper and lower plates which hold the optical fibers is inserted into the amber alloy sleeve.

Figure 15A:
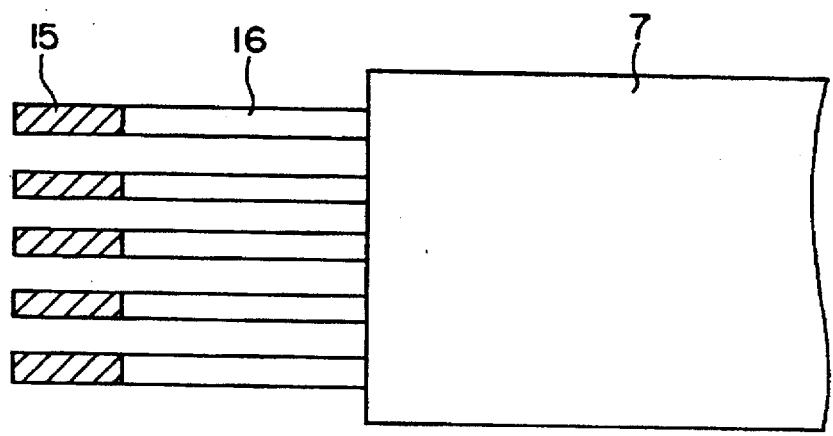
FIG. 15A is a plane view showing a refractive index distribution type optical fiber array and FIG. 15B is its sectional view.
Figure 15B:
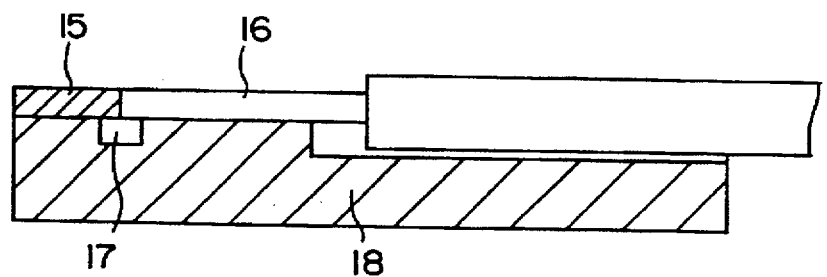

Conventionally, because a SELFOC lens (trade name: manufactured by Nippon Itagarasu company) was used for condensing light when the optical fiber array was aligned and coupled to an LD array module, two stages of alignment, which are alignment and fixation of the LD with the SELFOC lens and alignment and fixation of the SELFOC lens with the optical fiber array, were performed. Consequently, alignment was complicated, which raised cost, and connection loss was increased. In the present embodiment, as shown in FIG. 15A and FIG. 15B, when SM optical fibers 16 to which GI optical fibers 15 having a certain length are fused are used in the optical fiber array, the optical processing operation, such as conversion of NA (numerical aperture), or an optical collimating system, can be built-in the optical fiber array.

The GI optical fibers 15 and the SM optical fibers 16 are self-aligned when they are coupled to each other. The outer diameter is preferably equal, but a difference of 20–30% will not create a problem because the self-alignment of glass acts upon the difference.

It is preferable to use carbon coated optical fibers in a view of their reliability. In this case, the coupled parts of the GI optical fibers 15 and the SM optical fibers 16 can easily be distinguished by removing carbon with heat when the parts are coupled. In this manner the automatic cutting and polishing system in which the image processing is used can be made easier.

An or a core diameter of the GI optical fiber 16 is set in accordance with an object. The core material may also be used up to the outer circumference.

High precision positioning is easily performed if a recess part is formed in a guide groove (enlarged V-shaped groove part) 17 as shown in FIG. 15B and is desirable since the outer diameter of the coupled part is frequently varied on the submicron order. The guide groove 17 may be expanded over the SM optical fiber 16. Only the GI optical fiber 15 may be precisely positioned.

It should be noted that optical fiber positioning also can be carried out in a multifiber optical connector or other devices; however, the above-described embodiment is directed to the permanent fixation and the hermetic sealing in an alignment state, which is completely different from the conventional multifiber optical connector.

Working example

A silicon wafer was processed to form V-shaped grooves with a diamond blade, and the sandwich type and the anode coupling type array plates were formed. The V-shaped grooves were processed with the eccentricity of ±0.3 μm.

A housing for each type array plate was formed using amber alloy, and optical fibers 1 were fixed at their ends over a length about 4 mm with solder which was a Sb—Pb alloy containing Zn, Sb, Al, Ti, or others, and a ribbon part 7 was fixed by injecting the epoxy heat-resistant adhesive (amount of gas generation was 0.1% when heated at 260° C. for 10 seconds) from a window part 5 (see FIG. 11).

The optical fibers were 18-optical fibers which were coated by carbon, and a spacing between the fibers was 250 μm. The optical fibers which had a 125±0.3 μm outer diameter and the eccentricity of core within 0.3 μm were used. After assembled, referring the first fiber and the 18th fiber as references, the eccentricity of the other optical fibers was measured. The eccentricity was suppressed all within 1.0 μm: the average was 0.4 μm and the maximum was 0.8 μm.

For the anode-bonding type, a silicon wafer and a Pyrex glass were coupled at 400° C. and 1000V. For the sandwich type, a base R of the V-shaped groove was processed to 20 μm, so that no array plates were broken during impact testing or handling.

The following advantages can be attributed to this structure of the optical fiber array.

First, V-shaped grooves in which R-surfaces are formed are used to prevent a silicon wafer from cracking, and to achieve an optical fiber array which can be mass-produced. Further, hermetic sealing can be achieved since solder is used in fixation. Furthermore, thermal transformation can be reduced by utilizing amber alloy. An optical fiber array with a built-in lens is formed, so that a process of aligning an optical fiber array with a conventional LD module can be completed in one stage. Carbon coated fibers are used to obtain an optical fiber array with high reliability. In an anode-coupling type optical fiber array, side hermetic sealing is ensured and a structure which is hardly transformed by heat can be achieved. A sandwich array is pressed by an amber alloy housing, so that the installation of the optical fibers is made easier.

Embodiment 2

Figure 16A:
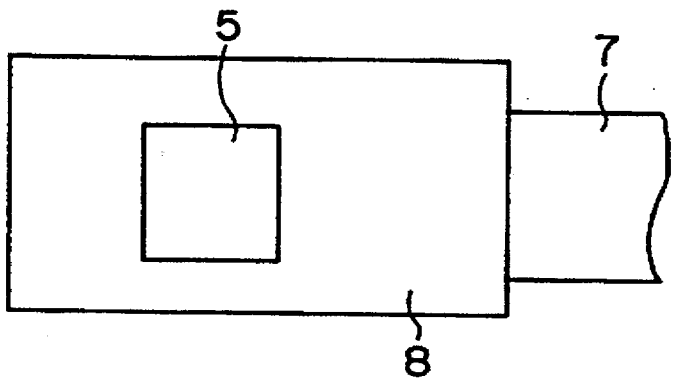
FIG. 16A is a plane view showing a configuration of in optical fiber array.
Figure 16B:
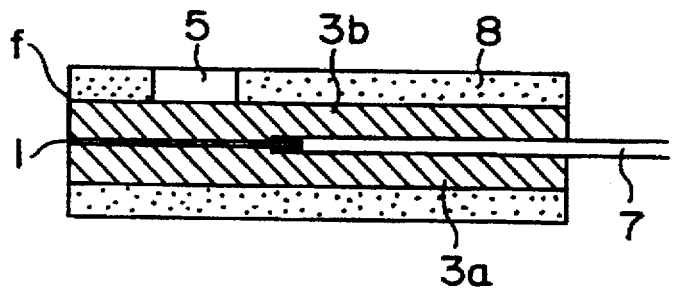
FIG. 16B is a vertical cross-sectional view showing an internal configuration of an optical fiber array.
Figure 16C:
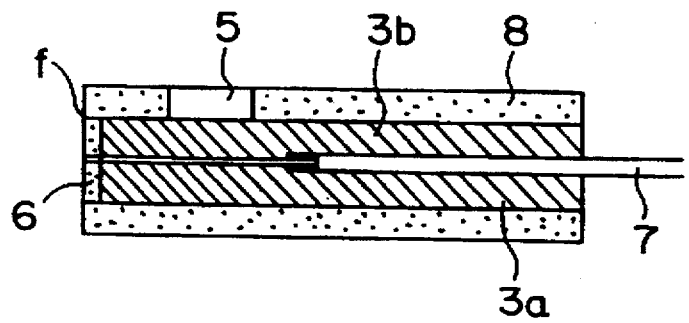
FIG. 16C is a vertical cross-sectional view showing another internal configuration of an optical fiber array.

FIG. 16A–FIG. 16C show the basic structure or a sandwich type optical fiber array according to the present embodiment. Components that are the same as those discussed in connection with embodiment 1 are represented by the same reference numerals.

In FIG. 16A–FIG. 16C, optical fibers 1 are clamped between lower and upper plates 3a and 3b, sandwich the fibers. The optical fibers 1 and the lower and upper plates 3a and 3b are sealed to the inside of a metal sleeve 8 by solder.

The reference numeral 5 is a window part (opening) provided at a proper position of the sleeve 8, and the upper plate 3b placed inside the sleeve 8 can be pressed with a clamp member such as a plate spring through the window part 5.

One end face of the metal sleeve 8 at an optical coupling end face of the optical fiber array is polished so as to be arranged in the same plane as the end face of the optical fiber array. With such structure, the polished face f of the sleeve 8 is suitable as a confronting face when the optical fiber array is aligned and fixed to other parts of the parallel transmission optical module, e.g., an LD array or a lens array.

Figure 17:
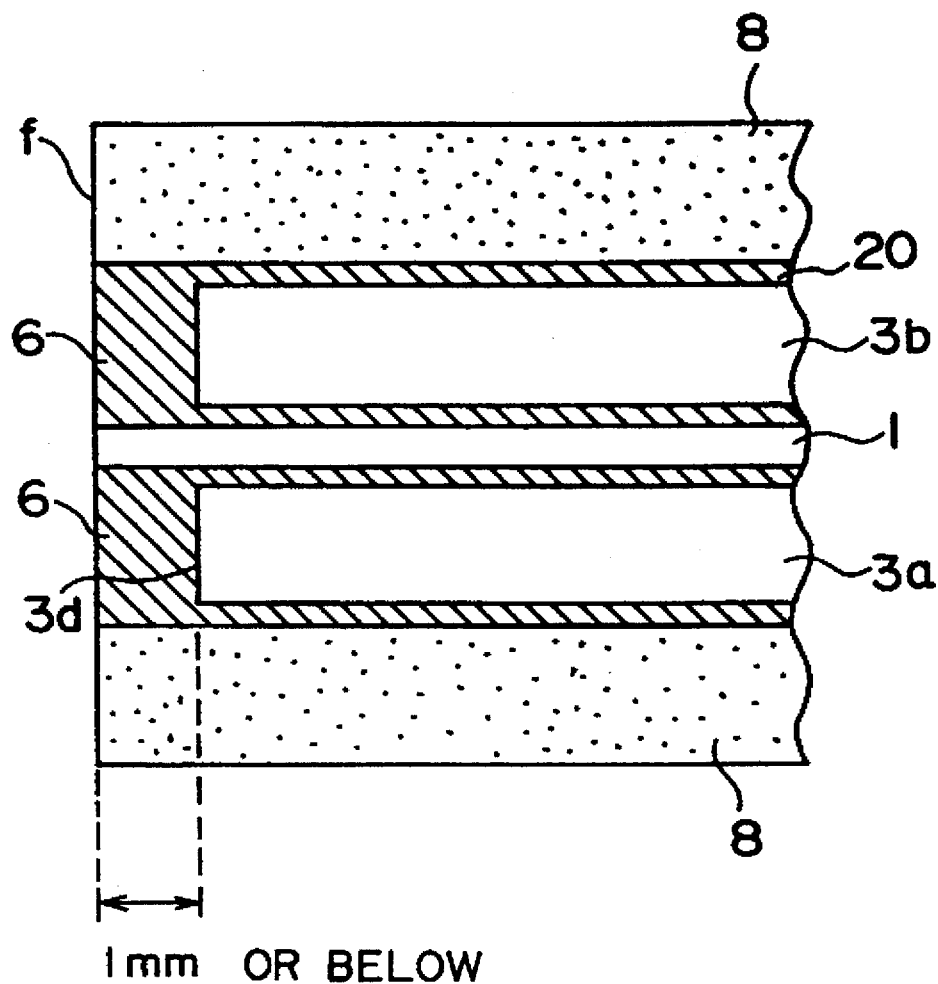
FIG. 17 is a view showing a configuration of an enlarged end of an optical fiber array.

As shown in an enlarged version of FIG. 17, if respective end faces 3d of the lower and upper plates 3a and 3b are positioned inside of the polished face, and solder 6 is filled at the end of the sleeve 8, the hermetic sealing is made perfect.

In this case, as shown in FIG. 17, a gap between the polished face f and the lower and upper plates 3a and 3b is hermetically sealed by an airtight sealing part 20 such as solder or low melting point glass, and at the same time, the solder 6 also seals a gap between the lower and upper plates 3a and 3b, and the sleeve 8.

The distance between the polished face f and the end faces 3d of the upper and lower plates, that is, an amount of pulling-in, need only define a gap sufficiently large for filling solder or adhesive. Preferably, the distance does not exceed 1 mm in order to maintain the accuracy of optical fiber disposition.

It is preferable that at least one of the lower and upper plates 3a and 3b which are optical fiber positioning members has V-shaped grooves.

The upper plate 3b may be made of a transparent member whereby observation of the solder filling condition can be improved. Moreover, confirmation of the position of the optical fibers 1 can be made easier.

The lower and upper plates 3a and 3b may be formed by bonding two array plates which have V-shaped grooves, and forming guide holes (not shown) in the lower and upper plates 3a and 3b to insert and position the optical fibers 1. For the structure of the V-shaped grooves, the V-shaped grooves preferably have bases of R-surfaces as described in the embodiment 1, and more particularly, the R-surface preferably has a radius of curvature of 5 µm or above.

In this embodiment, the optical fiber array may be constructed so that a plane spring, e.g., made of amber alloy, presses optical fibers through the window part 5 provided in the sleeve 8. Consequently, the assembly of the optical fiber array is made even easier.

Figure 18A:
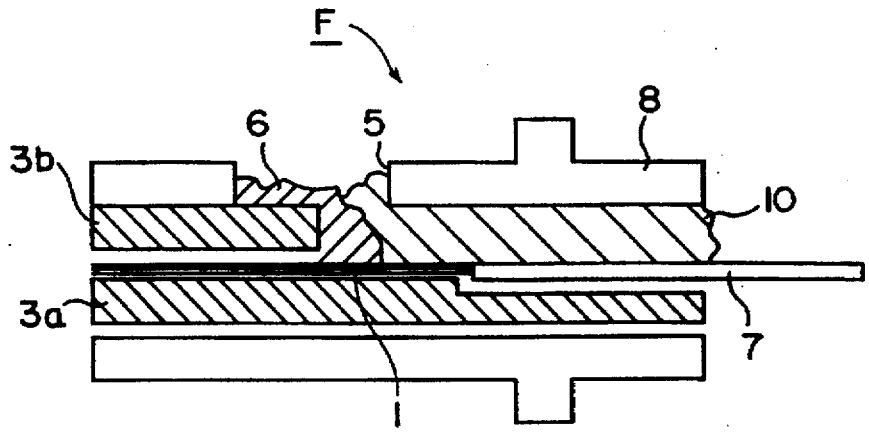
FIG. 18A is a vertical cross-sectional view showing a hermetically sealed optical fiber array.
Figure 18B:
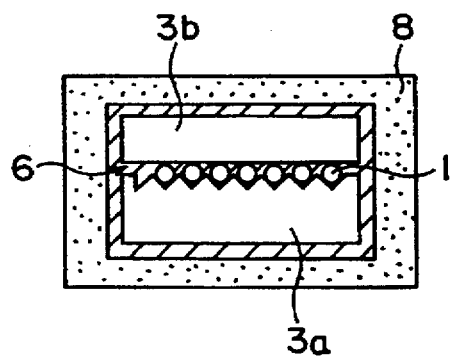
FIG. 18B is a view showing its end face.
Figure 18C:
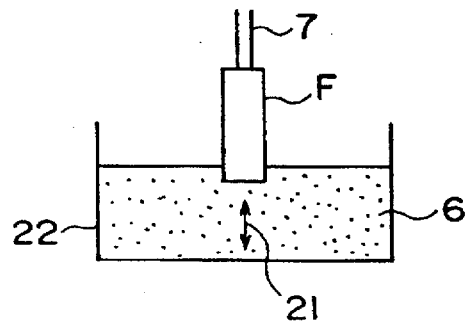
FIG. 18C is a view showing a method of filling solder from an end of an optical fiber array while ultrasonic oscillation is applied.

FIG. 18A–FIG. 18C are schematic views showing a method of hermetically sealing optical fibers with solder. It is preferable that solder 6 is only used to fix the glass parts of the optical fibers 1 because the solder 6 melts the ribbon part 7 of the coated optical fibers 1, thereby causing a large amount of gas to generate.

As shown in FIG. 18C, it is preferable that the solder 6 is fed from a position at the ends of the optical fibers 1 while ultrasonic oscillation 21 is applied. In particular, ultrasonic oscillation 21 by an ultrasonic oscillator (not shown) is applied to the solder 6 in a solder bath 22, which is heated to a temperature suitable for sealing (that is, a temperature at which the solder is viscous so as to fill in a gap between the optical fibers 1 and the lower and upper plates 3a and 3b). It is desirable that an end of an optical fiber array F be inserted in the solder bath 22 to circulate the solder into the gap.

Further, it is desirable that as shown in FIG. 18B, a gap be formed between the optical fiber array F and the sleeve 8 to circulate the solder 6 sufficiently for perfect hermetic sealing when the optical fiber array F is connected with the sleeve 8 by solder.

In order to prevent an optical fiber surface from cracking or breaking, the optical fiber 1 is preferably coated by carbon or other material in advance.

For the solder material, it is preferable that the additive agent such as Zn, Sb, Al, Ti, Si or Cu be added to a general Pb—Sn alloy.

For the heat resistant adhesive 10, the adhesive in which an amount of gas generation is 1% or less by weight when heated at 260° C. for 10 seconds is desirable, e.g., epoxy adhesive.

The material of the lower and upper plates 3a and 3b is preferably silicon, glass or ceramic, or any combination of these.

Figure 19A:
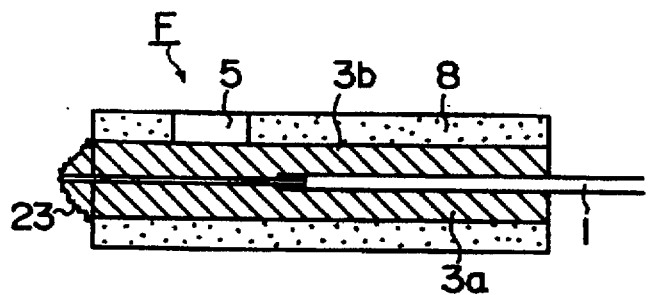
FIG. 19A is a view showing a protuberance formed by soldering at an end of an optical fiber array.
Figure 19B:
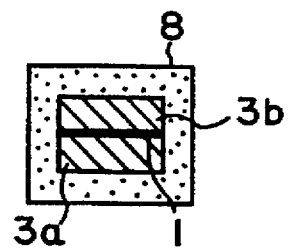
FIG. 19B is a view showing polished and planar end face of an array.

FIG. 19A and FIG. 19B are schematic views showing a method of forming an optical coupling end face to allow coupling of an optical fiber array F with another optical module.

As shown in FIG. 19A, a protuberance 23 is formed by applying solder or adhesive. Thereafter, as shown in FIG. 19B, one end face of the protuberance 23 is polished so that the end face of the sleeve 8 and the end faces of the optical fibers 1 are arranged in the same plane. As a result, solder or adhesive is exposed at the end face after polishing, which thus provides an airtight structure.

Figure 20:
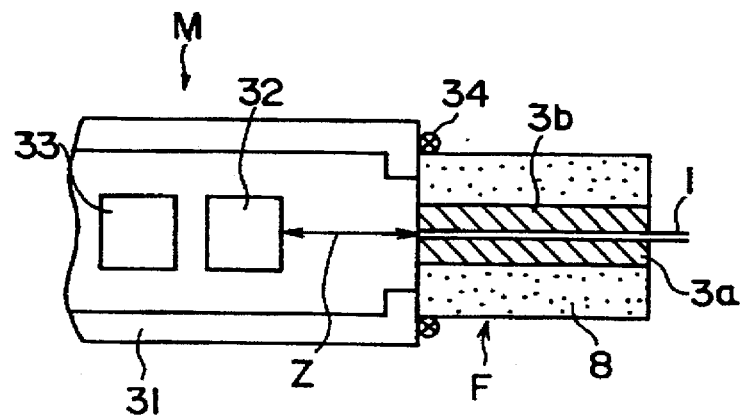
FIG. 20 is a view showing an optical fiber array bonded to a parallel transmission module.

FIG. 20 is a schematic view showing a method of bonding an optical fiber array F with a parallel optical transmission module M. The optical fiber array F needs to be bonded with the parallel optical transmission module M to define a certain gap (Z). In this instance, a case 31 is provided at the exterior of the optical module M, and the optical fiber array F is bonded to this case 31. In particular, it is preferable that one end face of the case 31 and the optical fiber array F are bonded at a part denoted by the reference numeral 34 with solder or YAG laser welding. In FIG. 20, the end face of the case 31 and the end face of the optical fiber array F make a reference plane. Note that in FIG. 20, the reference numerals 32 and 33 denote a lens array and an LD array, respectively.

Figure 21:
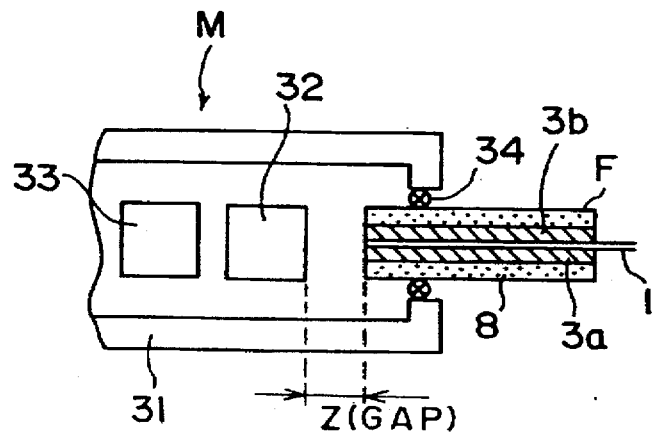
FIG. 21 is a view showing its conventional state.

On the other hand, FIG. 21 shows a conventional method in which an optical fiber array F is inserted into one end face of the case 31 and sealed. In this instance, XYZ alignment is required.

Note that the metal sleeve 8 is preferably made of amber alloy.

Working example

A silicon wafer was processed to form V-shaped grooves with a diamond blade, and a sandwich type array plate was formed. The V-shaped grooves were processed with the eccentricity of ±0.3 µm.

A sleeve 8 was formed using amber alloy, and optical fibers 1 were fixed with solder which was an Sb—Pb alloy containing Zn, Sb, Al, Ti, or others at fiber end portions of about 4 mm, and the other parts of the optical fibers were fixed with epoxy heat-resistant adhesive (an amount of gas generation was 0.1% when heated at 260° C.×10 seconds) by injection from a window part 5 (see FIG. 16B). The fixed optical fiber line had 18-optical fibers which were coated by carbon, and a spacing between the fibers was 250 μm. The optical fibers had a 125±0.3 μm outer diameter and an eccentricity of core within 0.3 μm. After being assembled, referring to the first fiber and the 18th fiber as references, the eccentricity of the other optical fibers was measured. The eccentricity was suppressed all within 1.0 μm: the average was 0.4 μm and the maximum of 0.8 μm.

Next, as shown in FIG. 19A, solder was applied to one end face of the optical fiber array F to form a protuberance 23. Thereafter, the end face of the protuberance 23 was polished so that the end face of the optical fiber array F and the end face of the sleeve 8 were arranged in the same plane, and then the array F was connected to the optical part of the optical module.

Further, a case 31 which protected an optical module M and the sleeve 8 which coated the optical fiber array F were welded by a YAG laser to be integrated. In this instance, the sleeve 8 was bonded with the case 31 to define a certain gap Z (20 μm) to the optical parts, such as a lens array 32 of the optical module.

An advantage of polishing the end face of the sleeve 8 and the end face of the optical fiber array F at the same time is that it did not require the parallel transfer in a longitudinal direction and the alignment in a rotating direction of two axes perpendicularly intersecting in a longitudinal direction. Instead, only the alignment in X and Y directions and in X and Y planes was required. Further, the end faces were easily sealed with solder.

Embodiment 3

Figure 22A:
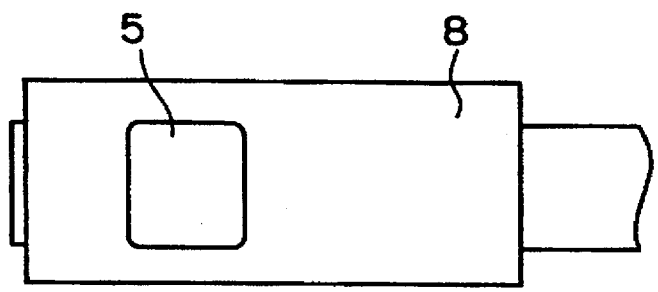
FIG. 22A is a plane view showing another configuration of an optical fiber array.
Figure 22B:
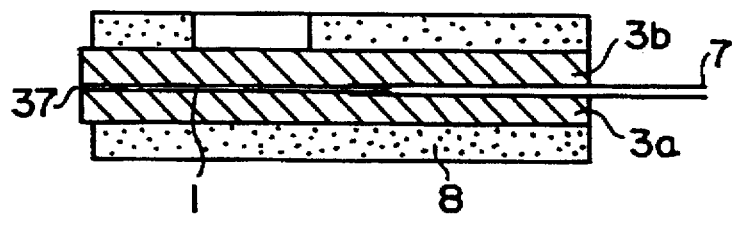
FIG. 22B is its vertical sectional view.
Figure 22C:
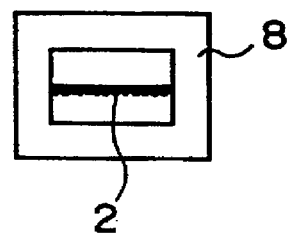
FIG. 22C is a view showing its end face.

Another embodiment is shown in FIG. 22A–FIG. 22C. Optical fibers 1 are inserted into V-shaped grooves 37 formed in lower and upper plates 3a and 3b, and the optical fibers 1 are clamped by the lower and upper plates 3a and 3b.

Figure 23A:
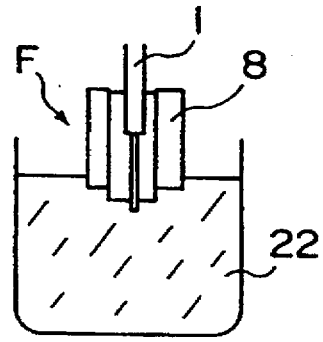
FIG. 23A is a view showing an end of an optical fiber array being soaked into a solder tub.

The optical fiber array F being soaked in a solder bath 22 is shown in FIG. 23A. As shown in FIG. 23A, with the fixed optical fibers, the optical fiber array F is soaked in the solder bath 22 to encompass the end of a sleeve 8, which easily seals the inside of the sleeve 8 entirely when the optical fiber array F is installed.

In particular, a distance between the end face of the optical fiber array F and the end of the sleeve 8 is preferably within 2 mm, which is preferred from an aspect of work efficiency.

In FIG. 23A, the sleeve 8 is located slightly behind the end face of the optical fiber array F and the optical fiber array F can be soaked up to the sleeve 8 and sealed, so that the sealing is ensured and is made easier. In the case of a step 8a being provided on the sleeve 8, the appropriate condition of solder adhesion is shown in FIG. 23B.

Figure 24A:
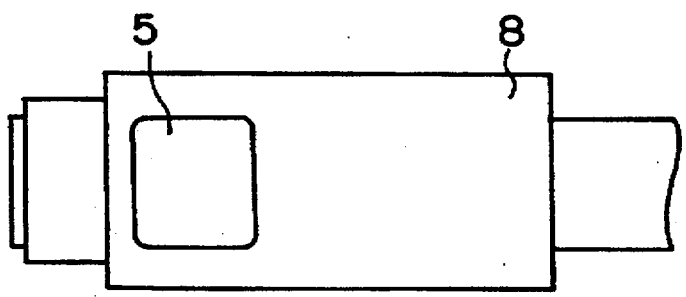
FIG. 24A is a plane view showing one example of a configuration of an optical fiber array.
Figure 24B:
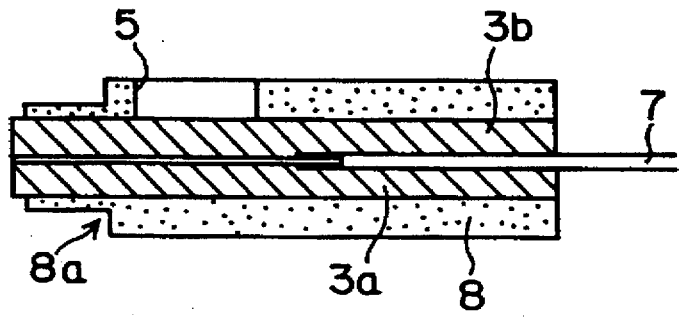
FIG. 24B is its vertical sectional view.
Figure 24C:
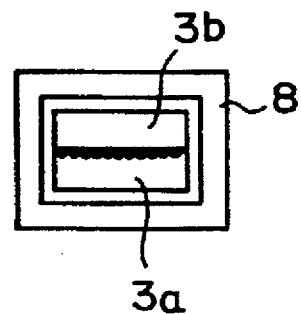
FIG. 24C is a view showing an end face of an optical fiber.

FIG. 24A–FIG. 24C show the structure of a sleeve 8 with a step 8a provided.

In FIG. 24A–FIG. 24C, the structure of an optical array, in which a sleeve 8 having a step 8a projecting 1 mm or more, or preferably 2 mm or more, from the end of the sleeve 8 and provided outside the lower and upper plates 3a and 3b, is shown.

Figure 23B:
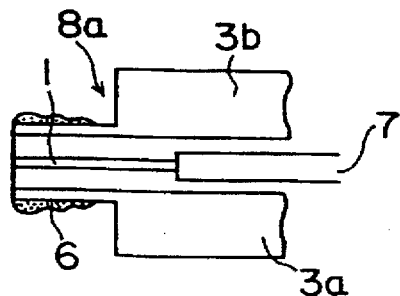
FIG. 23B is a view showing solder adhesion positioned in relation to a step provided on a sleeve.

Due to such structure, solder 6 adheres up to a part shown in FIG. 23B. Consequently, it has an advantage that there is no influence of solder near the end face when the optical fiber array is coupled to an optical device after the optical fiber array is set.

The material of the lower and upper plates 3a and 3b is preferably silicon, glass or ceramic, or a combination of these.

In this case, it is preferable that a window part 5 is also provided in the sleeve 8. The window part 5 is effective when the upper plate 3b or the lower plate 3a is pressed with a clamp member (not shown) such as a plane spring made of amber alloy.

The sleeve 8 serves as both a laser welding flange for sealing an optical fiber array and a flange for solder fixation, but the flange may be provided to another body other than the metal sleeve 8.

The preferred amber alloy for the sleeve 8 is Ni—Fe alloy. This alloy is advantageous in that its coefficient of thermal expansion is low, and that it is hardly transformed even while heat is applied when the optical fiber array is fixed to the optical module.

It is preferable that only glass parts of the optical fibers are fixed with solder and that coated parts of the optical fibers are fixed with heat resistant adhesive, since the coating of the optical fibers melts on contact with solder and generates a large quantity of gas.

Solder is easily injected if it is fed from an area proximal to the end of the optical fiber while ultrasonic oscillation is applied when the optical fiber is soaked in the solder bath. This process also is preferred from an aspect of airtightness.

Further, it is desirable that a gap is formed between the optical fiber array and the sleeve to circulate the solder sufficiently for achieving perfect hermetic sealing when the optical fiber array, and that the sleeve are bonded with solder.

The optical fibers 1 are preferably coated by carbon or other material in advance in order to prevent an optical fiber surface from cracking or breaking.

For the solder material, it is preferable that an additive agent such as Zn, Sb, Al, Ti, Si or Cu be added to a Pb—Su alloy.

One end face of the optical fiber needs to be polished. As a result, the solder is exposed and the airtight structure is achieved.

When the optical fiber array F is coupled to an optical device, an optical connector or others, the exterior of the optical module may include a case. In particular, the end face of the module array case and the optical fiber array can be coupled by solder fixation or YAG laser welding.

As described above, the sleeve 8 which is provided at the periphery of the optical fiber array is located slightly behind the end face of the optical fiber array, so that it can be easily soaked in the solder tab, and the airtight sealing can be perfect. Further, it is easily polished since the end face of the optical fiber array projects from the sleeve 8. Furthermore, it is another advantage that there is no influence from solder adhered near the end face of the optical array since the sleeve 8 has the step 8a.

Embodiment 4

The parallel transmission module according to the present embodiment will be explained with reference to the accompanying drawings.

There is shown a parallel transmission module comprising a light emitting device, a light receiving device, an optical fiber array and an external optical connector in FIG. 25A and FIG. 25B. The parallel transmission module mainly comprises a module body 51 and an optical fiber array 40 fixed at the module body 51.

The module body 51 comprises a laser diode 53 for emitting an optical signal, an IC 52 for driving the laser diode 53, and a lens system 54, which constitute an optical transmission system. This optical transmission system is arrayed in a plurality of rows in parallel in the module body 51, which performs the optical signal parallel transmission.

FIG. 26 only shows an enlarged optical fiber array 40. The optical fiber array 40 comprises a lower plate 41 in which a plurality of V-shaped grooves 43 are formed, and an upper plate 42 fixed on the lower plate 41. Glass parts of the optical fibers 44 which are not coated are positioned in the V-shaped grooves 43. The reference numeral 45 denotes a guide pin groove in which a guide pin is inserted.

Figure 27A:
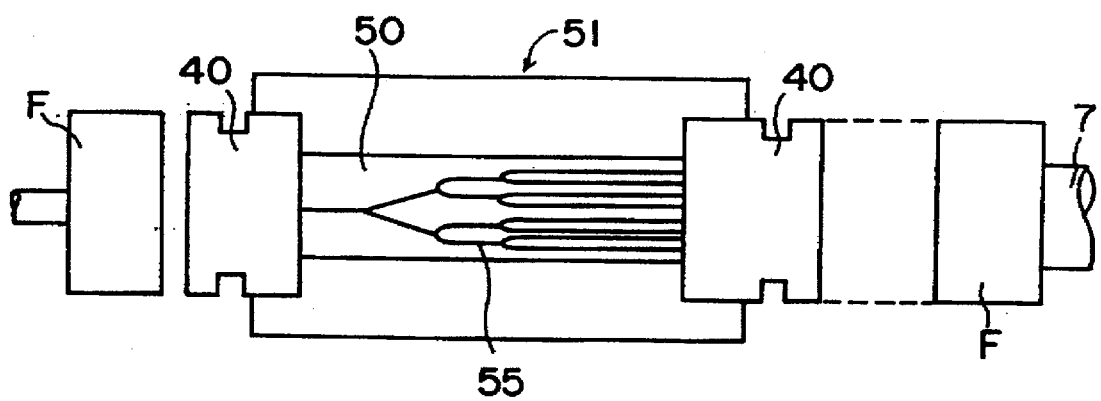
FIG. 27A is a plane view showing a parallel transmission module with a waveguide substrate.
Figure 27B:
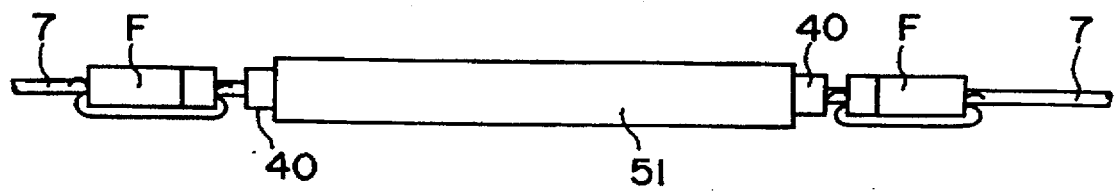
FIG. 27B is a side view showing a state in which the parallel transmission module is coupled.
Figure 28:
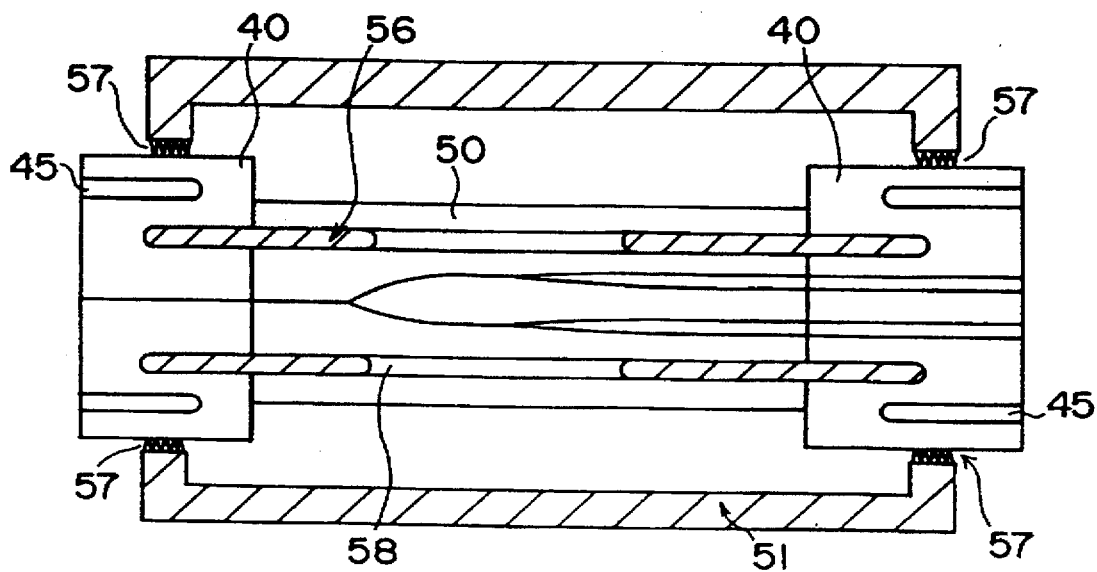
FIG. 28 is a plane view showing an optical fiber array coupled with a silica waveguide substrate by using a guide pin.

As shown in FIG. 27A and FIG. 27B, the module body 51 may comprise a waveguide substrate 50 on which a plurality of optical waveguides 55 are formed. In this instance, as shown in FIG. 28, a guide pin 56 may be used for coupling the waveguide substrate 50 with the optical fiber array 40, and the waveguide substrate 50 and the optical fiber array 40 may be fixed after an optical axis is aligned with adhesive. Further, the optical fiber array 40 may be fixed to the module body 51 (case) at parts denoted by the reference numeral 57 in a sealing state, using solder or a YAG laser. The adhesive which has the refractive index matching feature, e.g., ultraviolet harding type adhesive is used to fix the coupling faces of the optical fiber array 40 and the module body 51.

Figure 29A:
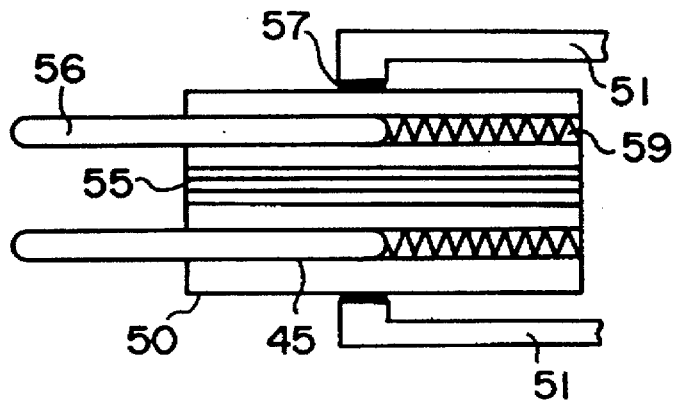
FIG. 29A–FIG. 29C are views showing a configuration of guide pin grooves.
Figure 29B:
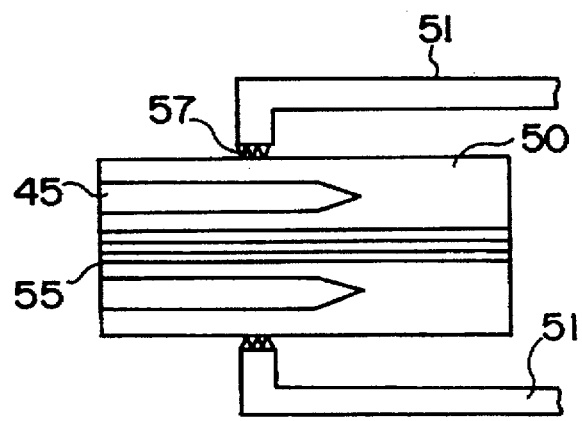
Figure 29C:
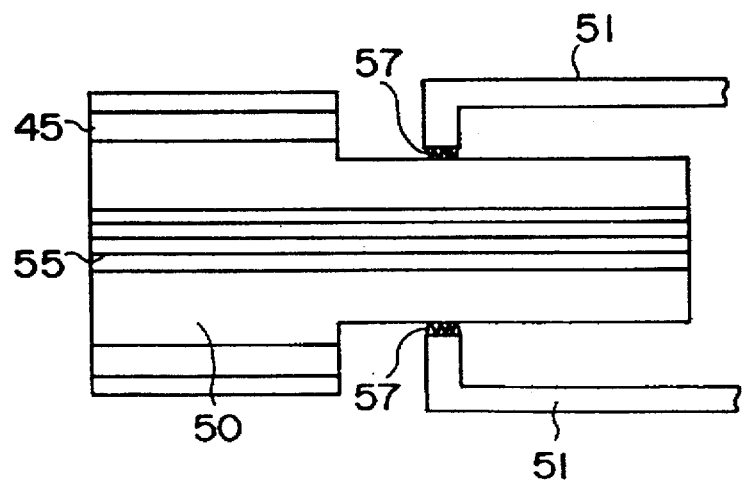

Further, as shown in FIG. 29A–FIG. 29C, an inner space of a guide pin groove 45 for coupling an optical connector may be sealed with solder 59 or others. In this example, the guide pin groove 45 is a through hole.

Figure 30A:
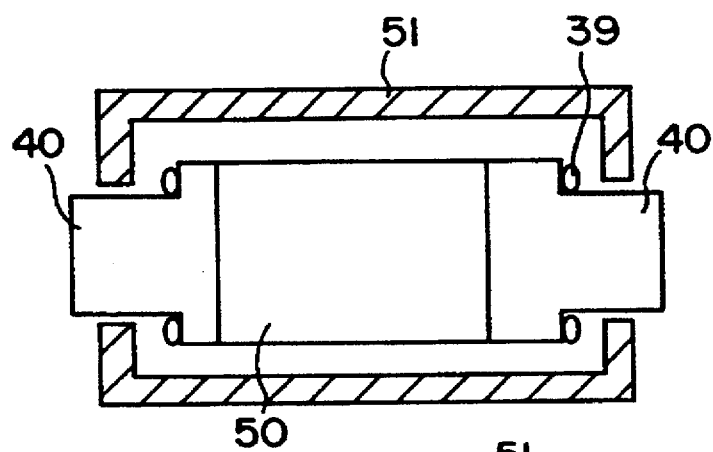
FIG. 30A is a plane view showing a state in which an optical fiber array and a parallel transmission module are fixed by a pressing member.
Figure 30B:
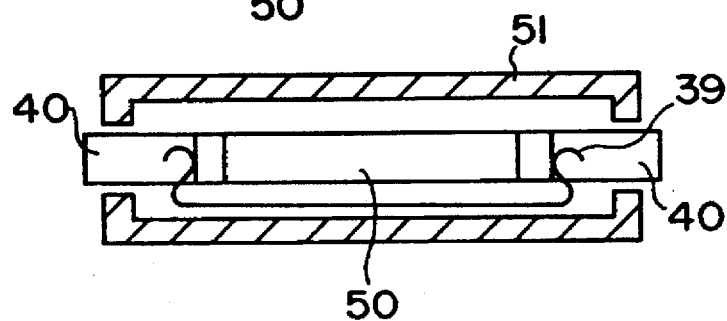
FIG. 30B is its side view.

As shown in FIG. 30A and FIG. 30B, if the optical fiber array 40 and the optical waveguide substrate 50 are pressed and fixed with clips 39 inside the case of the module body 51, reliability is further increased.

The optical fiber array 40 comprises a coupling housing 58a for coupling the parallel transmission module with another optical fiber module F at the periphery of the optical fiber array 40, as shown in FIG. 25A, which is referred to as a push-pull type. The coupling housing 58a is coupled with a coupling housing 58b of an optical connector comprising an optical fiber array F, thereby collectively defining one body (FIG. 25B).

Figure 31:
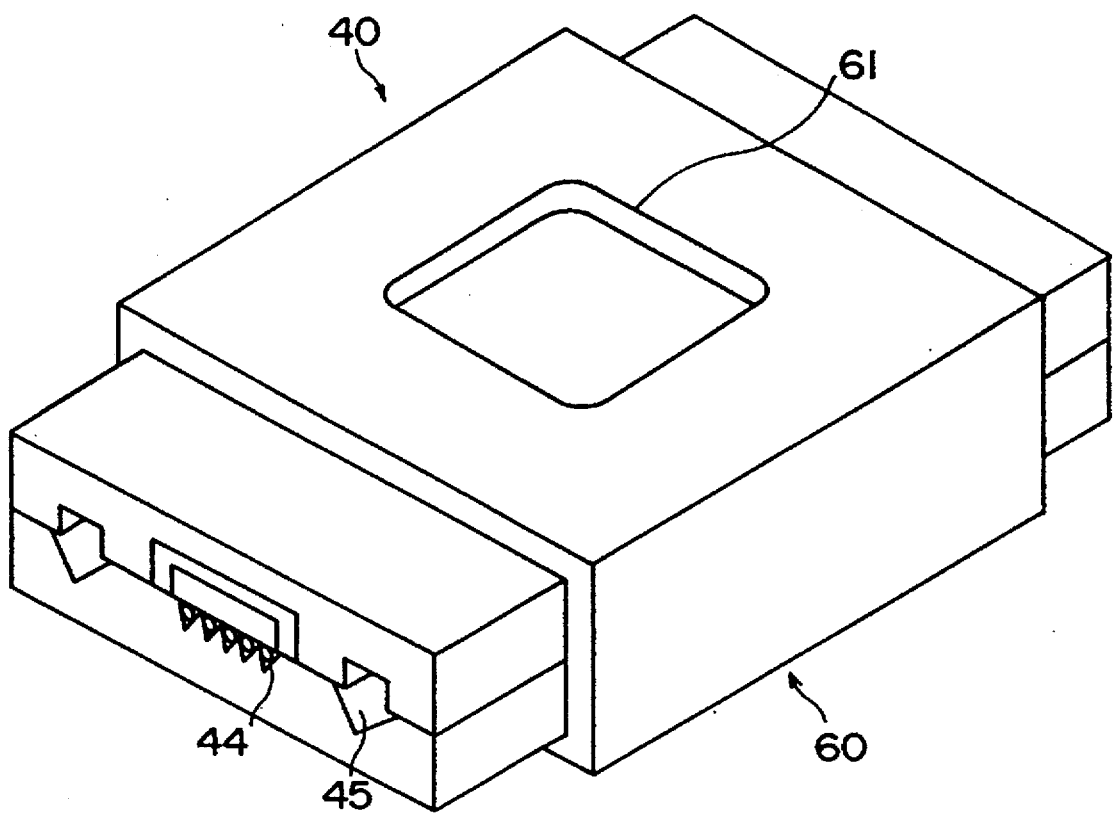
FIG. 31 is a perspective view showing an optical fiber array with a metal sleeve fixed.

Further, as shown in FIG. 31, a metal sleeve 60 may be placed at the periphery of the optical fiber array 40. The metal sleeve 60 is the same type as the sleeve 8 in the embodiment 1, and a window part 61 is formed at a central portion of the sleeve 8. In this instance, solder is filled in a gap between the metal sleeve 60 and the optical fiber array 40. The metal sleeve 60 may be square or round and may have a design corresponding to a module. The material of the metal sleeve 60 is preferably amber or covar, which have the same thermal expansion as that of the optical fiber array 40.

FIG. 27A and FIG. 27B show a typical example of coupling of a parallel transmission module with an optical connector. The waveguide substrate 50 comprises optical waveguides 55 of 1×8 branch and the optical array 40 is provided at both ends of the waveguides 55. An optical fiber array F of an external optical connector is coupled to the optical fiber array 40. As one example of the coupling, the optical fiber array 40 is coupled with the optical fiber array F of the external optical fiber array F by a clip, e.g., a plate spring clip 62.

FIG. 26 is a perspective view showing basic structure of the optical fiber array comprising guide pin grooves. In FIG. 26, guide pin grooves 45 are not required if there is another positioning means. A housing 58a, such as a push-pull type housing shown in FIG. 25A, may be provided outside of the optical fiber array 40. The guide pin grooves 45 may be processed individually from both sides as shown in FIG. 28, and the number of guide pin grooves does not have to be two positioned at the ends.

Figure 32:
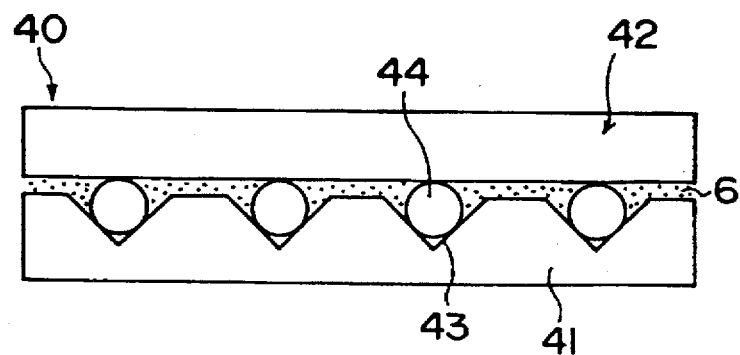
FIG. 32 is a view showing an enlarged part of one end of an optical fiber array.

FIG. 32 is a horizontal sectional view showing an example of an optical fiber array 40 which is put between lower and upper plates 41 and 42 and which is fixed and sealed with solder. That is, FIG. 32 illustrates the airtight sealing of the optical fiber array 40 which is achieved by putting the optical fibers 44 between the lower and upper plates 41 and 42, and fixing and sealing, e.g., with solder 6, for coupling glass. The optical fiber array 40 may be sealed and coupled using low melting point glass instead of the solder 6.

The solder used in the optical module can significantly enhance reliability control of the optical fiber array, the module or others, and it is preferable that solder is used only for fixation of glass parts of the optical fibers since coated parts of the optical fibers melt on contact with solder and generate a large quantity of gas.

Figure 33:
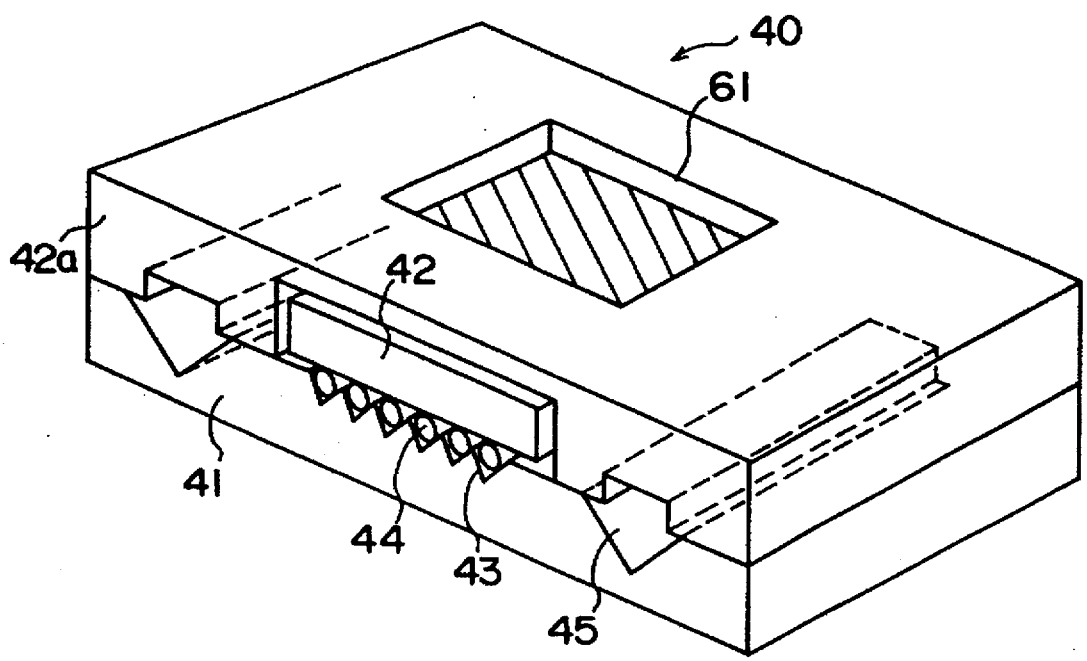
FIG. 33 is a perspective view showing a configuration of optical fibers fixed by pressing an independent upper plate.

The solder is preferably fed from the end of the optical fiber while ultrasonic oscillation is applied, and as shown in FIG. 33, for example, a window part 61 is preferably provided, because this location corresponds with the boundary between solder and adhesive. The advantage of providing such a window part 61 is that a gap spreads more at the window part, which prevents the solder from rising and which controls the optical fiber positioning.

The lower plate 41 is made of silicon and surfaces of the guide pin grooves 45 are oxide films, which are preferred for promoting coupling with the upper plate 42 and adherence with solder.

As shown in FIG. 33, the upper plate 42a on which the guide pin grooves 45 are formed is bonded with the lower plate 41, and the upper plate 42 receives a downward force by the upper plate 42a and thus presses on optical fibers 44.

It is desirable that the Young's modulus E of the upper plate 42 is less than or equal to that of the upper plate 42a and the lower plate 41. This is because the upper plate 42 is easily polished if the Young's modulus of the upper plate 42 is small when the end face is polished, thereby preventing the upper plate 42 from projecting from the end face.

Further, the airtight sealing (hermetic sealing) is achieved by using solder and low melting point glass to fix the optical fiber array 40 and the case of the module body 51.

In this instance, it is preferable to increase reliability of a metal coating or to deposit a carbon coating on the optical fibers 44 in order to ease the adhesive of solder.

In particular, the carbon coating can suppress the cracking on the optical fiber surface and the breaking of the optical fiber when the optical fiber is subjected to heat of 200° C. or above during solder fixation.

It is preferable that the solder selected be suitable for coupling of an optical fiber, for example, the solder to which the additive agent such as Zn, Sb, Al, Ti, Si or Cu is added. In this instance, a compounding ratio of the additive agent to solder is 0.01–5 parts by weight per 100 parts by weight of solder, and more preferably 0.05–1.5 parts by weight. If the compounding ratio of the additive agent is less than 0.01 parts by weight, the junction strength is insufficient for glass, and if it exceeds 5 parts by weight, the characteristics of solder itself is lost, and the junction strength does not improve.

The lower plate 41 and the upper plate 42a may be coupled together without adhesive but by anode coupling, or direct coupling; consequently, reliability of bonding (hermetic sealing) can be improved remarkably.

In the case of anode coupling, it is preferable that the lower plate 41 made of silicon or zirconium and the upper plate 42a made of glass such as aminosilicate glass, silicon, or silicon having a glass deposited film be piled up and bonded by applying 1000V at about 400° C.

The coupling method is not limited to anode coupling and direct coupling; rather, the bonding method can be arbitrarily employed, e.g., vapor deposition, as long as the same effects of direct sealing and the others are obtained. The direct coupling selected is selected to make a silicon surface that is specular and to permit heating to 1000° C. or above for coupling.

If the guide pin grooves 45 are provided, their sealing is a problem. There are shown the structures of the guide pin grooves having airtight sealing in FIG. 29A–FIG. 29C. Sealing of the inner part of the guide pin 56 with the solder 59 or YAG welding is illustrated in FIG. 29A.

The guide pin 56 is for initial alignment, and the alignment positioning is desirably set in the clearance range of the guide pin 56 and the guide pin hole.

FIG. 29B illustrates an embodiment in which the guide pin grooves 45 do not penetrate the inner parts of the upper and lower plates, which are bonded.

FIG. 29C illustrates an embodiment in which the guide pin grooves 45 penetrate the waveguide substrate 51 and are all located outside the case of the module body 51, such that airtight sealing of the optical fiber guide grooves and the guide pin grooves can be handled separately. As described above, the guide pin grooves 45 are preferably provided outside the module body. The optical fiber guide grooves (holes) and the guide pin grooves (holes) of the optical fiber array are processed on the same substrate; however, the optical fiber guide grooves and the guide pin grooves may be formed on different substrates. With such structure, 180° inverting coupling can be made possible.

There is shown an optical fiber array 40 provided with a window part 61 for applying pressure in FIG. 33. With such structure, the optical fibers 44 are pressed and fixed by the separate upper plate 42.

That is, the optical fiber array 40 comprises a separate (second) upper plate 42 in addition to the (first) upper plate 42a. Then, the adhesive is injected from the window part 61 to fill a gap between the separate upper plate 42 and the lower plate 41 with solder. It is natural that the lower and upper plates 41 and 42a may be bonded by anode coupling or direct coupling. It is preferable that the guide pin grooves 45 are sealed to enhance airtight sealing since the solder does not enter the guide pin grooves 45 when the solder is injected through the window part 61.

Figure 34:
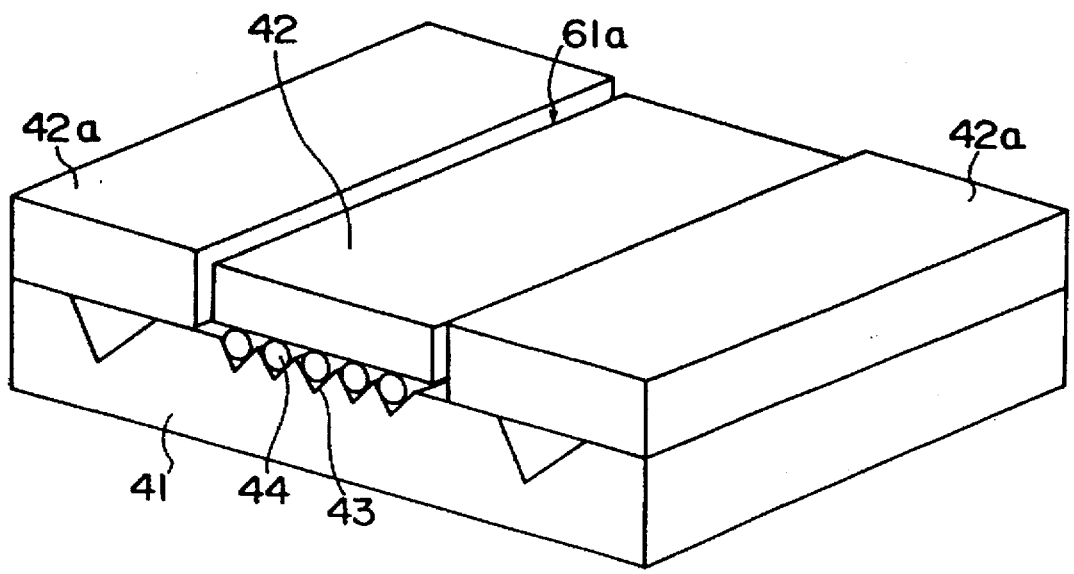
FIG. 34 is a perspective view showing an example of a modified configuration.

The alternative example of FIG. 33 is shown in FIG. 34. In FIG. 34, a slit-shaped opening 61a is provided as an alternative to the window part 61 of FIG. 33, and optical fibers are pushed and fixed with an upper plate 42.

In FIG. 33 and FIG. 34, the guide pin grooves 45 are processed along the width of the arrays to about the middle thereof and later are bonded and sealed. The sealing has the advantage of fixing the optical fibers without the solder flowing into the guide pin grooves 45 when the solder is injected (e.g., ultrasonic glass solder is injected) from the bonding and sealing side.

Optical fiber arrays with various MFD (mode field diameter) are illustrated in FIG. 35A–FIG. 35D. With this MFD, the allowance of decentering becomes wide and its adjustment becomes easier.

Figure 35A:
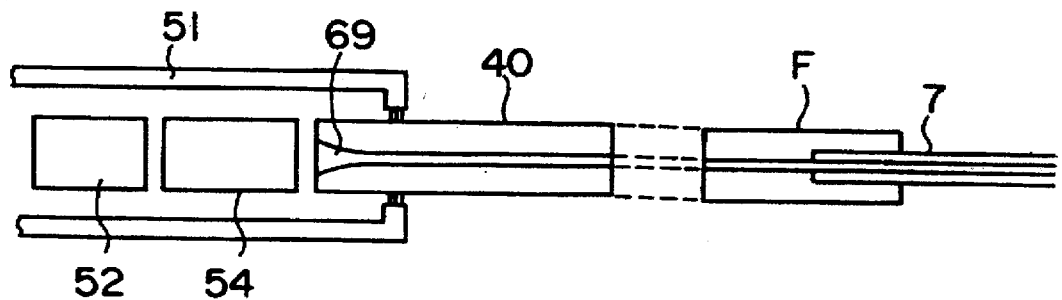
FIG. 35A–FIG. 35D are views showing configurations of various kinds of MFD.

FIG. 35A is a schematic view showing the MFD of the optical fiber array 40 on the module side being enlarged, which is referred to as an enlarged MFD 69.

In this instance, the MFD of the optical fiber array 40 on the module side preferably is enlarged 20% or above in comparison to the MFD of the standard single-mode optical fiber, and more preferably is enlarged 100%.

Accordingly, the MFD of the optical fiber array at both ends preferably is enlarged 12 μm or above, and more preferably is enlarged 19 μm.

Figure 35B:
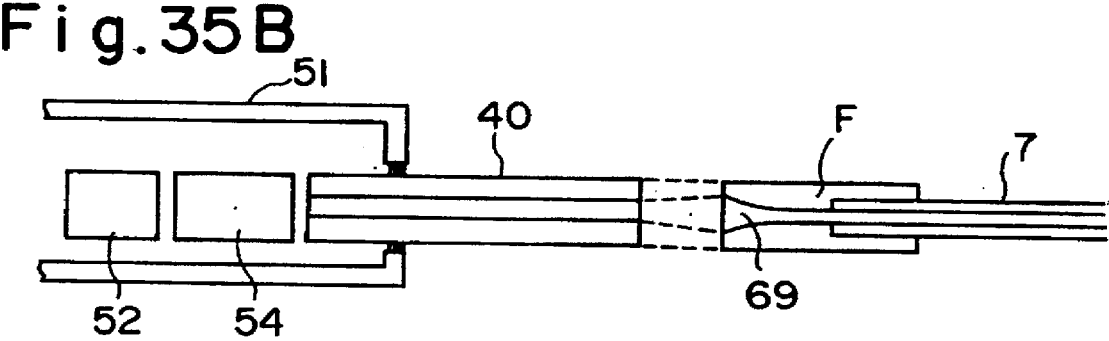

FIG. 35B is a schematic view showing a configuration in which the MFD of the optical fiber array 40 is made large and the MFD of the optical fiber array F on the optical connector side is converted.

Figure 35C:
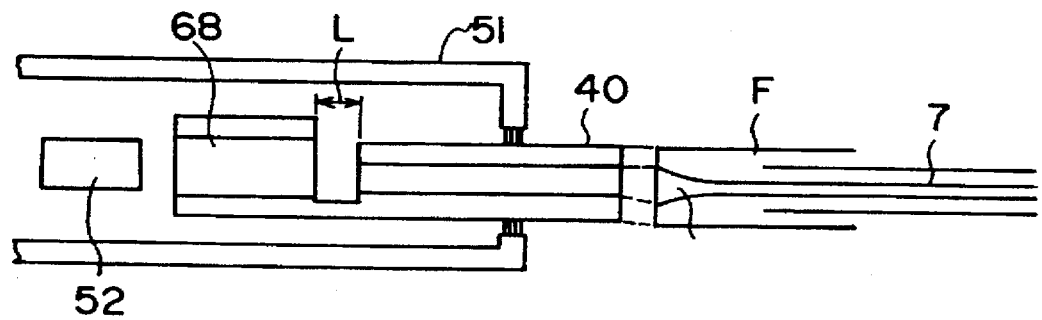

FIG. 35C is a schematic view showing a configuration in which a GI optical fiber 68 is set apart from the optical fiber array 40 by a certain length L (e.g., 0.8 mm), yet disposed on the same substrate, to add the operation of a condensing lens. The outer diameter of the GI optical fiber 68 is preferably similar to that of the SM fiber but may differ by ±50%. Further, a residual stress relaxation type is preferably used for the MFD conversion.

Figure 35D:
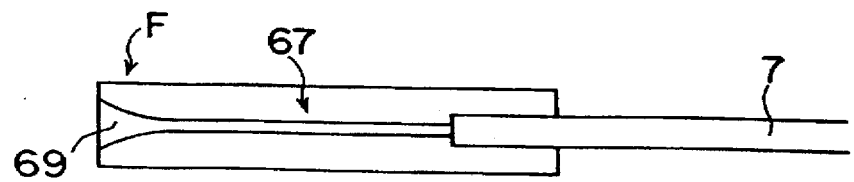

FIG. 35D is a schematic view showing a configuration in which the MFD of two kinds of optical fibers matches in the optical connector by fusing and coupling two kinds of the optical fibers. Note that the reference numeral 67 denotes a diffused and coupled portion.

Accordingly, it is preferable that the MFD of the optical fiber at the coupling end in the external optical connector be partially enlarged.

Further, the MFD of the optical fiber is enlarged 20% or above by concentrating residual stress in a core region to lower a refractive index of the core region as compared with a case of the residual stress being removed.

Furthermore, the optical fiber having the predetermined length in the optical connector desirably has a fused and adhered portion.

Figure 36A:
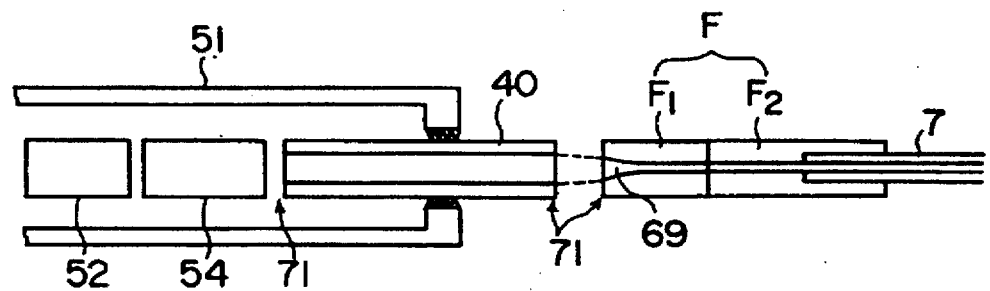
FIG. 36A and FIG. 36B are views showing a configuration for preventing reflection at a coupling end face.
Figure 36B:
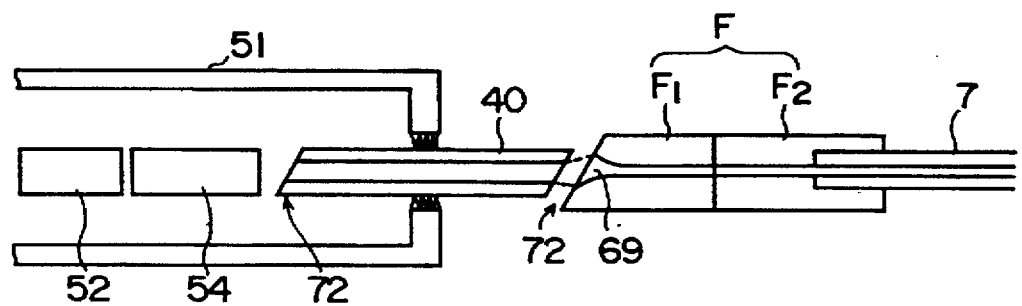

FIG. 36A and FIG. 36B are schematic views showing a configuration in which the end face of the optical fiber array is deposited with non-reflective coating or diagonally polished to couple an optical fiber at an oblique angle.

FIG. 36A and FIG. 36B show one type of the optical fiber array in which the end face of the optical fiber array 40 is deposited with a non-reflective coating or diagonally polished to couple the optical fiber at an oblique angle. The optical module constituting the optical connector may be a combination of a plurality of optical modules $F_1$ and $F_2$.

As the adhesive for fixing the optical fibers, an adhesive which has a high heat resistance, for example, an adhesive that exhibits a gas generation of 1% or below at 260° C. for 10 seconds, e.g., epoxy resin adhesive, is desirable.

The optical connector in which the MFD of the optical fiber at the coupling end in the optical connector is partially enlarged generally exhibits low loss against the decentering of the optical connector, which results in the achievement of low-loss coupling and which is preferable with respect to the stability of removing and installing loss.

Figure 37:
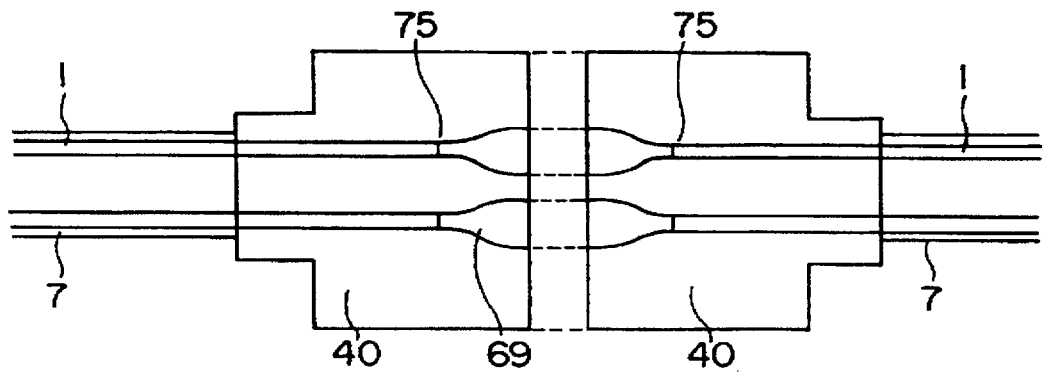
FIG. 37 is a plane view showing a configuration of an optical fiber array using an optical fiber having an enlarged MFD.

One example of such an optical fiber array 40 is shown in FIG. 37. The MFD of the optical fiber preferably is enlarged by at least 20% or more, as compared to the MFD of an optical fiber in which the residual stress is removed. In this manner, the residual stress in a core region is concentrated to lower a refractive index of the core region.

Further, the optical fiber having the predetermined MFD in the optical connector desirably has a fused and adhered portion 75.

Working example

Twelve single mode fibers were used, and the silicon substrate which was processed to form the V-grooves was bonded with a glass plate by anode-coupling, so that the optical fibers were pressed between the silicon substrate and the glass plate. Successively, the solder was injected to seal the whole structure while ultrasonic oscillation was applied (see FIG. 33).

The optical fiber array was about 10 mm in total length and 2.0 mm in thickness. The optical fibers were positioned within 1 μm intervals of each other. The guide holes were processed up to the middle of the substrates and the other parts were bonded to be sealed.

The LD module was aligned and positioned through the lens array and fixed to the case with solder. An IC for driving the optical fiber array was included in the LD module and sealed to provide airtightness.

Note that the metal sleeve processed by press-working was formed at the periphery of the optical fiber array in order to make its fixation to the case with solder easier, and the metal sleeve and the case were fixed with solder.

Further, a gap between the optical fiber array 40 and the metal sleeve 60 was filled with solder. The shape of the metal sleeve 60 is not limited. It may be square or round and it can be designed to correspond to the shape or application of the module. A protuberance (gill) may be provided on the metal sleeve 60 and welded by a YAG laser.

Note that the metal sleeve 60 may be made of amber or covar, which have comparatively the same thermal expansion as that of the optical fiber array 40.

The multifiber optical connector was coupled to the optical fiber array 40, and the loss in the coupling portion was measured. It was found that the average loss of 12 fibers was about 0.35 dB, which would not present a problem in practice.

The push-pull type housing was installed on the optical connector to be connected to make its positional manipulation easier.

The optical connector having a MFD which was enlarged from 9.5 μm to 18 μm and the optical fiber array were tested. The loss was improved to about 0.20 dB and the dispersion of removing and installing was ±0.02 dB, which showed the tendency of stabilization.

Further, the optical fibers were fixed with solder, so that the non-reflective coating was easily deposited thereto. As a result of the testing, it was found that a reflective coating which was 30 dB or above to λ=1.3 μm could be deposited.

As described above, the parallel transmission optical module according to the present embodiment can convert the conventional pigtail type or jumper type module to a receptacle type module and make the manufacture and assembling operation easier. The optical fiber ribbon does not need to be installed, which permits the module to be compact and the packaging density to be increased.

With the use of the anode-coupling and the direct coupling, the number of parts decreases, and the assembling is performed with higher reliability. Further, the sealing of the guide pin grooves is easily achieved if the grooves are processed up to the middle of the width of the plates by anode-coupling or direct coupling.

The holding member for the optical fibers is provided separately (see FIG. 33), so that the optical fibers are firmly pushed into the V-shaped grooves and the 1 μm eccentricity can be easily achieved.

The loss and the dispersion due to removing and installing can be decreased by converting the MFD of the optical fiber array and the optical connector.

When the optical fiber arrays are coupled with the waveguide member and the guide pins are utilized, the aligning process is not required. Further, when the spring pushes the fibers inside the module, the reliability of the connection is further increased.

As shown in FIG. 29A, if the inner parts of the guide pin grooves are sealed, the operation of injecting the solder from the other end becomes easier because the solder is not applied to the guide holes.

Further, the optical fiber has the enlarged MFD, so that the connection between the optical connectors is made easier.

Embodiment 5

The parallel transmission module according to the present embodiment is explained by referring to the order of the steps of its manufacturing processes with reference to the accompanying drawings.

Figure 38:
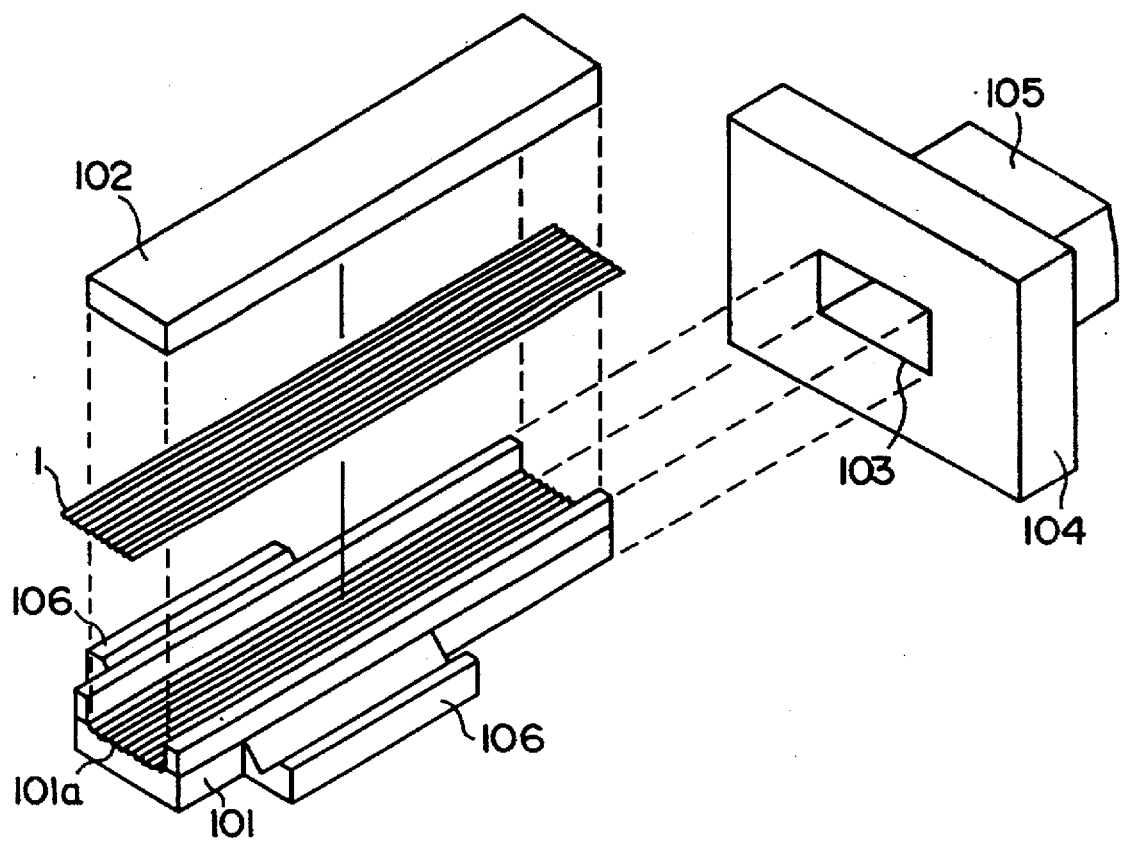
Figure 39:
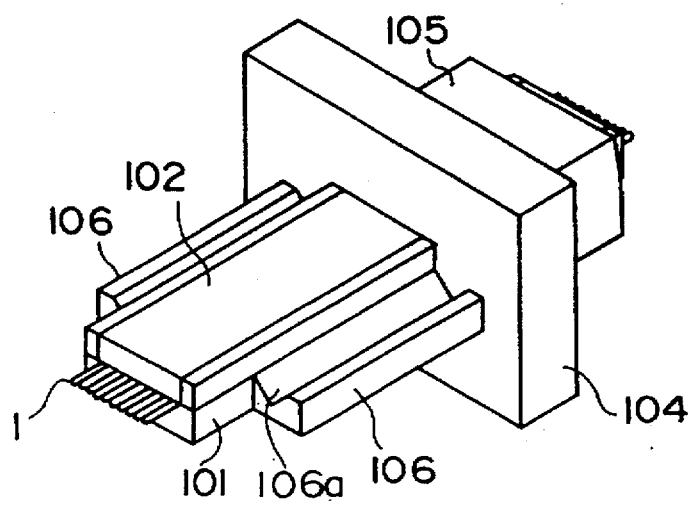

First, optical fibers 1 are placed in respective V-shaped grooves 101a which are formed in a surface of a lower plate 101, and an upper plate 102 is put thereon. Thereafter, one (first) ends of the lower and upper plates 101 and 102 which hold the plurality of the optical fibers 1 are inserted into an opening 103 at a central portion of a metal flange 104 (FIG. 38 and FIG. 39). At this point, support plates 106 having V-shaped grooves 106a for supporting guide pins, which will be described later, are provided at the both sides of the lower plate 101 in a cross direction. The upper and lower plates are inserted through the opening 103 until the support plates 106 touch the flange 104. A metal sleeve 105 for protecting the lower and upper plates 101 and 102 is fixed to the opposite side of the flange 104 at opening 103. After the insertion is completed, the inserted ends of the lower and upper plates 101 and 102 project from the end face of the metal sleeve 105 to the outside (FIG. 39).

Figure 40:
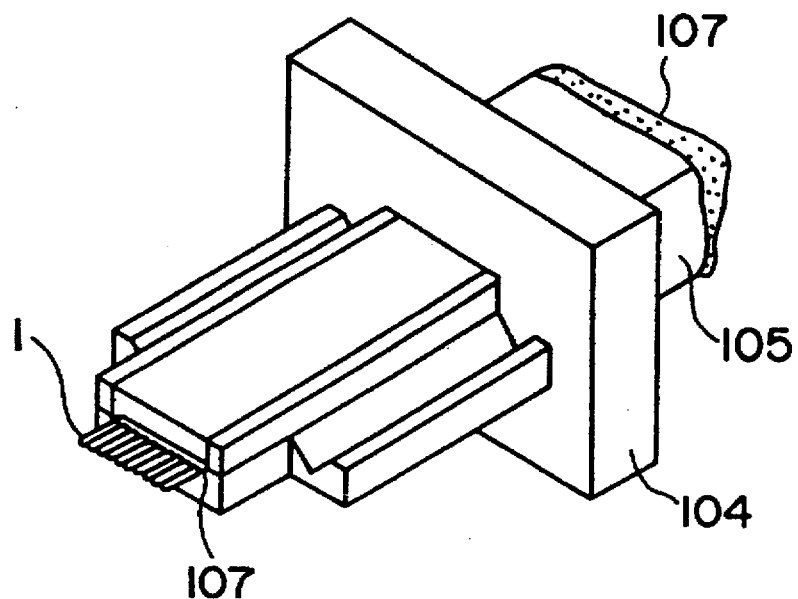

Next, the ends of the lower and upper plates 101 and 102, which project from the metal sleeve 105, are soaked in the solder bath (see FIG. 18C), and high frequency oscillation is applied to the solder to fill the solder up to the opposite end (FIG. 40). Then, the solder is filled between the metal sleeve 105 and the flange 104, and between the lower and upper plates 101 and 102 which hold the optical fibers 1 such that the parts are all fixed in an airtight sealing. Note that the hermetic sealing member, e.g., low melting point glass, can be used in addition or alternative to the solder.

Figure 41:
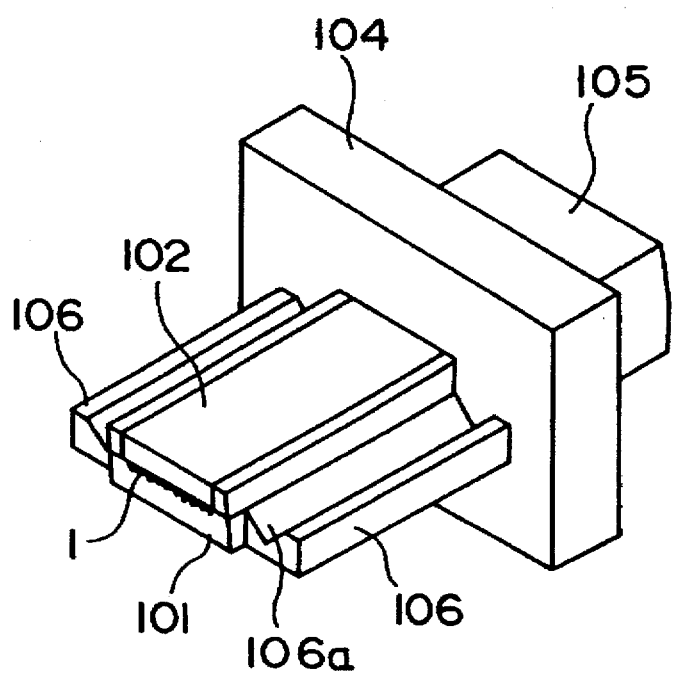

Next, both ends of the lower and upper parts 101 and 102 are polished to remove the adhered solder. Then, the optical fibers are exposed to be specular (FIG. 41).

Figure 42:
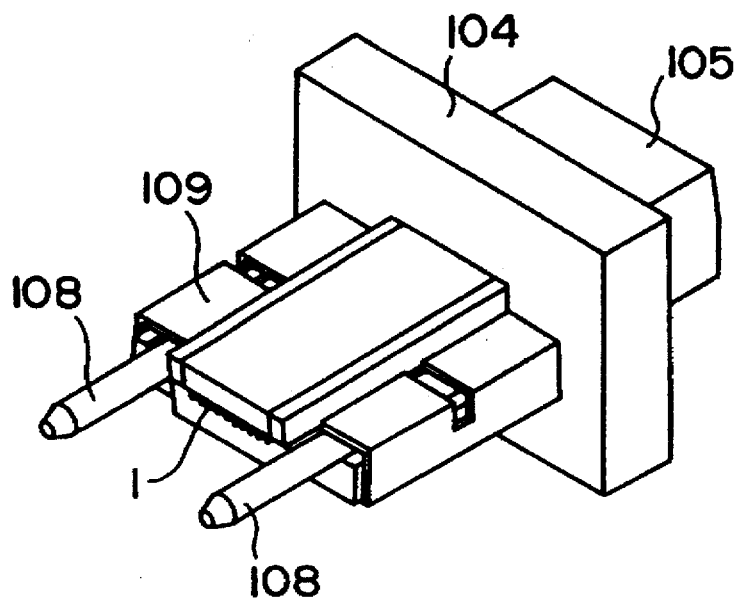

Thereafter, guide pins 108 are placed in the V-grooves 106a of the support plates 101 and 102. Then, a clamper 109 is placed at the peripheries of the guide pin 108 and the lower and upper plates 101 and 102 so as to press them together. Consequently, the guide pins 108 are fixed in the V-shaped grooves 106a (FIG. 42).

Figure 43:
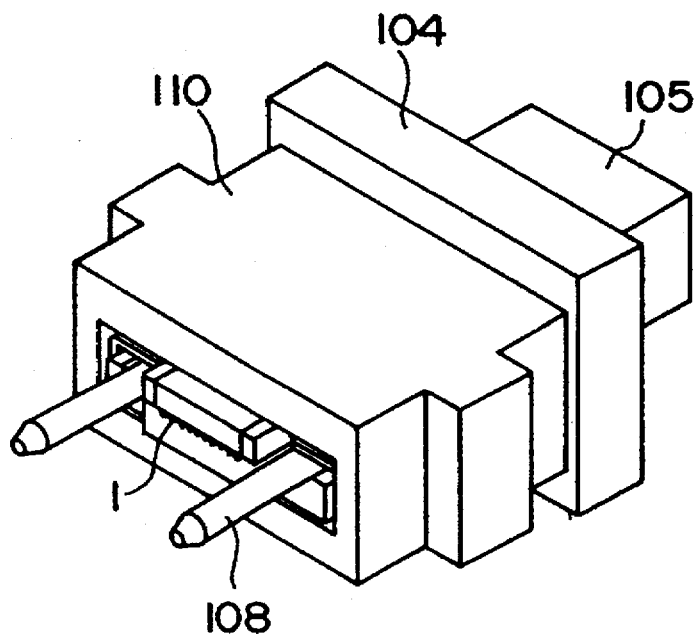

Next, a protective sleeve 110 is fixed around the clamper 109 so as to cover the clamper-provided portion (FIG. 43). The resultant manufactured optical fiber array 100 is shown in FIG. 44A–FIG. 44D.

Figure 45:
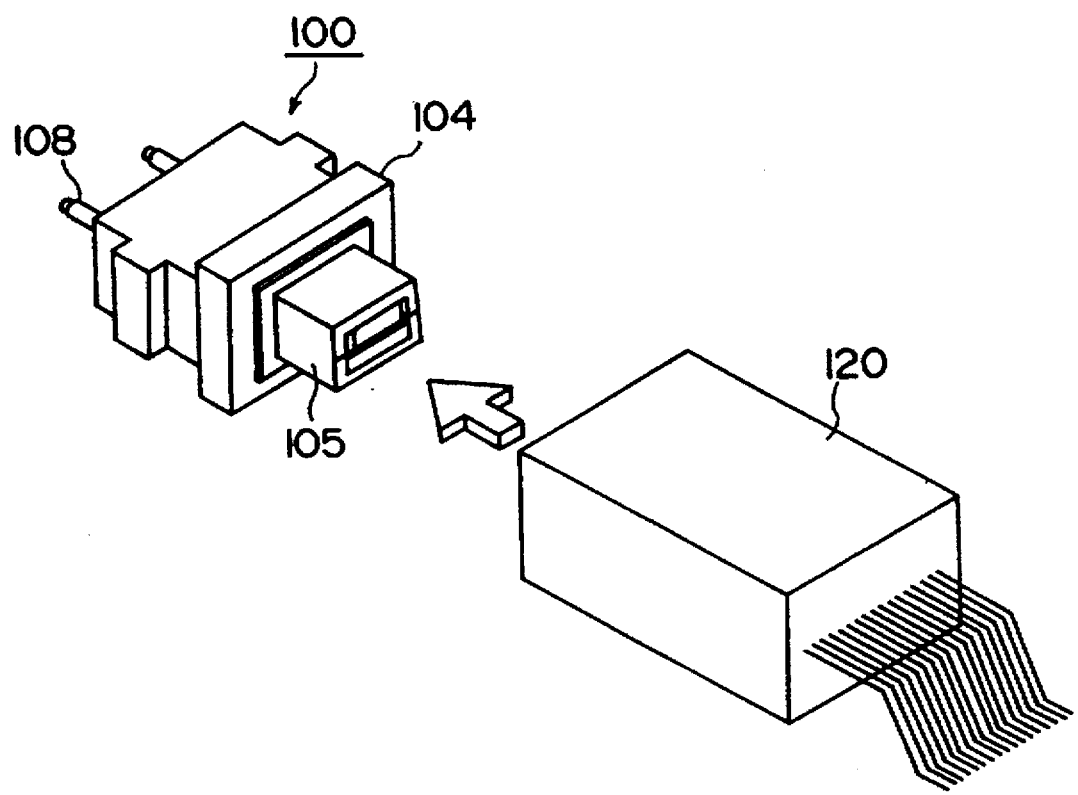
Figure 46:
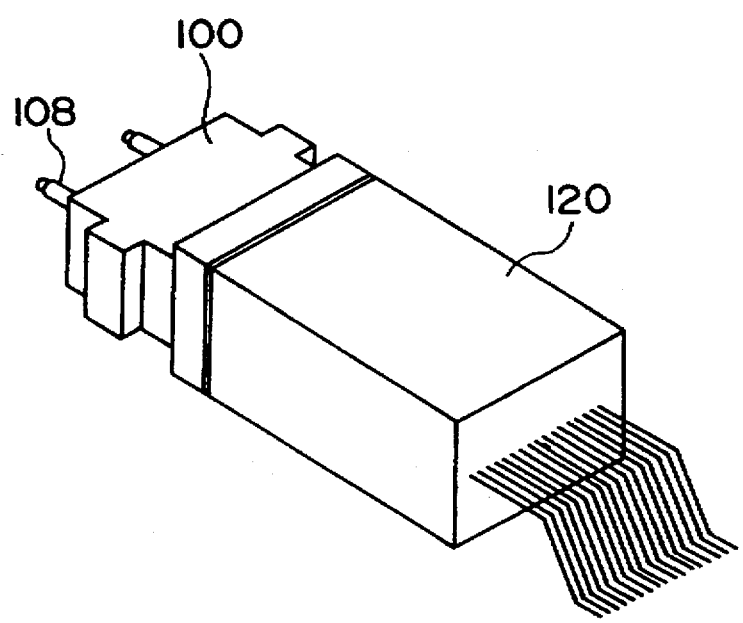

Next, the optical fiber array 100 is inserted into a module body 120 which comprises a light emitting device array or a light receiving device array, and an IC circuit array corresponding to the device (FIG. 45). The solder or YAG welding is used to fix the parts entirely in an airtight sealing. Then, the parallel transmission module is completed (FIG. 46).

Embodiment 6

The other embodiment of the parallel transmission module will be explained with reference to the accompanying drawings. The structure of the parallel transmission module of the present invention is similar to the one shown in the embodiment 5, and the same parts are represented by the same reference numerals.

Similar to the embodiment 5, in the parallel transmission module of this embodiment, optical fibers 1 are positioned by a lower plate 101 and an upper plate 102. Then, the optical fibers 1, the lower and upper plates 101 and 102, and the flange 104 are fixed to define a solid body by a hermetic sealing member such as solder or low melting point glass. The parallel transmission module further comprises guide pins 108 which are supported in the V-shaped grooves 106a of the support plate 106. Further, the optical fibers 1 are positioned in the V-shaped grooves 101a of the lower plate 101.

In particular, solder or low melting point glass is suitable for the hermetic sealing member in order to promote airtight sealing of the parts in the optical fiber array and reliability control of the optical fiber array and the module.

Injection of the solder from the end of the optical array is preferably performed while ultrasonic oscillation is applied. In this instance, if a window part (not shown) is provided on the flange 104, clamping the optical fibers 1 with the lower and upper plates 101 and 102 can be ensured at the window part.

One advantage of providing such a window part is that it widens a gap to prevent the solder from rising, which improves the control of optical fiber positioning.

For the solder material, it is preferable that an additive agent such as Zn, Sb, Al, Ti, Si or Cu be added to a Pb—Sn alloy, which is suitable for bonding optical fiber glass. The ultrasonic oscillation is applied to the solder during bonding.

As shown in FIG. 47A–FIG. 47D, a wall 112 and the lower plate 101 are preferably made of Si-glass or Si—Si solid phase bonding.

Further, the solid phase bonding may be anode-bonding or may be direct-bonding of Si—Si.

Providing an oxide film on a surface of the lower plate 101 is preferable for improving adhesion with the upper plate 102 or solder.

It is preferable that metal coating or carbon coating be deposited on the optical fibers 1 to improve the reliability by permitting the solder to easily adhere on the optical fibers.

It is preferable that the flange 104, the optical fibers 1, and the lower and upper plates 101 and 102 are polished so as to be arranged in the same plane.

The upper plate 42 is easily polished if the Young's modulus of the upper plate 42 is small when the end face is polished.

Further, as shown in FIG. 48A–FIG. 48D, the structure in which the optical fibers 1 and the lower and upper plates 101 and 102 project from the flange 104 is convenient for polishing.

Referring to FIG. 47A–FIG. 51E, a method of manufacturing an optical fiber array which constitutes a parallel transmission module will be explained.

Each of optical fibers 1 (not shown) is placed in a respective V-shaped groove 101a on a lower plate 101, and an upper plate 102 is set thereon to clamp the optical fibers 1. Next, a flange 104 which surrounds the periphery is installed and fixed by solder as shown in FIGS. 48A–48D.

Its rear end is soaked into the solder bath (not shown) to seal the inside of the flange 104, and the solder injected from the rear end is made to reach the other end. In this case, the sealing parts at both ends define protuberances 111.

Figure 49:
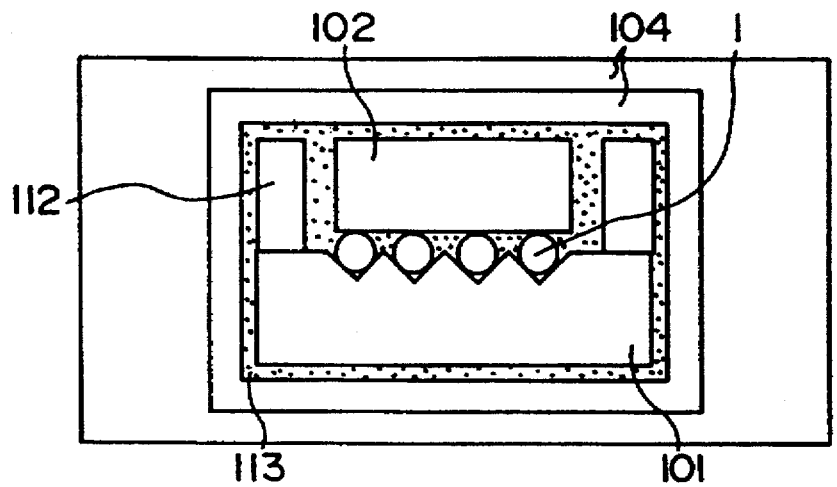
FIG. 49 is an enlarged view of FIG. 48D.
Figure 50A:
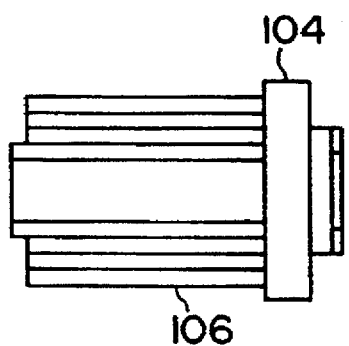
FIG. 50A is a top view of the optical fiber array of FIG. 48 after both ends of the array are polished.
Figure 50C:
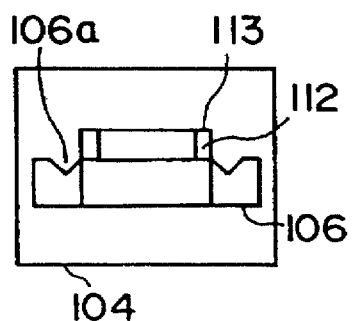
FIG. 50C is a front end view.
Figure 50B:
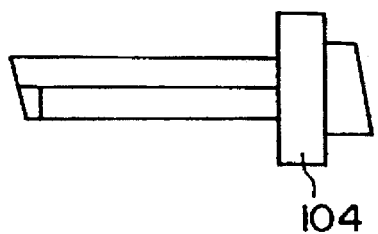
FIG. 50B is its side view.
Figure 50D:
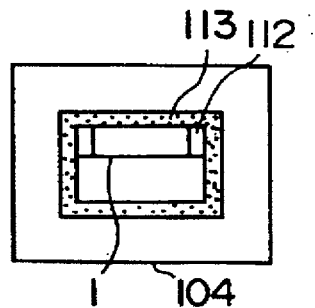
FIG. 50D is a rear end view.
Figure 51A:
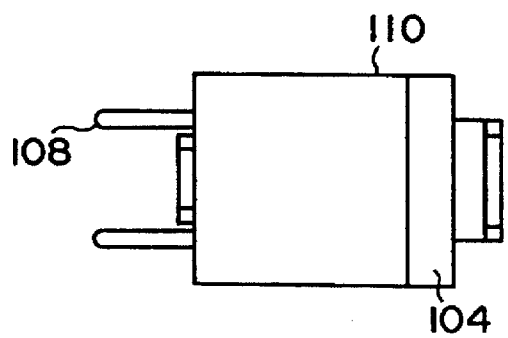
FIG. 51A is a top view showing a protective sleeve arranged around the optical fiber array of FIG. 50A.
Figure 51E:
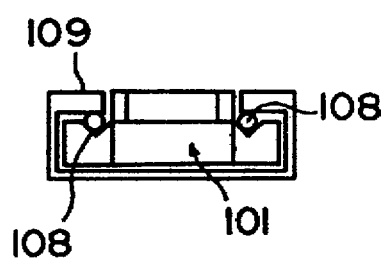
FIG. 51E is a vertical sectional view showing the positioning of a guide pin inserted in a guide-pin groove when pressed by a pressing member such as a metal spring.
Figure 51C:
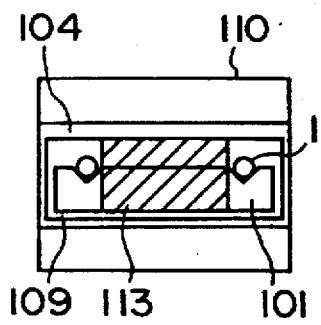
FIG. 51C is a front end view.
Figure 51B:
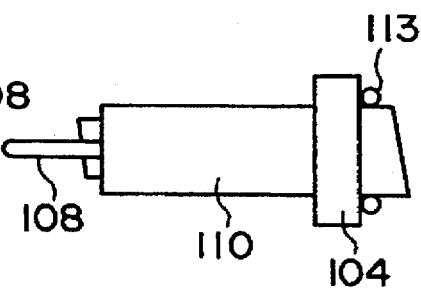
FIG. 51B is its side view.
Figure 51D:
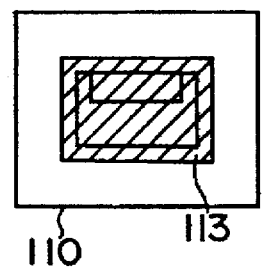
FIG. 51D is a rear end view.

Accordingly, as shown in FIG. 51A–FIG. 51E, the solder adheres to the flange 104, the step, and the entire rear end face of the optical fiber so that the rear end of the optical fiber array becomes a metal part. That is, as shown in FIG. 49, it is understood that the lower and upper plates 101 and 102, the wall 112, and the optical fibers 1 are surrounded by the solder 113.

Next, both ends thereof are polished (FIG. 50A–FIG. 50D), and, thereafter, the guide pins are inserted and fixed to the V-shaped grooves 106a provided at at least one end. The guide pins are not necessary in a case of coupling an optical device at its end face or in a case of using another coupling means besides the guide pins.

As shown in FIGS. 51A–51E, a protective sleeve 110 is preferably provided at the periphery of the optical fiber array to protect the inside of the optical fiber array, if necessary. In this instance, the material of the protective sleeve 110 may be plastic.

The manufactured optical fiber array is polished at both ends to be entirely and hermetically sealed. Further, the guide pins 108, which are provided as needed, are fixed by clampers 109 which are metal springs. The advantages of the optical fiber array are simplifying the coupling between the optical connector or the optical device in the module body and the optical fiber array, and making the coupling operation easier.

Referring to FIG. 52A–FIG. 52D, a method of manufacturing an optical fiber array which constitutes a parallel transmission module will be further explained.

First, each of the optical fibers 1 (not shown) is placed in a respective V-shaped groove 101a of a lower plate 101, and an upper plate 102 is placed thereon to clamp the optical fibers 1, and then bonded and fixed as shown in FIGS. 53A–53C.

As shown in FIGS. 53A–53C, it is important that walls 112 provided on the lower plate 101 prevent the flow of fixing agent 113a (solder or heat resistant adhesive), which is injected from the end, into the V-shaped grooves 106a of the support plate 106. The injecting condition also should be controlled so that the fixing agent does not reach the rear end.

Figure 54A:
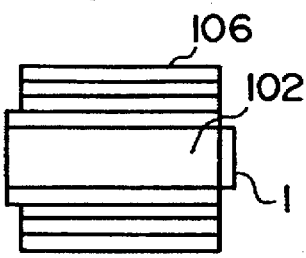
FIG. 54A is a top view showing a module having one end thereof polished.
Figure 54C:
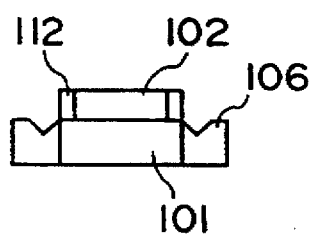
FIG. 54C is a sectional view showing its end.
Figure 54B:
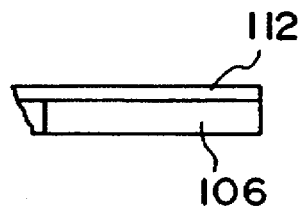
FIG. 54B is its side view.

FIGS. 54A–54C show an optical fiber array having one end thereof polished: FIG. 54A is its top view, and FIG. 54B is its side view, and FIG. 54C is a vertical sectional view of its end.

Figure 55A:
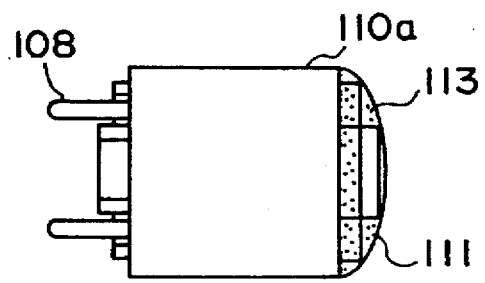
FIG. 55A is a top view showing a rear end of a module of FIG. 54A that is fixed by solder after guide pins and a protective sleeve are installed.
Figure 55C:
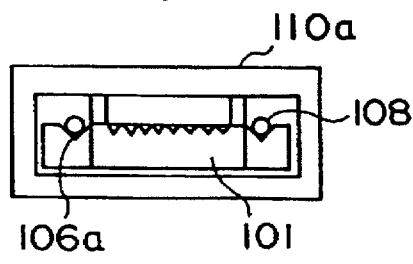
FIG. 55C is a sectional view showing its front end.
Figure 55B:
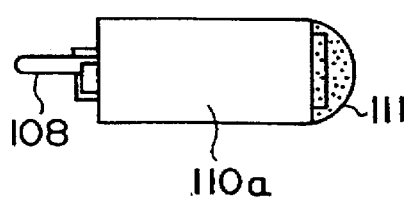
FIG. 55B is its side view.

FIG. 55A–FIG. 55C are schematic views showing guide pins which are inserted into the module at the front end and fixed at the rear end by solder. The guide pins 108 are inserted into the V-shaped grooves 106a provided at the end face of the module on the front side, and the guide pins 108, the optical fibers 1, and the metal flange 110a are fixed simultaneously with solder 113. The inside of the metal flange 110a is completely sealed with solder 113.

As shown in FIG. 56A–FIG. 56C, both end faces of the optical fiber array are polished, and then the optical fiber array is completed.

The thus manufactured optical fiber array, e.g., shown in FIG. 56A, is polished at both end faces, and completely and hermetically sealed. Moreover, the optical fiber array can be easily coupled with an optical connector, an optical device, or others in the module, and the coupling operation is simplified.

This will be described in more detail.

FIG. 57 shows a configuration in which the solder injected from the end does not flow into the V-shaped grooves 106a, which are similar to the grooves shown in FIG. 53A. In this example, walls 112 are provided on the lower plate 101 and/or the support plate 106.

The structure of the walls 112 may be arranged as depicted in FIG. 57; however, the frame structure shown in FIG. 58 is preferable. With this structure, the reliability of the upper plate 102 fixation is improved.

Figure 59:
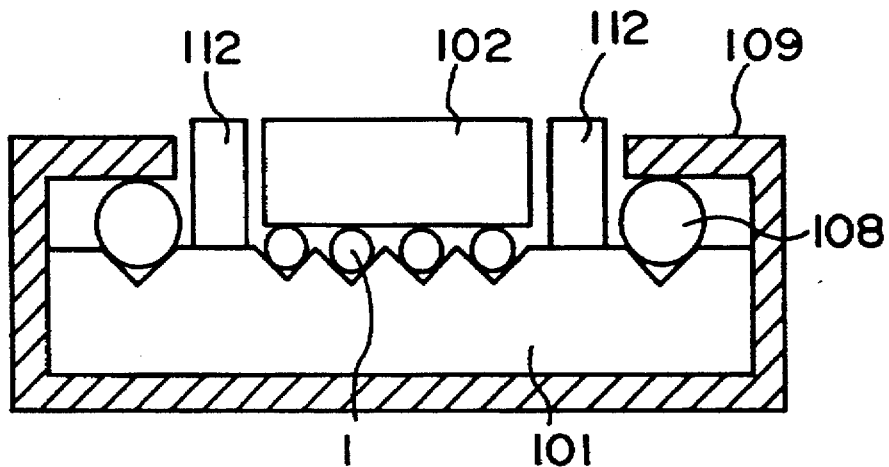
FIG. 59 is a schematic view showing a guide pin supported by a clamper.

FIG. 59 shows a clamper 109 for clamping and resiliently holding the positioned guide pins 108.

As shown in FIG. 59, it is desirable that the guide pins 108 which are put in the V-shaped grooves 106 be exposed at at least the upper portion thereof, and that this portion is fixed with the clamper 109.

Figure 60:
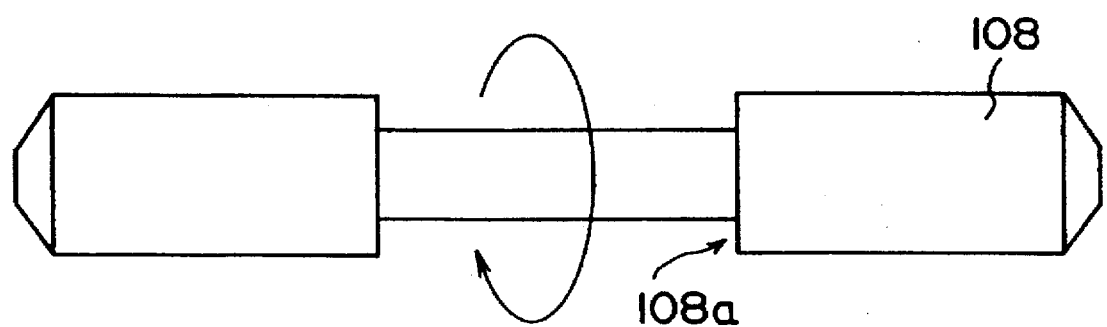
FIG. 60 is a side view showing a modified guide pin.

FIG. 60 is a schematic view showing one example of a modified guide pin. As shown in FIG. 60, there are step portions of the guide pin 108, and the guide pin may be resiliently clamped at the step portions. In this example, the guide pin is clamped at the step portions 108, which prevents the guide pins 108 from disengaging.

The guide pin 108 is made of ceramic such as zirconia, which is preferable from the aspects of high precision and reliability.

Figure 61:
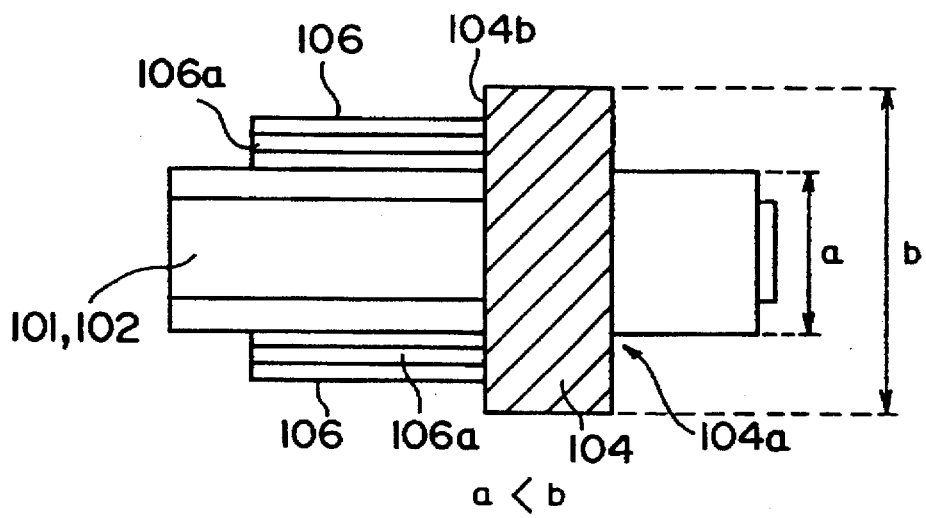
FIG. 61 is a top view showing a coupling face of an external optical connector and a coupling face inside a module.

FIG. 61 shows one configuration of the coupling end face of the external optical connector and the coupling end face in the parallel transmission module.

As shown in FIG. 61, the lower and upper plates 101 and 102 preferably have convex portions protruded over the V-shaped grooves 106a which are for receiving guide pins, which guide pins are located at the coupling end face (front end) of the external optical connector. Further, it is preferable that the lower and upper plates 101 and 102 protrude from the V-shaped grooves 106a at the coupling end face (rear end) in the module.

The advantage of the convex shape is limiting the region on which the solder adheres.

Further, it is desirable that the flange 104 includes a distal wall region 104b which extends beyond one end face of the support plate 106 attached to the flange 104, a step 104a which is smaller than the distal wall 104b as shown in FIG. 61.

The optical fiber array according to the present embodiment may be positioned and fixed to an optical device such as an LD array, a lens array or others, by using adhesive after alignment thereof, and solder or YAG laser for bonding the optical device to the case of the optical modules. Guide pins also can be used. The same holds true for coupling the optical fiber array with the waveguide substrate.

The V-shaped grooves 106a may be processed from both ends of the optical fiber array separately. The number of guide pin grooves does not have to be two, with one groove located at each end. The V-shaped groove 106a for the guide pin does not have to be on the optical fiber array side if there is another positioning member (e.g., providing a guide pin grooves on the optical connector side), but may further comprise a housing mechanism such as a push-pull type on the outside of the optical fiber array.

Further, the shape of the metal flange 104 may be square or circular, and the material the flange 104 is prepared from is preferably amber or covar alloy, the thermal expansion of which is comparatively the same as that of the optical fiber array.

Figure 62A:
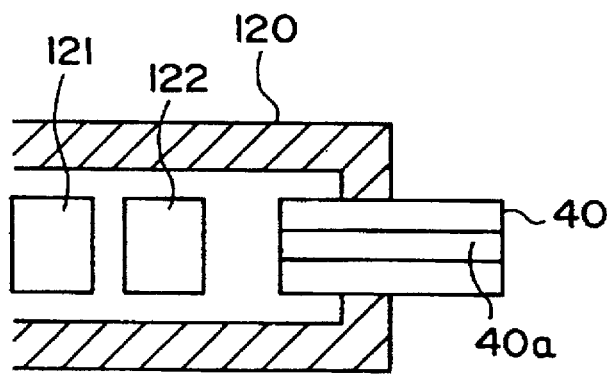
FIG. 62A and FIG. 62B are schematic views showing a MFD of an optical fiber that is totally and partially converted, respectively.
Figure 62B:
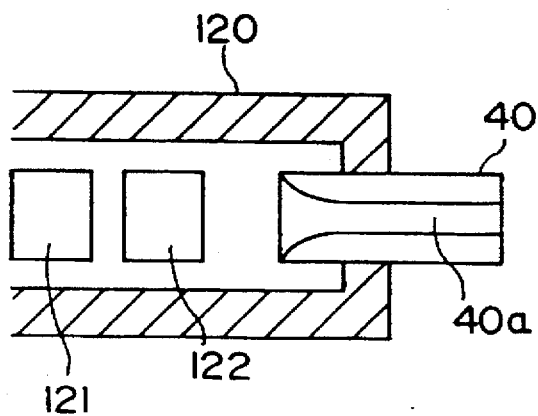

FIG. 62A and FIG. 62B are schematic views showing optical fibers, the MFD of which is converted in part or in whole.

In FIG. 62A and FIG. 62B, it is preferable that the optical fiber 40a have a MFD that is enlarged (shrunk) to 12 µm or more and more preferably 15 µm or more, over a portion of or the whole fiber so that both ends of the optical fiber array 40 are suitable for fusing and connecting with the other optical connector. Further, in a view of angle loss, a MFD is preferably 20 µm or more and 50 µm or less. The optical fiber 40a of FIG. 62A has a MFD of 30 µm over its full length, and the optical fiber 40a of FIG. 62B has a MFD of 30 µm at one end in the module body 120, and has the MFD of 9.5 µm at the other end located outside the module body 120. The optical fiber 40a of FIG. 62B is a standard single mode fiber. In FIG. 62A and FIG. 62B, the reference numerals 121 and 122 denote an LD array and a lens array, respectively, which are provided in the module body 120.

In such a case, the optical connector has less changes due to loss against decentering, which results in the achievement of the low-loss coupling. This case is preferable with respect to the stability of installing and removing.

Further, the end face of the optical fiber array is not limited to be processed with surface grinding. It is possible to diagonally polish the end face, so as to couple an optical fiber at an oblique angle (e.g., 5°–10°), and to deposit the end face with non-reflective coating.

The fixing material for fixing an optical fiber is preferably an adhesive which has a high heat resistance and in which the gas generation is 1% or less by weight when heated at 260° C. for 10 seconds, e.g., epoxy resin adhesive in the instance of using organic adhesive.

With the thus constructed parallel transmission optical module, the sealing at the coupling end face of the module is sharply improved. This improvement is attributable to the optical fiber being fixed to the positioning member which constitutes the optical module, by the fixing material, before the guide pin is fixed to the positioning member, thereby improving the sealing of the coupling face to the multifiber optical connector, optical device or others.

Further, the optical module is not a conventional pigtail type, and the optical fiber ribbon is not added, so that the work efficiency or handling during installation of a printed board of the module is sharply improved.

Embodiment 7

The embodiment of the parallel transmission module will be explained with reference to the accompanying drawings.

Figure 73:
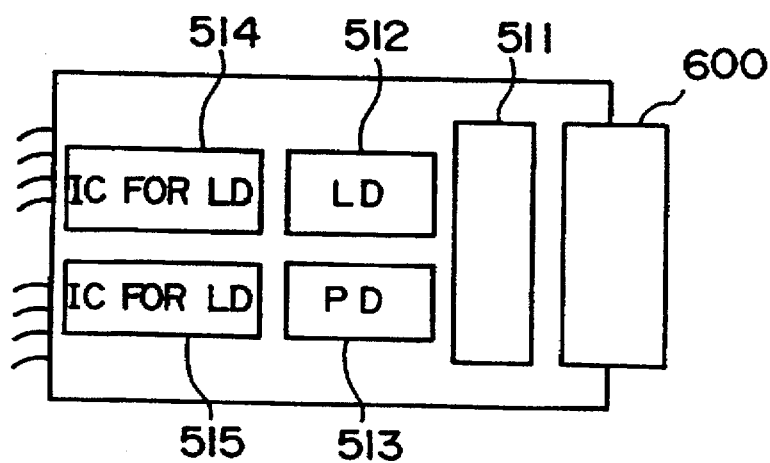
FIG. 73 is a block diagram of a parallel transmission module comprising modules for emitting light and for receiving light.

FIG. 73 is a schematic view showing the basic structure of the parallel transmission module according to the present embodiment.

In FIG. 73, the reference numerals 600 and 511 denote an optical fiber array and a lens array, respectively, and 512 and 513 denote an LD array and a PD array which are formed in parallel, respectively, and 514 and 515 denote an IC for an LD and an IC for a PD connected to the LD and PD, respectively.

Note that the reference numeral 600 may be formed of an optical waveguide substrate. In the following explanation, however, an optical fiber array in which a plurality of optical fibers are arrayed will be explained.

As shown in FIG. 73, the LD array (light emitting device), and the PD array (light receiving device) are manufactured individually, and they are aligned through a lens array and positioned with reference to the optical fiber array 600 when they are mounted.

In this instance, the module is a transmittance-reception type parallel transmission module, and the optical fiber array is also a transmittance-reception type.

In this sort or module, various optical devices may be included, such as LD-PD, LD-LD, or LD-PD-LD.

On the other hand, in the conventional module, a light emitting module (transmitting module) and a light receiving module (receiving module) are formed separately, and in general, the transmitting module and the receiving module need to be mounted on a substrate separately in order to transmit an optical signal in both directions, which hinders the high mounting density.

The effects of forming the module as shown in FIG. 73 are that the module is miniaturized and that the mounting task is reduced as compared with the conventional module. Further, the cost of the optical fiber array is reduced (polishing and installing optical fibers can be performed at once), which leads to improved mounting density and reduced mounting cost.

The optical fiber array according to the present embodiment may be positioned and fixed to the optical device such as the LD array, the lens array or others, by using adhesive after alignment thereof, solder or YAG laser for bonding to the case of the optical module, or guide pins. Note that this also applies to coupling the optical fiber array with the waveguide substrate.

A guide pin may be used to couple the optical fiber array according to the present embodiment with the optical connector. A clip also may be used.

Figure 74:
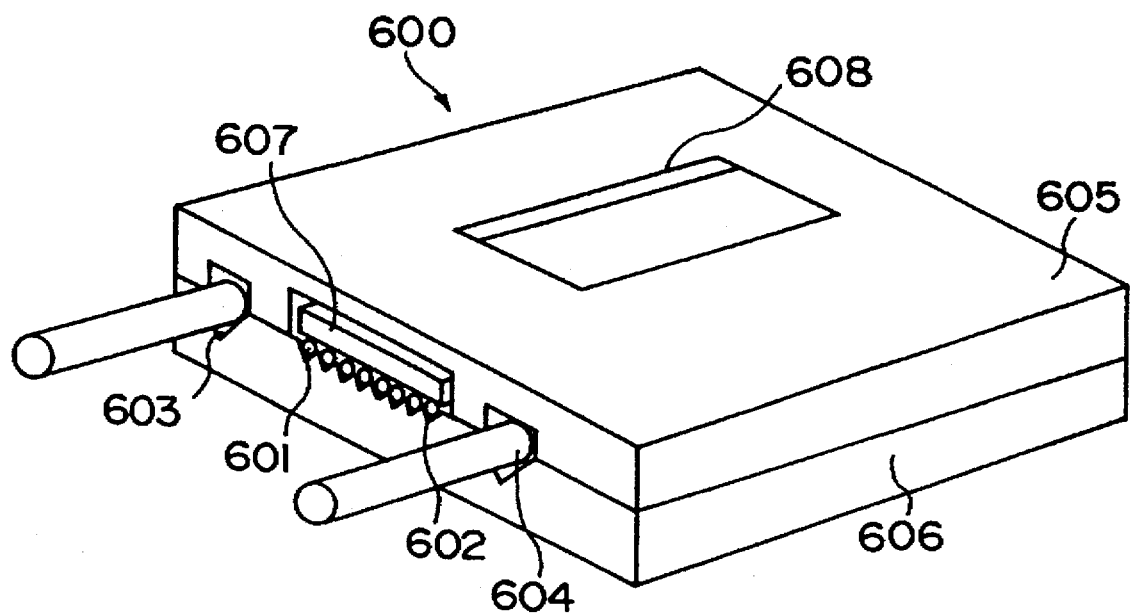
FIG. 74 is a perspective view showing an optical fiber array provided in the parallel transmission module of FIG. 73.

FIG. 74 is a schematic view showing the basic structure of the optical fiber array 600.

In FIG. 74, a Si chip which forms a lower plate 606 is processed to form optical fiber V-shaped grooves 602, and optical fibers 601 are positioned in the optical fiber V-shaped grooves 602 with an accuracy of 1 μm or less. Further, guide pin V-shaped grooves 603 are formed on the lower plate 606, and guide pins 604 are inserted in the guide pin V-shaped grooves 602 between the upper plate 605 and the lower plate 606 to position the optical connector (not shown).

A metal flange 609 (see FIG. 77) is provided on the outside of the upper and lower plates 605 and 606. The metal flange 609 is fixed to a module by solder, YAG welding or other techniques.

In the case of installing the optical fibers 601 in the optical fiber array 600, a part or the whole can be fixed with solder to seal the module in an airtight state.

Further, the orientation of a plane in which an end face of the optical fiber array is arranged is not limited to a vertical direction relative to the optical axis direction, but the end face may be diagonally polished to incline in an oblique direction. Accordingly, the oblique angle coupling (e.g., 5°–10°) can be made possible. Further, the non-reflective coating can be deposited on the end face of the optical fiber array.

The fixing material for fixing an optical fiber is preferably an adhesive which has a high heat resistance and a gas generation of 1% or less of the weight ratio when heated at 260° C. for 10 seconds, or a hermetic sealing member such as solder or low-melting point glass. This fixing material is the same as in the other embodiments.

The hermetic sealing member is important towards achieving reliability control of the optical fiber array and the module.

For the solder material, it is preferable that an additive agent such as Zn, Sb, Al, Ti, Si or Cu be added to general Pb—Sn alloy, which is suitable for bonding optical fiber glass.

The metal coating or carbon coating is preferably deposited on the optical fibers 601 in order to make the solder easily adhere to the optical fibers 601 and thereby improve the reliability of the array.

The reference numeral 607 is an optical fiber pressing plate which is useful for holding the optical fibers 601 in the optical fiber V-shaped grooves 602 with a presser such as a clip (not shown) from an optical fiber presser window 608.

The guide pin grooves 603 may be processed from both ends of the optical fiber array.

The guide pin V-shaped grooves 603 are not necessary if there is another positioning member, but may further comprise a housing mechanism such as a push-pull type on the outside of the optical fiber array.

The shape of the metal flange 104 which is used in the present embodiment may be square or circular, and preferably is made of a material that is amber or covar alloy, the thermal expansion of which is comparatively the same as the optical fiber array.

Figure 75:
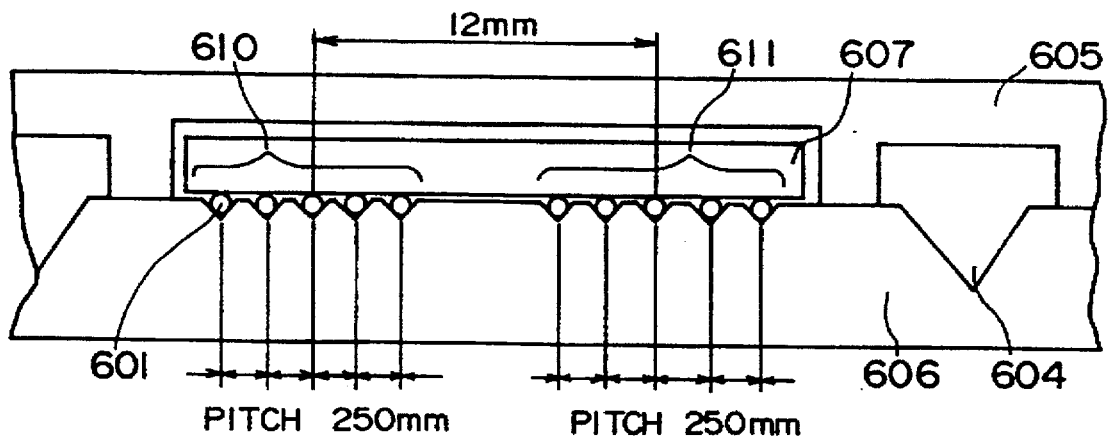
FIG. 75 is a schematic view showing an enlarged end face of an optical fiber array.

FIG. 75 is a schematic view showing an enlarged end face of the optical fiber array.

In FIG. 75, five channels of optical fibers 601 are arrayed with a 250 μm pitch, and arranged corresponding to a LD (reference numeral 610) or corresponding to a PD (reference numeral 611), and each channel is arranged on the same axis with a 12 mm pitch.

With such structure, the LD and PD arrays are aligned and positioned on a basis of an optical fiber array 600. Note that an array lens may be formed on one end of the optical fiber array, if necessary.

FIG. 76A–FIG. 76D are schematic views showing one example of the arrangement of light receiving devices and light emitting devices.

Figure 76A:
FIG. 76A–FIG. 76D are views showing an example of the arrangement of light emitting devices and light receiving devices.
Figure 76B:
Figure 76C:
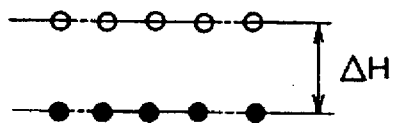
Figure 76D:

In the present embodiment, as shown in FIG. 76A, the arrangement is not limited to the same straight line arrangement, but, for example, the arrangement may be the parallel line arrangement in which one is shifted with an interval of ΔH and arrayed in parallel with the other one (FIG. 76B), the two-dimensional arrangement in which one is arrayed in parallel with and stacked relation to the other one with a space of ΔH (FIG. 76C), or the mixing arrangement in which fibers for LD and fibers for PD are mixed or alternated (FIG. 76D), or a combination of these. These can be designed in view of the productivity and assembly of an LD and a PD. In FIG. 76A–FIG. 76D, a white circle denotes a light emitting device such as an LD, and a black circle denotes a light receiving device such as a PD.

In the above instance, the embodiment is explained using the LD and PD as the optical devices, but the above embodiment can be applied to an array of light emitting devices, e.g., LEDs or light receiving devices.

Figure 77:
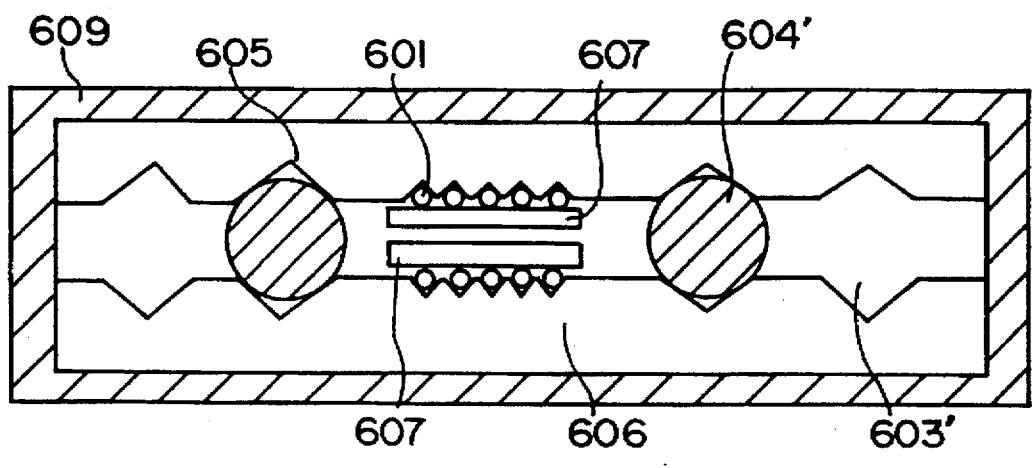
FIG. 77 is a view showing an end face of an optical fiber array corresponding to two-dimensional arrangement.

FIG. 77 is a schematic view showing one example of a structure of an optical fiber array in which optical fibers are arrayed in two-dimension corresponding to the arrangement of such light emitting devices or such light receiving devices. In FIG. 77, the reference numeral 604' denotes a guide pin for adjusting a space ΔH, and the reference numeral 603' denotes a guide pin groove. Note that this also can be applied to GI optical fibers.

Figure 78A:
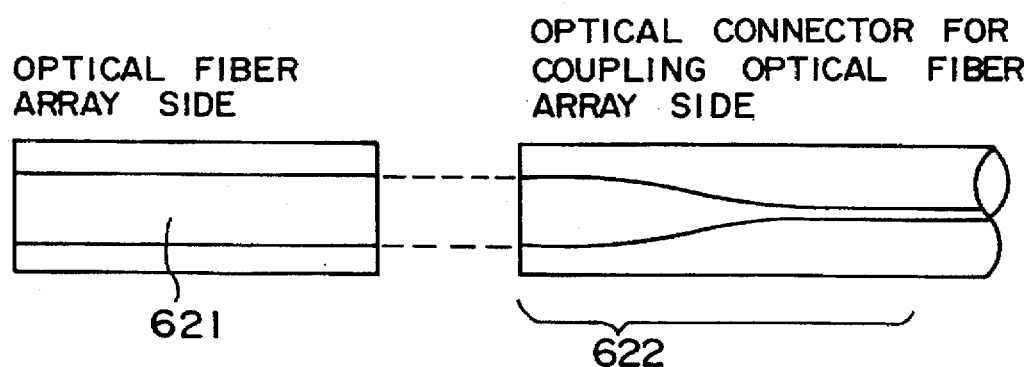
FIG. 78A and FIG. 78B are views showing a MFD enlarged conversion optical fiber or a MFD reduced conversion optical fiber.
Figure 78B:
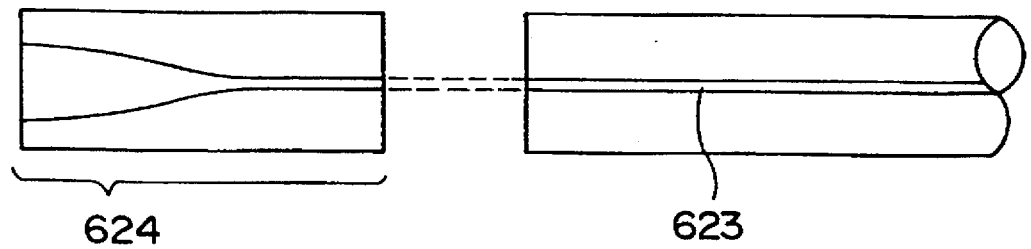

FIG. 78A and FIG. 78B are schematic views showing one example of the MFD enlarged conversion or the MFD reduced conversion on the optical fiber array side or on the optical connector side respectively, which is provided for coupling an optical fiber array.

As shown in FIG. 78A and FIG. 78B, in a case of using SM optical fibers, in order to make the coupling with a light receiving device or a light emitting device easier, the MFD of the optical fiber may be enlarged (FIG. 78A) or reduced (FIG. 78B). Further, the MFD at one end of the optical connector which is coupled to the optical fiber array may be enlarged (or reduced).

In such a case, the optical connector or the optical fiber array exhibits less changes due to loss caused by decentering, which results in the achievement of low-loss coupling. This case is preferable from a standpoint of stability of installation and removal. Note that reference numeral 621 denotes a large MFD on the optical fiber array side and reference numeral 622 denotes a MFD on the optical connector side which is coupled to the optical fiber array and which gradually becomes smaller. Further, in FIG. 78B, reference numeral 623 denotes a typical SM (single mode) fiber provided on the optical connector side for coupling, and reference numeral 624 denotes a MFD of a fiber provided on the optical fiber array side which undergoes change in the array.

Working example

An LD array of 10 channels and a PD array of 10 channels were coupled and aligned to a single mode optical fiber array of 20 channels through a lens array.

The MFD of the optical fibers in the optical fiber array was formed to about 30 μm, and it was designed so that the X-Y tolerance of the alignment became large.

An alloy housing (metal flange) made of a material having low thermal expansion, such as amber or covar alloy, was formed on the outside of the optical fiber array, and the housing was hermetically bonded to a module housing.

The grooves corresponding to guide pins having a diameter of 0.7 mm were processed in the optical fiber array, and the guide pins were held in the grooves and hermetically sealed in this location.

On the other hand, an external multifiber optical connector was installed in the push-pull housing, so that the optical connector was easily coupled with a transmittance/reception module.

The MFD of the general single mode optical fiber was about 9.5 μm and the MFD converting portion as shown in FIG. 78A was formed in the multifiber optical connector to form the multifiber optical connector in which the MFD was converted from 30 μm to 9.5 μm.

The MFD conversion was achieved by fusing and connecting a residual stress relaxation type optical fiber.

The obtained transmission-reception module showed good performance in coupling loss and transmission characteristic, and the mounting density on the printed board was improved twice or more.

As described above, according to the present embodiment, the following effects are shown.

(i) The mounting density on a printed board is improved since an LD array and a PD array are packaged together.

(ii) The cost is decreased since only one set of a package housing or an optical fiber array is needed (conventionally, two sets are needed) and the mounting operation can be processed at the same time.

(iii) The improvement to the working efficiency of alignment and the stabilization of optical connector coupling loss can be achieved. This is because the tolerance of the alignment of the optical connector coupling is increased by converting the MFD of an optical fiber array or a multifiber optical connector.

Embodiment 8

Figure 63:
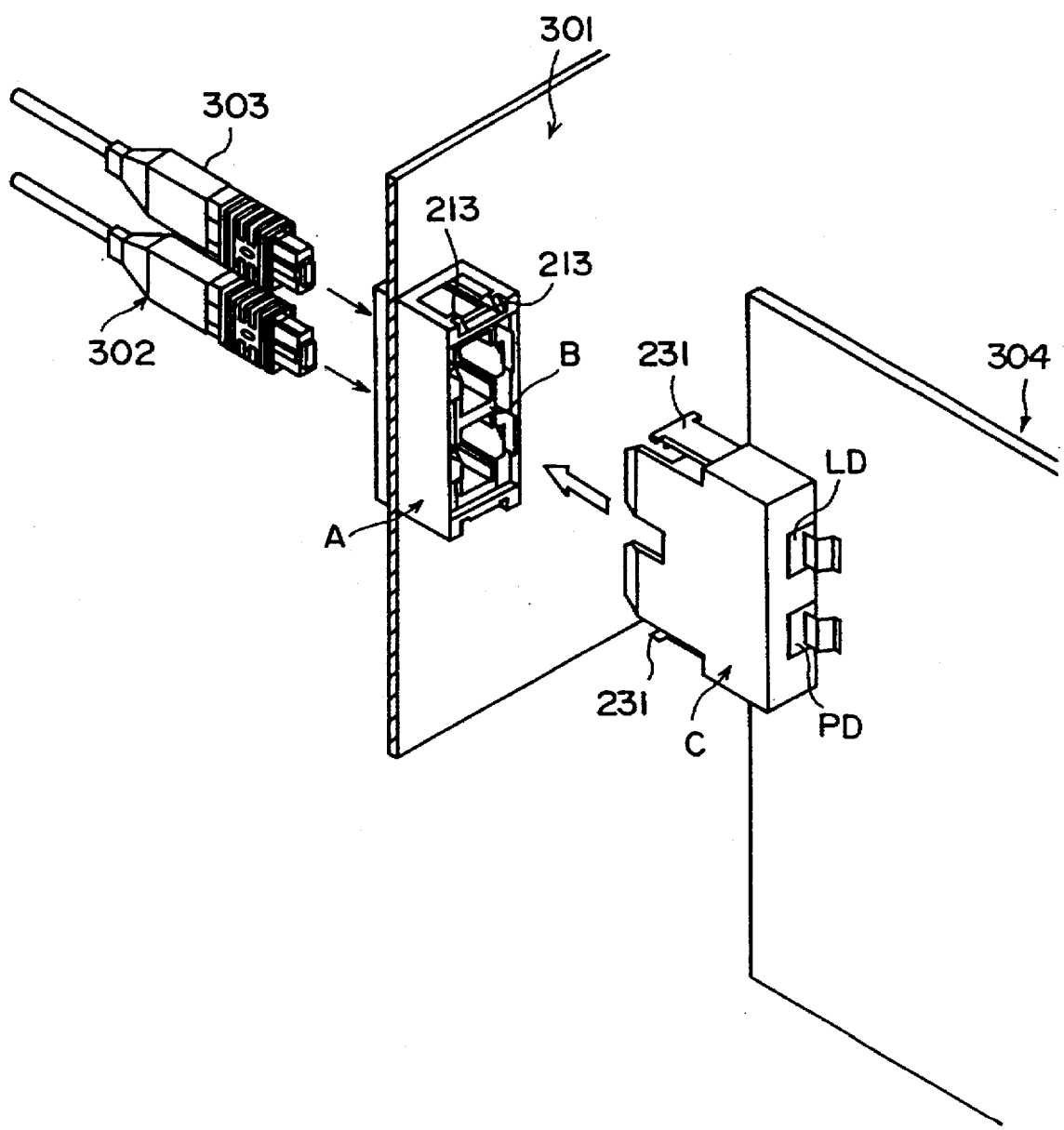
FIG. 63 is a perspective view showing housing structure.

In FIG. 63, a housing structure according to the present embodiment includes three housings A, B and C.

The housing A is substantially square and hollow, and fixed to a backboard 301 which is a diaphragm which separates an apparatus to be connected to an optical module into an internal part and an external part. The housing A accommodates the housing B.

The housing B functions to receive and hold a push-on type optical connectors 302 and 303 which have optical fiber arrays at the tip as illustrated in FIG. 6. The housing B is accommodated in the housing A so as to be slidable.

Figure 68:
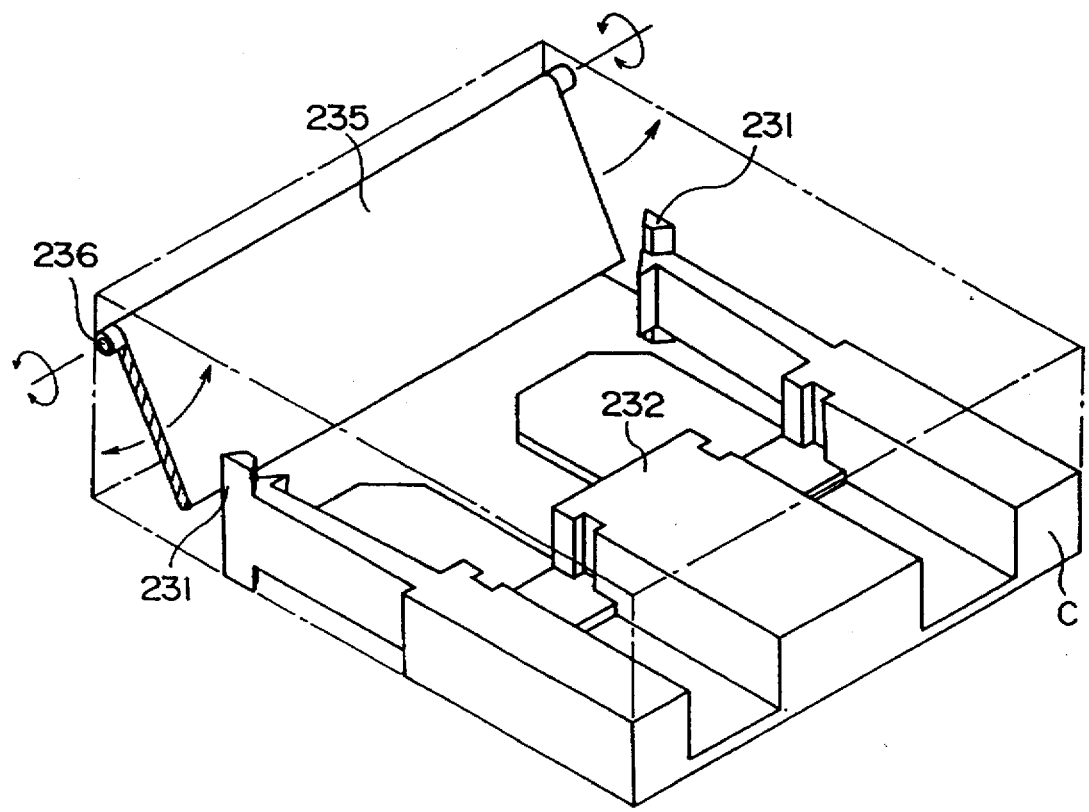
FIG. 68 is a schematic and perspective view showing a shield plate provided in a housing.

The housing C comprises two housings: upper and lower. The structure of the two housings is designed to sandwich and hold a parallel transmission module. Note that FIG. 68 shows one of two divided housings. Further, the housing C accommodates two parallel transmission modules, e.g., shown in FIG. 46, and is fixed at one end of a printed board 304 provided with IC chips for driving the parallel transmission module or for processing a received signal. Note that in this embodiment, the housing C contains a parallel transmission module LD for transmittance which comprises an LD array, and a parallel transmission module PD for reception which comprises a PD array. It is also noted that the housing C comprises a fin 237 for releasing heat (see FIG. 64).

Figure 64:
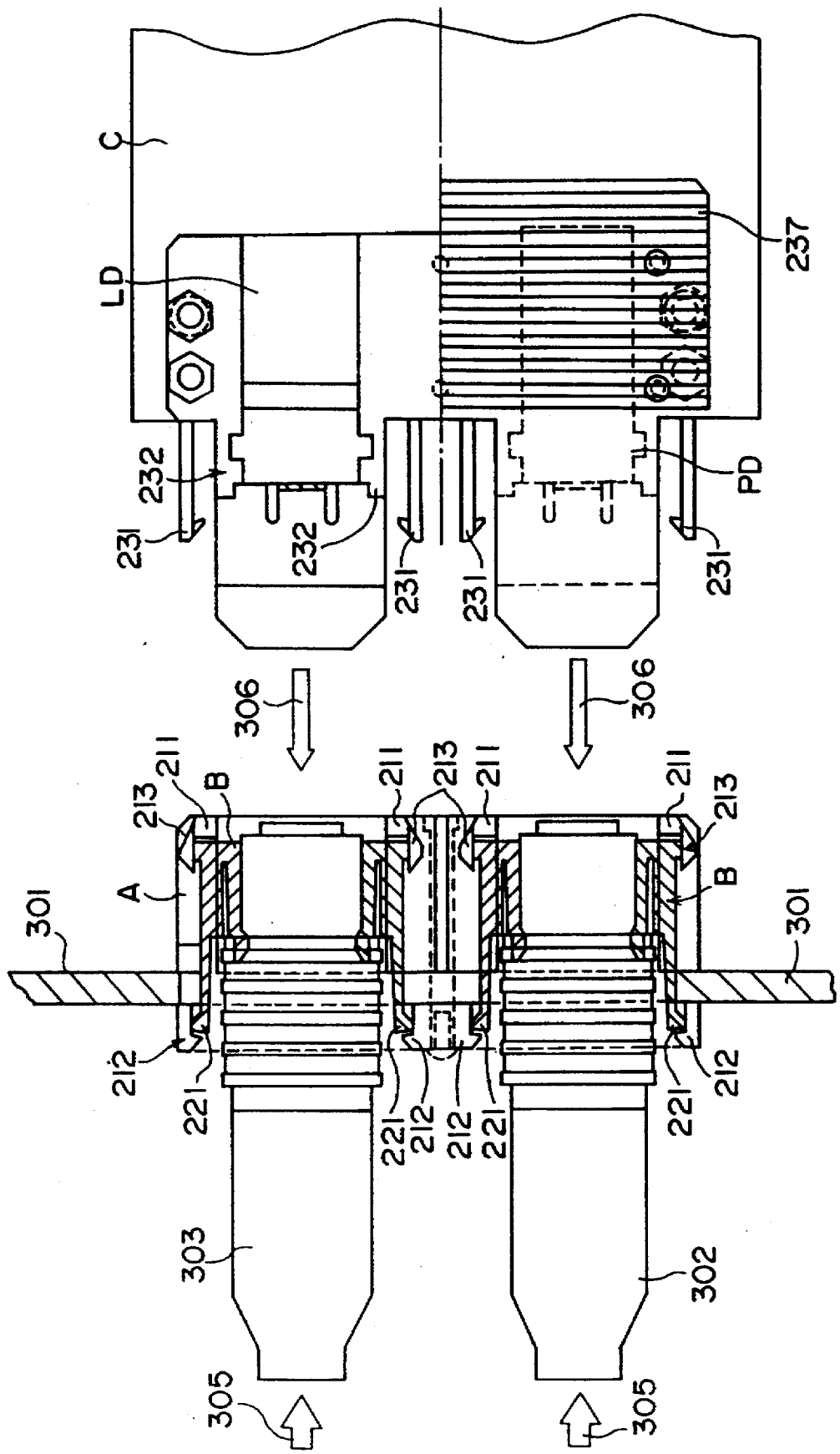
FIG. 64 is a plane view showing each housing before coupling.

As shown in FIG. 64, when the optical connectors 302 and 303 are inserted into the housing A and B fixed on the backboard 301 in a direction as indicated by an arrow 305, the housing B in the housing A holds the optical connectors 302 and 303 at the periphery thereof. One end of the housing B touches a distal wall 211 located on a distal end of the housing A, and a protrusion 221 provided at the other end of the housing B touches a protrusion 212 located at an opening end of the housing A. Accordingly, the both ends of the housing B touch a part of the housing A, which limits the operation of the housing B in the housing A. Consequently, the optical connectors 302 and 303 are held in the housing A.

Figure 65:
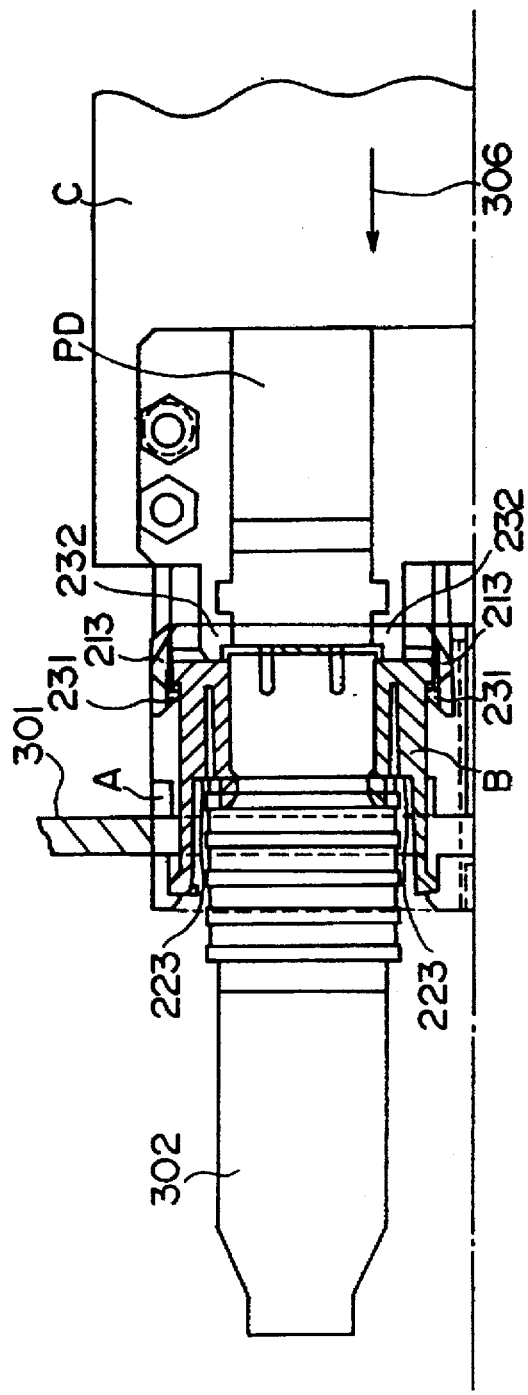
FIG. 65 and FIG. 66 are views showing a coupling mechanism.

Next, as shown in FIG. 64, the housing C holding the parallel transmission modules LD and PD is inserted in the housings A and B in a direction as indicated by an arrow 306. At this time, as shown in FIG. 65, holding parts 231 of the housing C are positioned over tapered parts 713 of the housing A to sandwich the end portion of the housing B. Further, contact parts 232 protruding from the end of the housing C touch one end of the housing B.

Figure 66:
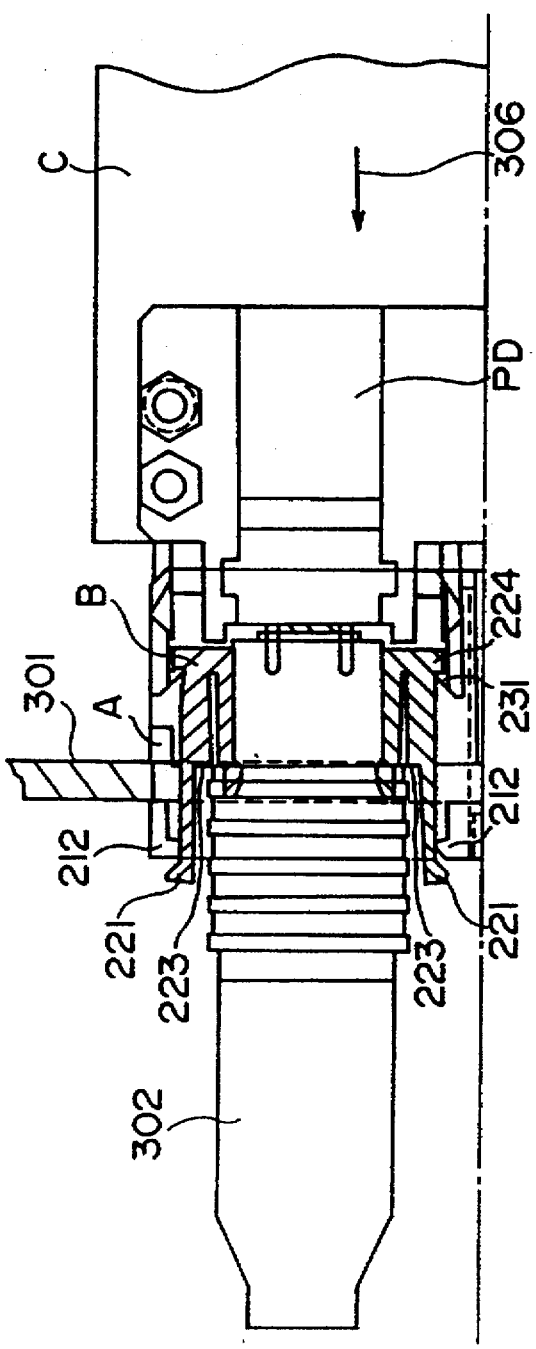

As the housing C is further pushed, the housing B is pressed by the contact parts 232 of the housing C to be displaced following the pushing direction (direction of an array 306), whereby, as shown in FIG. 66, the protrusion 221 of the housing B is displaced across and over the protrusion 212 of the housing A. As a result, the engagement of the protrusion 221 with the protrusion 212 is released, and the housing B protrudes from the rear end of the housing A and is able to be displaced following the array 306. That is, the limitation to the slide of the housing B is released. However, the range of displacement is not unlimited. It is limited by a step 223 of the housing B, which touches the backboard 301. Note that the distance of displacement is preferably about 2 mm.

In this state, the housing B is sandwiched by the holding parts 231 of the housing C, and the housing B and the housing C are coupled together. At this time, the housing A is not involved in this coupling, but merely serves to guide the coupled housing B and housing C.

With this coupling structure, if the printed board 304 is displaced to some extent, this force does not directly affect the backboard 301.

Figure 67:
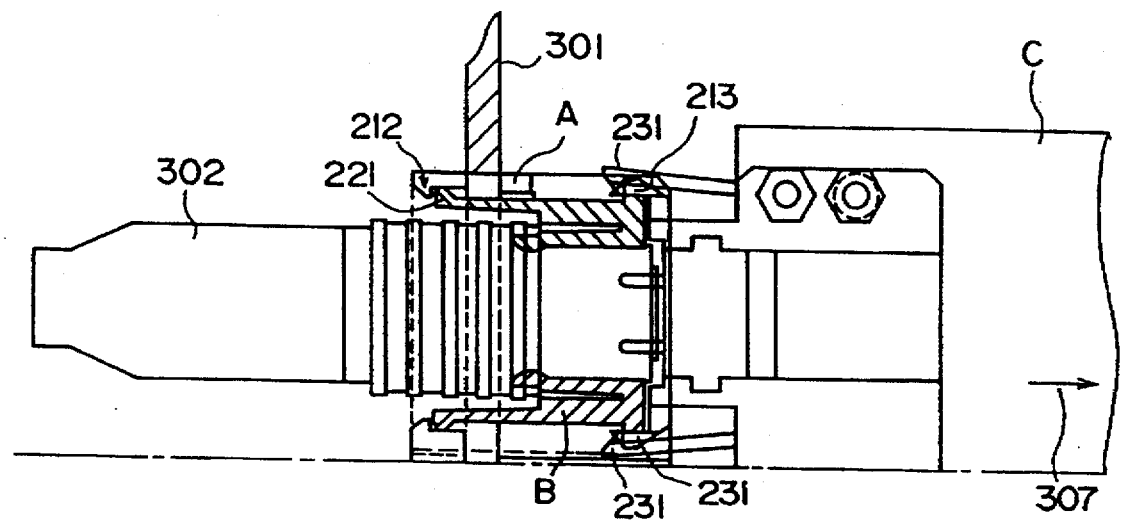
FIG. 67 is a vertical sectional view showing a releasing mechanism.

On the other hand, to release this coupling, the housing C is pulled in a direction of the arrow 307 (see FIG. 67). As the housing C is thus displaced, claws of the holding parts 231 in the housing C engage with the steps 224 of the housing B. Consequently, the housing B is pulled by the housing C in a direction of the arrow 307 (see FIG. 66).

As the housing C is further separated in the direction of the arrow 307, as shown in FIG. 67, the protrusion 221 of the housing B is displaced across and over the protrusion 212 of the housing A. At the same time, the holding parts 231 of the housing A are displaced across and over the tapered parts 213, and engagement of the housing B to the housing C is released. The housing B is thereby returned to its initial position, and its displacement is limited by the housing A again. The coupling of the housing B with the housing C is released and the housings B and C are separated from each other.

As described above, the coupling and releasing of two parallel transmission modules are conducted.

Further, in this instance, the housing C comprises a parallel transmission module LD. It is preferable that a shielding plate 235 shown in FIG. 68 be provided in order to prevent an optical signal emitted from the LD module from entering operator's eyes. The shielding plate 235 is provided at an inserting end of the housing C and pivotally supported by a support rod 236 fixed to the housing C. When the module is coupled, the shielding plate 235 is pushed into the inner part of the housing by the opposing module. When the coupling is released, the shielding plate 235 is returned to its initial position. This function prevents the optical signal from entering the operator's eyes. Note that only one example of the opening-closing structure of the shielding plate 235 is shown here but another structure can be employed.

Embodiment 9

Another embodiment of the housing structure will be explained with reference to the accompanying drawings.

Figure 69:
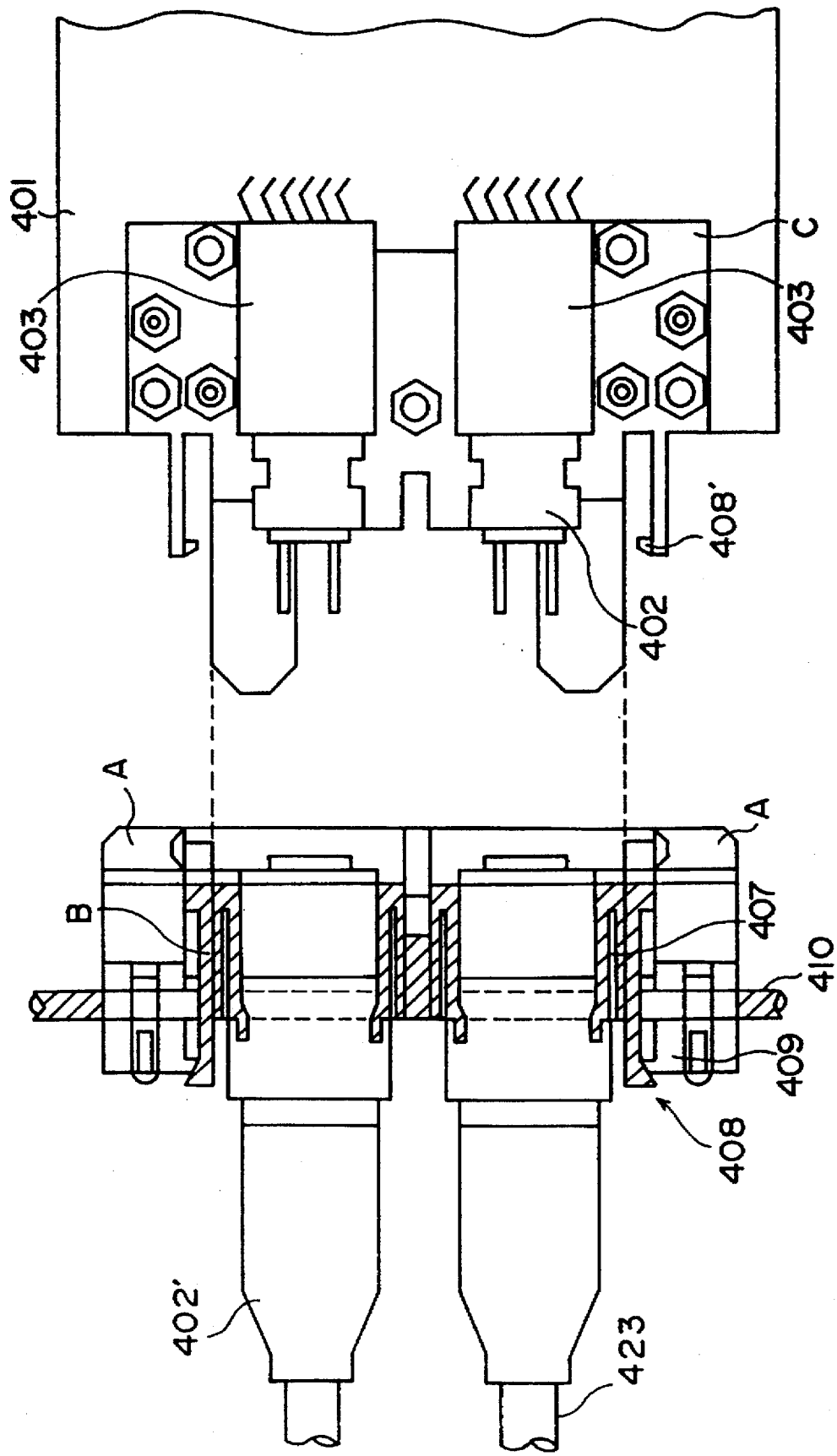
FIG. 69 is a plane view showing each housing before coupling.

FIG. 69 shows a housing structure connecting two sets of optical device arrays with external connectors.

In FIG. 69, the housing structure includes three housings A, B and C. The housing C contains two sets of parallel transmission modules 403. The parallel transmission modules 403 are constructed by combining an optical device 403 which is a light emitting device array or a light receiving device array, and an optical connector receptacle part 402 comprising an optical fiber array (see FIG. 71) together to be a solid body. The housing B comprises two sets of push-on devices 407 with a spring push function, which is able to be installed by insertion in the optical connector receptacle part 402 and which is able to be released therefrom. Further, the housing A and the housing B are integrated with claws 408 which engage with claw tapered parts 409 before the housing C is coupled with the housing B. When the housing B engages with the housing C, the claws 408 are released, so that the housing A is free from the housings B and C.

Figure 70A:
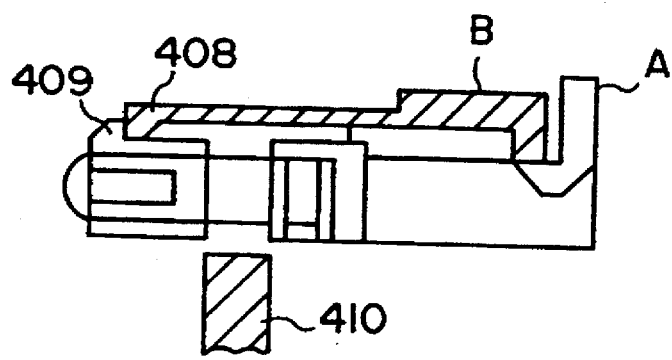
FIG. 70A–FIG. 70C are views showing a procedure of releasing a lock between housings.
Figure 70B:
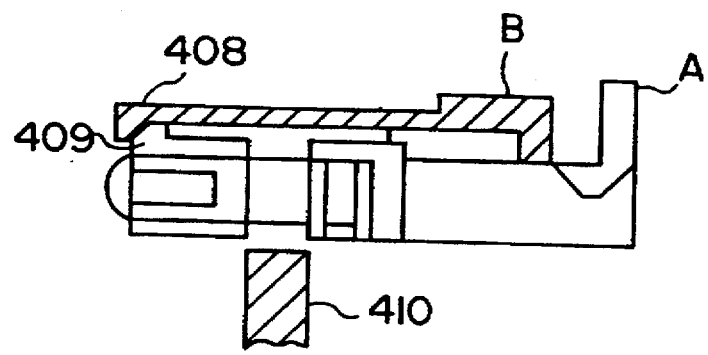
Figure 70C:
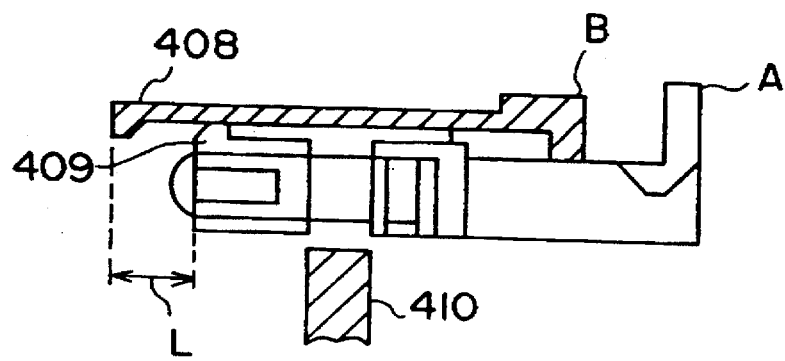

FIG. 70A–FIG. 70C are schematic views showing a lock releasing operation of the housing B from the housing A.

In FIG. 70A, before the housing C is coupled with the housing B, the claw 408 engages with the claw tapered part. However, thereafter, the claw 408 crosses over the claw tapered part 409 (FIG. 70B) and the housing C is coupled with the housing B. In this case, the claw 408 has a 2 mm rate of floating L and the housing A and the housing B are in a non-coupling state (FIG. 70C).

In FIG. 69, multifiber optical connectors 402' with optical fiber cords 423 connected are coupled to two sets of the push-on devices 407, and the multifiber optical connector 402' is a device which is able to be inserted in the housing B through the push-on device 407.

It is preferable that one of the optical devices 403 provided in the two sets of the optical modules which are contained in the housing C be an LD array and the other be a PD array. Each optical module is individually fixed on the printed board 401. Further, it is preferable that the housing B is fixed on the backboard 410, separated from the parallel transmission module.

The housing C has the structure which is divided into upper and lower parts, and after the optical module is installed in the housing C, the upper and lower parts are combined (see FIG. 68).

Further, the optical module has a convex part and a concave part for positioning, and the convex part or the concave part is inserted to the corresponding part of the housing C. Accordingly, the relative alignment of the optical module with the housing C can be achieved with high precision and high working efficiency.

Furthermore, the shape of the convex parts and the concave parts in the two sets or plural sets of the optical modules may be different from each other, whereby the plural sets of the modules can be inserted without error and securely installed.

It is preferable that the housing C include a substrate and cover plate. Then, it is desirable that the convex parts for positioning the optical fiber array at the end of the optical module are provided to engage the concave parts of the arrays for the LD and PD and after assembling, the cover plate is installed.

The cover plate may be made of metal, and a fin may be installed to form a conduction part for the internal heat radiation in order to improve the heat radiation.

The housing A desirably has the structure which comprises the housing B, and with this structure, when the claw 408 is released, the stroke can be made 0–2 mm in the axis direction and more preferable 2 mm or above. With this structure, if the position of the printed board 401 is off, e.g., ±1 mm, the tight coupling of the optical module with the multifiber optical connector 402' can be achieved without the pressure affecting on the backboard 410.

The optical connector is preferably a multifiber and a push-pull type. In the push-pull type optical connector, the guide pin coupling type ferrule is pressed with the spring, and the coupling is released by the peripheral injector.

The housing system of the present embodiment can be widely applied to parallel transmission modules, and more precisely, applied to a structure in which one end of the optical fiber array is coupled to the module optical system (optical device) and the other end is coupled to the optical connector.

Figure 71:
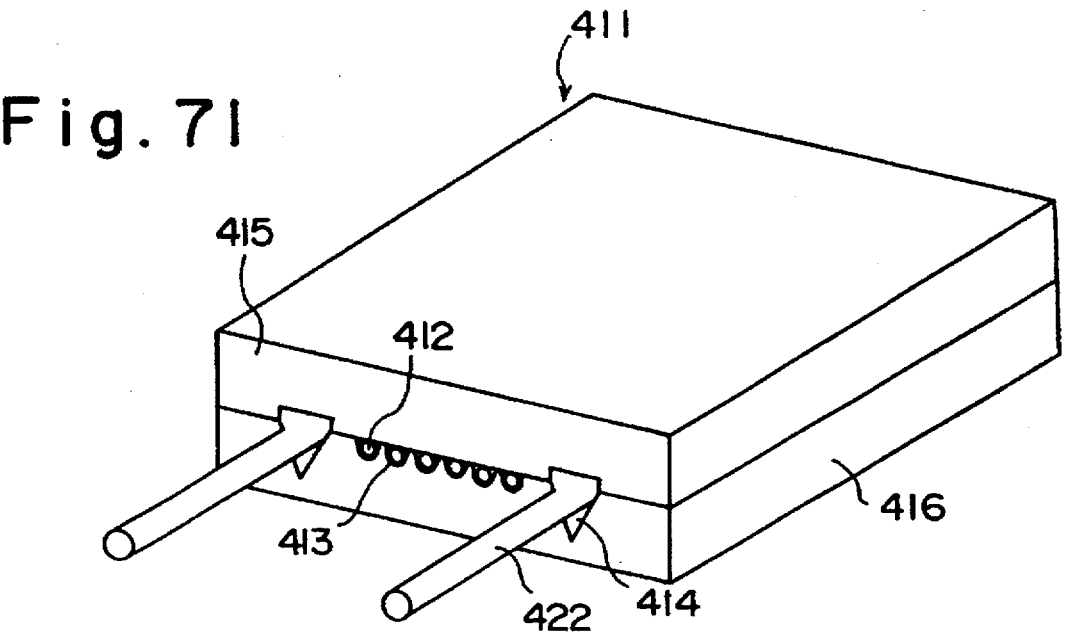
FIG. 71 is a perspective view showing a configuration of an optical fiber array.

FIG. 71 is a schematic view showing the basic structure of a parallel transmission module provided in the housing system of the present embodiment.

In FIG. 71, an optical fiber array is at the end of a module and comprises an internal coupling end face for coupling an optical device in the module and an external coupling end face for coupling an external optical connector. Further, the optical fiber array comprises guide pins 422 at the external coupling end face, and a positioning member comprising upper and lower plates 415 and 416, and a metal flange (not shown) at the periphery of the upper and lower plates.

Optical fibers 412 are positioned at both end faces by the lower plate 416 and the upper plate 415. The optical fibers 412, the upper and lower plates 415 and 416, and the metal flange are fixed together with a hermetic sealing member such as solder or low melting point glass. Further, the module comprises the guide pins 422 and the guide pin grooves 414. In this instance, the guide pin grooves 414 are provided in the positioning member for optical fibers on the optical fiber array 411 side or on the optical connector 402' side, and the guide pins 422 are fixed in these grooves.

The optical fibers 412 are positioned in the fiber grooves 413.

It is important that the optical fiber array is entirely sealed with the hermetic sealing member and that both end faces are polished.

For the hermetic sealing member, it is preferable that an additive agent such as Zn, Sb, Al, Ti, Si or Cu be added to general Pb—Sn alloy, which is suitable for bonding optical fiber glass. These members are important from an aspect of airtightness of the parts in the optical fiber array and from an aspect of reliability control of various optical devices in the optical fiber array and the module.

To seal the optical fiber array, the hermetic sealing member is preferably fed from the end of the optical fiber array by soaking the optical array in the hermetic sealing member. In such a case, it is preferable that the ultrasonic oscillation be applied to the hermetic sealing member. Further, a window part (not shown) or an optical fiber exposing part is preferably provided to assure the clamping of the optical fibers with the upper and lower parts at this location.

The advantage of providing such a window part or an optical fiber exposing part is that a gap spreads more at the window part, which prevents the solder from rising and which controls the optical fiber positioning.

Further, it is desirable that a wall (not shown) be provided at the lower plate 416. The wall and the lower plate 416 may be formed by the solid-phase bonding: Si-glass or Si—Si. The solid-phase bonding may be made by direct bonding of Si—Si.

Providing an oxide film on a silicon surface of the lower plate 416 is preferable for improving the adhesion of the upper plate 415 or the adhesion resulting from the solder.

The metal coating or carbon coating is preferably deposited on the optical fibers 412 in order to make the solder easily adhere to the optical fibers and improve reliability.

The end faces of the optical fibers 412, the upper and lower plates 415 and 416 and the metal flange may be polished to be arranged in substantially the same plane. They are easily polished if the Young's modulus is small when the end face is polished.

Further, if the optical fibers 412, and the upper and lower plates 415 and 416 protrude from the metal flange, they can be excellently polished.

Figure 72:
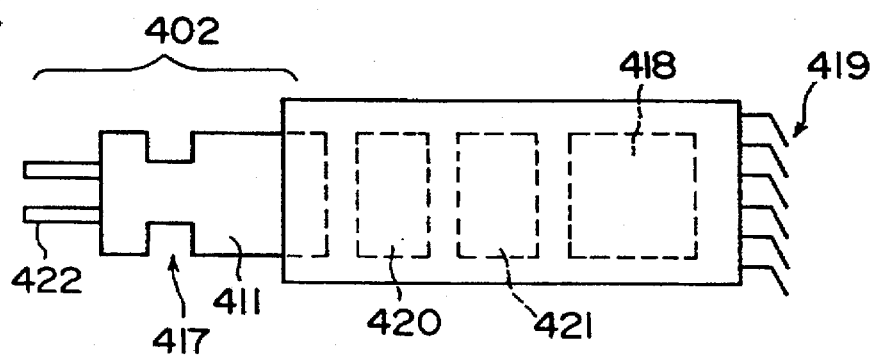
FIG. 72 is a schematic view showing a configuration of a parallel transmission module stored in a housing.

FIG. 72 is a schematic view showing a light reception-emission module comprising an optical fiber array having a metal flange at the periphery of the module.

In FIG. 72, reference numeral 422 is a guide pin, 411 is an optical fiber array, 417 is a positioning part, 418 is an IC part, 419 denotes pins, 420 is an array lens, and 412 is an LD or a PD array.

In FIG. 72, the metal flange (not shown) is provided at the periphery of the optical fiber array 411 installed in the optical connector receptacle part 402. The guide pins 422 are fixed at the end of the optical fiber array 411. The module is coupled with the optical connector 402' or others by the guide pins 422. The LD or PD array 421 and the IC part 418 are connected at the rear end of the optical fiber array 411 through the array lens 420, and the module is coupled to another optical apparatus by the pins 419.

Further, the metal flange or others is installed on the optical fiber array 411 and fixed at the end of the module, whereby the optical connector receptacle part 402 is shown in FIG. 69 is formed.

The optical fiber array and the optical devices (LD or PD array, lens array or optical waveguide, or others) may be bonded after aligning with the adhesive, or may be bonded to the case of the optical module by solder or YAG laser, or may be bonded using guide pins.

The angle of an end face of the optical fiber array is not limited to a vertical direction with respect to an optical axis direction, but the end face may be diagonally polished. Accordingly, oblique angle coupling (e.g., 5°–10°) is possible. Further, the non-reflective coating can be deposited on the end face.

In the present embodiment, the optical fiber array in which the optical fibers are positioned by the upper and lower plates has been explained, but the optical waveguide formed on the silica substrate may be used in the optical connector receptacle part without using the optical fibers. The guide pin grooves may be formed in the optical waveguide, if necessary.

With use of the optical waveguide, the hermetic sealing is made easier, and when the pitch between the device and the optical connector is required to be changed, this process can easily be treated. Further, the function of the optical branching filter and the optical multiplexer can be provided in the receptacle part.

Working example

As one example, there will be described a structure of a push-pull coupling, which coupling is performed by coupling one set of modules, which mounts one set of 12 channels LD arrays, and one set of 12 channels PD arrays, with two sets of the 12-fibers single mode optical connectors through the backboard.

First, a housing C was made of polyphenylene sulfide (PPS) plastic.

A cover plate was made of metal, and had a fin to improve heat radiation. A heat conduction was contacted with a portion between the cover plate and the module in order to make the heat in the module conduct easily.

The heat conduction easily contacted with the portion between the cover plate and the module by installing the cover plate.

The housing C was constituted with a substrate and the cover plate. The substrate had the convex parts for positioning the optical fiber array at the end or the optical module to engage the concave parts of the arrays for the LD and PD, and after assembling, the cover plate gas installed.

A housing A comprised a housing B, and the stroke was made 2 mm in the axial direction when the lock was released. With this structure, if the position of the printed board is off, e.g., ±1 mm, the coupling of the optical module with the multifiber optical connector can be achieved without the pressure affecting on the backboard. Both the housings A and B were made of PPS plastic.

In the push-pull type multifiber optical connector, a guide pin coupling type ferrule is pressed with a spring and the coupling is released by an injector provided with peripherals thereof.

A pitch of the 12-fibers optical connector was 16 mm. The height of the housing C from the printed board was suppressed below 9.0 mm with respect to the mounting.

With this structure, the installing and releasing operations were repeated 500 times. This procedure confirmed that the module did not have any practical problems; the loss was within 0.4 dB.

Further, with this structure, the optical transmittance-reception module and the multifiber optical connector could be coupled individually with the backboard, and the working efficiency was sharply improved.

Since the transmittance and the reception were both included, the space required for installation was small and the handling was improved.

As described above, the housing structure of the present embodiment can connect a plurality of optical device arrays which are made to be one body with the optical connectors, and the coupling process is made easier.

The embodiments 1-9 are explained separately only for the sake of convenience. Each embodiment relates to each other, and the components explained in one of embodiments may be used in other embodiments, and the combination of components may be used.

INDUSTRIAL APPLICABILITY

An optical fiber array according to the present invention can protect the boundary portion between a coated ribbon part of an optical fiber and a glass part of the optical fiber from heat when the ribbon part is fixed with solder, since the boundary portion is covered with a heat resistant adhesive.

In a parallel transmission module according to the present invention, a main body of module including a plurality of optical transmission systems and an optical fiber array including a plurality of optical fibers are combined into one module. Accordingly, the module is easily handled and a large space for installation is not required, which is different from a conventional module.

In a method of manufacturing a parallel transmission module according to the present invention, both end faces of an optical fiber array fixed to the module are entirely sealed with high airtightness, and a lens or an optical device provided in the module can sufficiently be protected.

In a housing system according to the present invention, a parallel transmission module can be coupled directly and easily and released to and from a multifiber optical connector, respectively, and the working efficiency can be sharply improved.

We claim:

1. A parallel transmission module which transmits a plurality of optical signals in parallel said parallel transmission module comprising:

a module body comprising first and second optical transmission systems for transmitting said optical signals separately, each of said systems having first and second opposite end faces;

an optical fiber array having first and second ends and being arranged such that said first end of said optical fiber array is provided at said first end face of said first optical transmission system and integrally fixed to said module, said optical fiber array comprising a plurality of optical fibers for optically coupling with at least one of said optical transmission systems; and guiding means for positioning an optical connector to optically couple with an optical coupling end face located at said second end of said optical fiber array, wherein said optical fiber array comprises:

a first plate having a plurality of positioning grooves for positioning said optical fibers;

a second plate for pressing each of said optical fibers in said positioning grooves;

support plates provided at both sides in a cross direction of said first plate, said support plates having a shorter length in the cross direction than said first plate; and a flange member contacting one end face of each of said support plates, said flange member being arranged at peripheries of said first and second plates, and wherein said optical fibers, said first and second plates and said flange member are integrally fixed in a hermetic manner with an air-tight sealing agent.

2. A parallel transmission module according to claim 1, wherein said module body further comprises a waveguide substrate, and wherein said first and second optical transmission systems each are a plurality of optical waveguides formed on said waveguide substrate.

3. A parallel transmission module according to claim 1, wherein said guiding means is at least one guide pin.

4. A parallel transmission module according to claim 3 further comprising a housing for holding said optical connector.

5. A parallel transmission module according to claim 1, wherein said guiding means is at least one guide groove for receiving a guide pin provided at said optical connector.

6. A parallel transmission module according to claim 5 further comprising a housing for holding said optical connector.

7. A parallel transmission module according to claim 1, wherein said optical fiber further comprises convex portions projecting from a surface of said first plate in a height direction, said convex portions being disposed along interfaces of said first plate and said support plates at both sides of said first plate, such that said convex portions prevent said sealing agent from flowing to said support plates.

8. A parallel transmission module according to claim 1, wherein said guide means comprises at least one guide pin, and wherein said parallel transmission module further comprises a clamp member for holding and elastically pressing said guide pin against one of said support plates.

9. A parallel transmission module according to claim 1, wherein said second end of said optical fiber array protrudes from a position corresponding to a position at which said end faces of said support plates are located in a longitudinal direction of said first and second plates.

10. A parallel transmission module according to claim 1, wherein said first end of said optical fiber array protrudes from a position corresponding to a position at which an end face of said flange member is located in a longitudinal direction of said first and second plates.

11. A parallel transmission module according to claim 1, wherein said sealing agent is solder, and said optical fibers are fixed between said first and second plates in a hermetic state by said solder.

12. A parallel transmission module according to claim 11, wherein said solder is Pb—Sn alloy, and said solder comprises one kind of additive agent selected from the group consisting of Zn, Sb, Al, Ti, Si, and Cu.

13. A parallel transmission module according to claim 12, wherein said optical fibers are carbon coated fibers.

14. A parallel transmission module according to claim 11 further comprising a sleeve arranged at peripheries of said first and second plates for holding said optical fibers.

15. A parallel transmission module according to claim 14, wherein said sleeve is made of Ni—Fe amber alloy.

16. A parallel transmission module according to claim 1, wherein said first plate and said second plate are bonded together by anode coupling.

17. A parallel transmission module according to claim 1, wherein said optical fibers of said optical fiber array have mode field diameters that are partially enlarged in the vicinity of said second end face of said optical fiber array.

18. A parallel transmission module according to claim 17, wherein said mode field diameter is enlarged by concentrating residual stress in a core region to lower a refractive index of said core region, and further wherein said mode field diameter is enlarged by at least 20% as compared with a case in which the residual stress is removed.

19. A method of manufacturing a parallel transmission module comprising:

a first step of positioning optical fibers having first and second end faces in respective positioning grooves formed in a first plate, and providing a second plate to maintain said optical fibers in said positioning grooves, said first and second plates each having first and second end faces;

a second step of arranging a flange member at peripheries of said first and second plates;

a third step of soaking said first end faces of said first and second plates, where said first end faces of said optical fibers are arranged, to fix said flange member at said peripheries of said first and second plates;

a fourth step of filling an air-tight solder at least into a gap between said first and second plates from said first end faces to said second end faces and integrally fixing and hermetically sealing said optical fibers, said first and second plates and said flange member together with said solder, said fourth step being conducted prior to, simultaneous with, or subsequent to said third step;

a fifth step of polishing said end faces of said first and second plates to make said end faces of said optical fibers specular, whereby an optical fiber array is formed; and a sixth step of fixing one of said end faces of said optical fiber array at an optical coupling end face of a module body, said module body comprising a plurality of optical transmission systems, such that said optical fibers of said optical fiber array are optically coupled individually with said optical transmission systems in said module body.

20. A method according to claim 19, wherein in said fourth step, ultrasonic oscillation is used to fill said solder in said first and second plates from said first end faces to said second end faces.

* * * * *